(12) United States Patent
Takáč et al.

(10) Patent No.: US 12,675,809 B2
(45) Date of Patent: Jul. 7, 2026

(54) FEDERATED REINFORCEMENT LEARNING-BASED SYSTEM AND METHOD FOR COOPERATIVE ENERGY OPTIMIZATION

(71) Applicant: Mohamed bin Zayed University of Artificial Intelligence, Abu Dhabi (AE)

(72) Inventors: Martin Takáč, Abu Dhabi (AE); Nicolás Mauricio Cuadrado Ávila, Abu Dhabi (AE); Roberto Alejandro Gutiérrez Guillén, Abu Dhabi (AE); Samuel Horvath, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

(21) Appl. No.: 18/587,261

(22) Filed: Feb. 26, 2024

(65) Prior Publication Data

US 2025/0272723 A1 Aug. 28, 2025

(51) Int. Cl.
*G06Q 30/0283* (2023.01)
*G06N 20/00* (2019.01)

(52) U.S. Cl.
CPC ......... *G06Q 30/0283* (2013.01); *G06N 20/00* (2019.01)

(58) Field of Classification Search
None
See application file for complete search history.

(56) References Cited

U.S. PATENT DOCUMENTS

2022/0237712 A1 * 7/2022 Orsini ..................... H02J 3/381
2022/0337061 A1 10/2022 Lee et al.
2023/0221692 A1 * 7/2023 Cella ..................... G06Q 10/04
700/295

FOREIGN PATENT DOCUMENTS

CN 113610303 A * 11/2021 ............. G06N 3/044
CN 115115211 A 9/2022

OTHER PUBLICATIONS

Y. Li, S. He, Y. Li, Y. Shi and Z. Zeng, "Federated Multiagent Deep Reinforcement Learning Approach via Physics-Informed Reward for Multimicrogrid Energy Management," in IEEE Transactions on Neural Networks and Learning Systems, vol. 35, No. 5, pp. 5902-5914, doi: 10.1109/TNNLS.2022.3232630. Jan. 3, 2023 (Year: 2023).*

(Continued)

*Primary Examiner* — George Chen
(74) *Attorney, Agent, or Firm* — Oblon, McClelland, Maier & Neustadt, L.L.P.

(57) ABSTRACT

A federated learning framework including household agents configured to continuously learn model parameters for managing charging periods and discharging periods of household batteries, and microgrid agents to maximize use of local energy based on a pricing policy, including accessing power from other microgrids when there is insufficient local energy to cover local demand. and selling surplus energy to the other microgrids when power generation by the microgrid surpasses the local demand. Each household machine learning agent is configured to control household energy demand from and supply to a microgrid which they are connected in order to minimize household energy cost while adapting to changes in the energy price that is determined based on the pricing policy of the microgrid agent that encourages reduction of carbon emission. A federated learning engine combines the model parameters from the household machine learning agents to update a global household machine learning agent.

5 Claims, 49 Drawing Sheets

(56) References Cited

OTHER PUBLICATIONS

Sanayha et al. ; Model-Based Approach on Multi-Agent Deep Reinforcement Learning With Multiple Clusters for Peer-To-Peer Energy Trading ; IEEEAccess vol. 10 ; Nov. 24, 2022 ; 12 Pages.
Chen et al. ; Peer-to-Peer Energy Trading and Energy Conversion in Interconnected Multi-Energy Microgrids Using Multi-Agent Deep Reinforcement Learning ; IEEE Transactions on Smart Grid ; 2021 ; 13 Pages.

* cited by examiner

Family

Morning and afternoon peaks

Business

Peak during working hours

Mean action through epochs

Mean SOC through epochs

Mean reward through time

Mean action through time

Mean SOC through time

Mean net energy through time

PV and Demand

Mean reward through epochs

FEDERATED REINFORCEMENT LEARNING-BASED SYSTEM AND METHOD FOR COOPERATIVE ENERGY OPTIMIZATION

CROSS-REFERENCE TO RELATED APPLICATIONS

This application is related to U.S. Application titled "A System and Method for A Hierarchical Multi-Agent Framework for Transactive Microgrids", the entire contents of which are incorporated herein by reference.

STATEMENT REGARDING PRIOR DISCLOSURE BY THE INVENTORS

Aspects of this technology are described in Nicolás Cuadrado, Roberto Gutierrez, Yongli Zhu, and Martin Takac, "MAHTM: A Multi-Agent Framework for Hierarchical Transactive Microgrids." *arXiv preprint arXiv:* 2303.08447 (2023), which is incorporated herein by reference in its entirety. Aspects of this technology are described in N M Cuadrado, R A G Guillén, M Takáč, FRESCO: Federated Reinforcement Energy System for Cooperative Optimization, ICLR 2023 Tiny Papers, May 5, 2023, which is incorporated herein by reference in its entirety.

BACKGROUND

Technical Field

The present disclosure is directed to a system and method of transactive control of microgrids, in particular, a federated learning framework for training agents in a hierarchical multi-agent reinforcement learning system that manages energy transactions in microgrids. The federated learning framework is used to train three layers of agents, each pursuing different objectives. The first layer minimizes the total energy cost. The other two layers control the energy price to minimize the carbon emission while balancing the consumption and production of both renewable and conventional energy.

Description of Related Art

Climate change has emerged as one of our planet's most pressing challenges. It is causing various environmental, economic, and social impacts, including rising sea levels, more frequent extreme weather events, and threats to global food security IPCC (2018).

Climate change is occurring at a rate that needs to be taken seriously as a major global problem. Data on anomalies over the last hundred years strongly supports that climate change is occurring. FIG. 1 is a histogram of temperature anomalies since 1880. See Monthly Global Climate Report for Annual 2022, NOAA National Centers for Environmental Information. The histogram exhibits a trend from mostly below normal temperatures before 1940 to mostly above normal temperatures after 1980. Moreso, the above normal temperatures are generally increasing.

Promoting renewable energy sources helps reduce greenhouse gas emissions from the energy sector. It often involves using microgrids and small-scale power systems that can operate independently or in conjunction with the main grid. Hierarchical control systems ensure microgrids' efficient and effective operation by coordinating the various components and managing the energy flow. See Zixuan Yang, Langchen Huang, Zongao Yi, and Yingxin Hu. A review on hierarchical control strategy in microgrid. *In Proceedings of the 2nd International Conference on Information Technologies and Electrical Engineering*, ICITEE-2019, New York, NY, USA, 2020. Association for Computing Machinery. ISBN 9781450372930. doi: 10.1145/3386415.3387038. doi.org/10.1145/3386415.3387038.

Conventional energy grids are composed of dispatchable power plants which are a predictable source of electric power. These dispatchable power plants can be turned on and off as needed. On the other hand, renewable energy sources are stochastic, i.e., they generate energy in a somewhat random manner. Renewable energy sources are dependent on many factors, including weather conditions, temperature, geographic region, time of day, location. Also, research has shown that renewable energy sources, in particular solar electric generation, can lead to a problem of overgeneration. Conventional power plants generate electricity by burning hydrocarbon fuels (e.g., fossil fuels) such as coal, oil and gas and/or from other sources such as nuclear fission an/or fusion.

FIG. 2 is a graph for an example of an overgeneration condition, known as the duck curve. In 2013, the California Independent System Operator (CAISO), the organization that oversees California's electricity generation and transmission system, published a now-famous graph. As illustrated in FIG. 2, this graph displays the energy demand over time on a spring day, and how it is expected to change in the future. The graph also predicts energy demand over time on a typical California spring day. It was only after conducting studies on green grid deployment that researchers noticed that as small-scale solar generation increased during the day, the demand for electricity from the grid decreased (the duck belly). This is due to the excess energy of photovoltaic energy. Then, once the sun begins to set and people return home in the evening, demand on the network begins to peak (the duck's neck). Therefore, they conclude that the grid demand drops in the daytime and then increases again in the evening, as seen in the FIG. 2. In this figure, the line of the graph, especially the increasingly pronounced shape of the predictions over the years looks like the silhouette of a duck. This phenomenon was nicknamed the Duck Curve, and the name stuck. See Henri Joël Azemena, et al., Explainable Artificial Intelligent as a solution approach to the Duck Curve problem, Procedia Computer Science, Volume 207, 2022, Pages 2747-2756.

In addition, there are privacy concerns associated with microgrids, such as collecting and using data about energy consumption. Addressing these issues proactively is essential to ensure the benefits while protecting the privacy of individuals and communities See Jennifer Tyav, Shahid Tufail, Sukanta Roy, Imtiaz Parvez, Anjan Debnath, and Arif Sarwat. A comprehensive review on smart grid data security. In *SoutheastCon* 2022, pp. 8-15, 2022. doi:10.1109/SoutheastCon48659.2022.9764139.

Accordingly, it is one object of the present disclosure to provide hierarchical control methods and systems trained by a federated learning process that enables scaling without risking the information from participants. The participants are reinforcement learning agents that take into account conditions of an energy grid including microgrids having associated loads (demand) and energy sources (supply) where the agents function to transfer energy between supply and demand while concurrently minimizing carbon emission.

SUMMARY

An aspect of the present disclosure is a federated learning framework for controlling a plurality of microgrids, that can include a plurality of household machine learning agents, including active consumer household agents configured to continuously learn model parameters for managing charging periods and discharging periods of household batteries; a plurality of microgrid agents, each microgrid agent configured to maximize use of local energy based on a pricing policy for local transactions between households connected in the microgrid, including accessing power from other microgrids of the plurality of microgrids when there is insufficient local energy to cover local demand. and selling surplus energy to the other microgrids when power generation by the microgrid surpasses the local demand, wherein each household machine learning agent is configured to control household energy demand from and supply to a microgrid which they are connected in order to minimize household energy cost while adapting to changes in the energy price that is determined based on the pricing policy of the microgrid agent and availability of energy from neighboring houses in the microgrid, wherein the energy price that is determined based on the pricing policy of the microgrid has an objective of reducing carbon emission; a distributor agent configured to control load among the plurality of microgrids to minimize carbon footprint by setting buy and sell prices for energy exchange within each of the plurality of microgrids; and a federated learning engine for obtaining and combining the model parameters from the plurality of household machine learning agents to update a global household machine learning agent.

A further aspect of the present disclosure is a federated learning method for training a hierarchy of a plurality of agents and at least one global agent for controlling an energy grid, the plurality of agents including a plurality of household agents for management of household energy, at least one of the plurality of agents being a microgrid agent for management of a microgrid, and at least one of the plurality of agents being a distributor agent for management of an energy distributor for distributing energy from non-renewable energy sources in the energy grid, the method can include training the plurality of household agents, the microgrid agent, and the distributor agent locally by reinforcement learning for a certain training period, including updating respective agent weights for different energy management objectives, wherein the plurality of household agents greedily utilize their own energy source with a management objective to minimize their own energy usage cost, wherein the microgrid agent learns a price policy for exchange of energy between households in the microgrid in order to encourage the exchange in the face of the greedy energy usage by the household agents; when the certain training period is reached, uploading updated weights of each of the household agent, the microgrid agent, and the distributor agent to the global agent; determining, by the global agent, an average of the uploaded updated weights as averaged weights; and receiving, by each of the household agent, the microgrid agent, and the distributor agent, the averaged weights from the global agent.

A further aspect is a federated learning method for training a hierarchy of a plurality of household energy, the plurality of agents including a plurality of microgrid agents for agents for controlling an energy grid, the plurality of agents including a plurality of household agents for management of respective microgrids, and the plurality of agents including a distributor agent for management of an energy distributor for distributing energy from non-renewable energy sources in the energy grid, the method can include training the plurality of household agents, the plurality of microgrid agents, and the distributor agent locally by reinforcement learning for a certain training period, including updating respective household agent weights, microgrid agent weights, and distributor agent weights for different energy management objectives, wherein each microgrid agent learns a price policy for exchange of energy between households in the respective microgrid in order to encourage the exchange in the face of greedy energy usage by the households; when the certain training period is reached, uploading updated weights of the household agent to a household global agent; uploading updated weights of the microgrid agent to a microgrid global agent; determining, by the household global agent, an average of the uploaded updated weights of the household agents as averaged household agent weights; determining, by the microgrid global agent, an average of the uploaded updated weights of the microgrid agents as averaged microgrid agent weights; each of the household agents receiving the averaged weights from the household global agent; and each of the microgrid agents receiving the averaged weights from the microgrid global agent.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
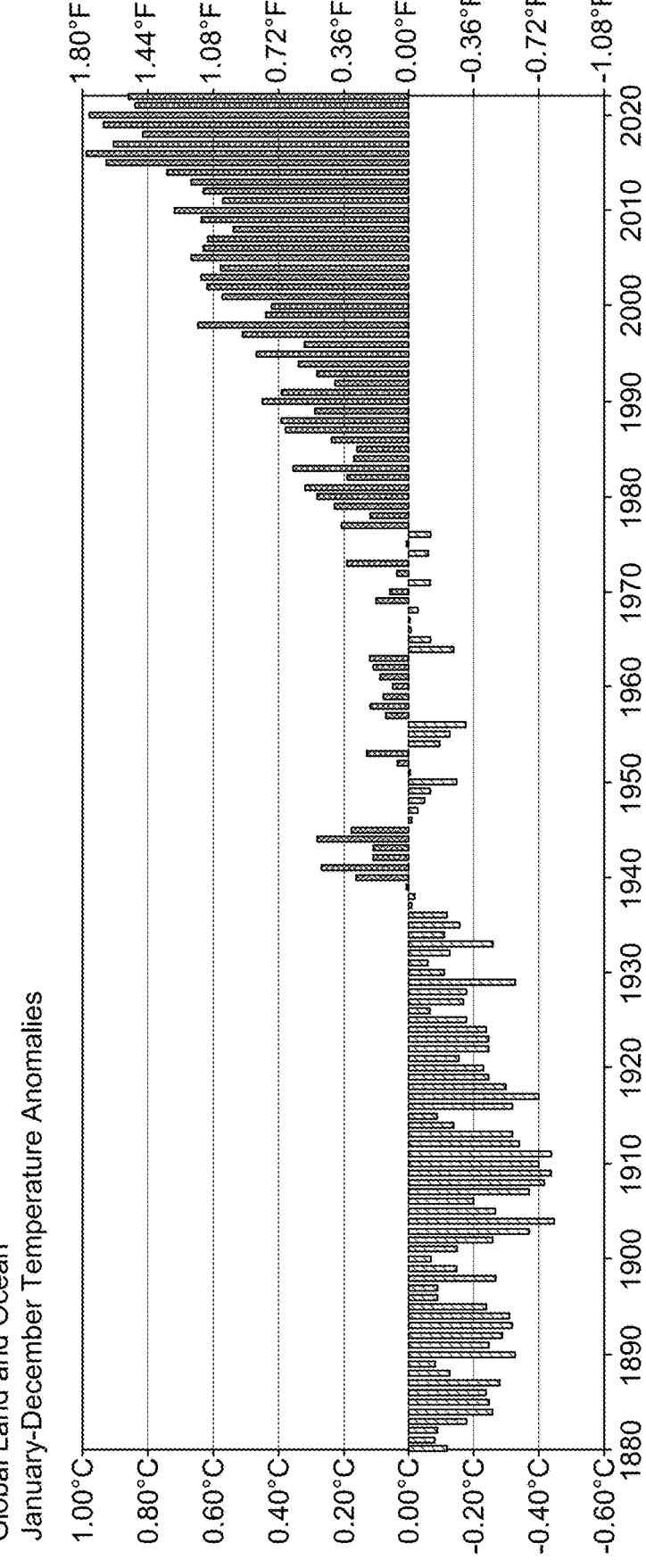
FIG. 1 is a histogram of temperature anomalies since 1880.
Figure 2:
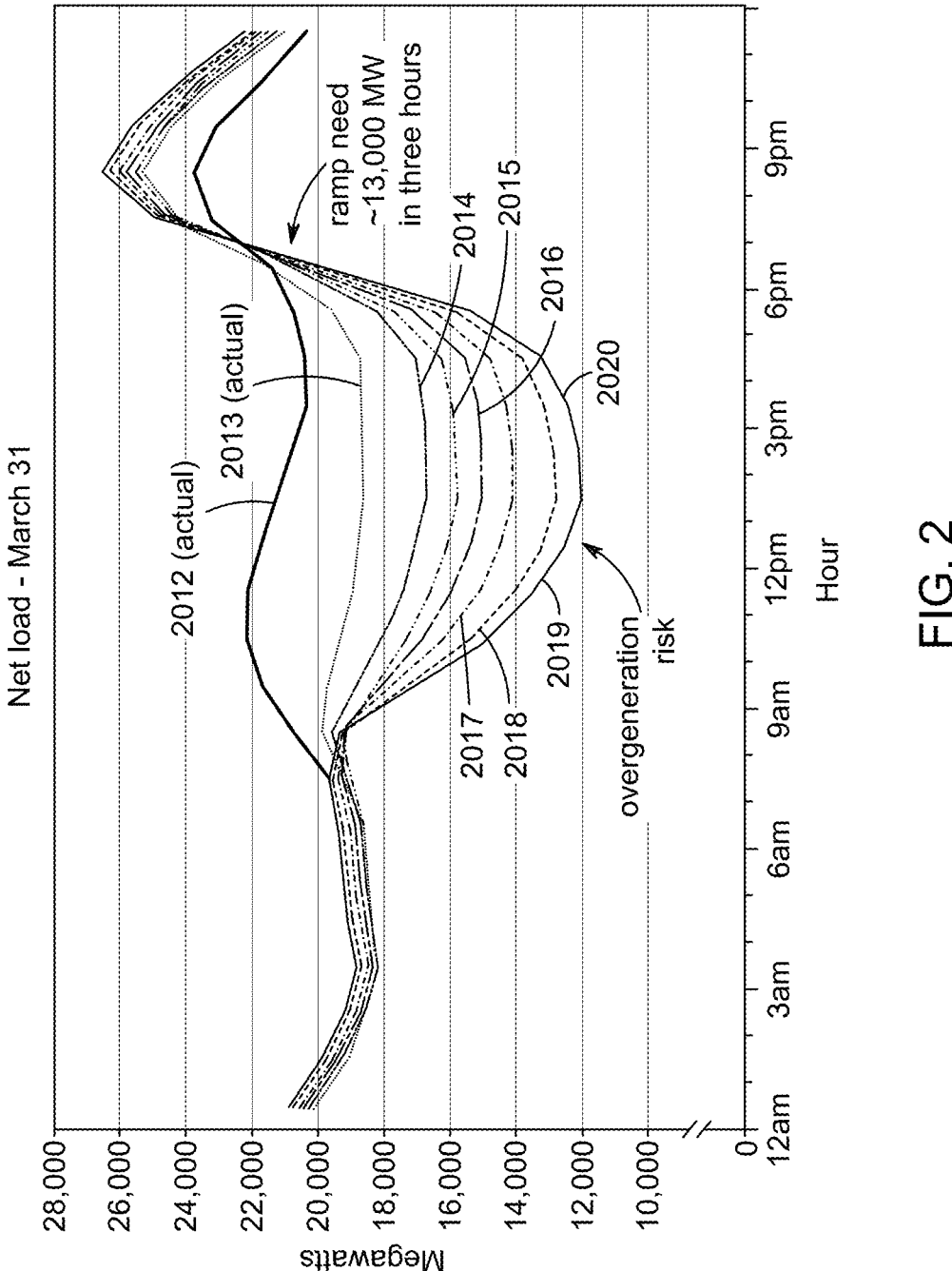
FIG. 2 is a graph for an example of an overgeneration condition.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to a system and method for managing microgrids having renewable energy sources, and in particular a hierarchical control framework composed of reinforcement learning (RL) agents, including federated learning (FL), to enable scaling without risking the information from participants. The ultimate goal is to reduce the collective carbon emission of a group of microgrids. In this disclosure, the framework is referred to as a Federated Reinforcement Energy System for Cooperative Optimization, or FRESCO.

FRESCO includes three components: 1) An OpenAI Gym environment that represents different microgrid setups, 2) a hierarchical structure of RL agents that control the microgrid at different scales, and 3) a training stage using FL. The framework includes a model that represents a real case scenario in which agents tend to pursue individual objectives, namely, are greedy. However, agents in the same level end up following a common goal dictated by a higher layer agent. In particular, a microgrid agent can determine the pricing policy for energy exchange between households in the microgrid in order to encourage the exchange within the microgrid in conjunction with greedy energy usage by the households.

Certain terms used throughout this disclosure are summarized below.

Battery storage, or battery energy storage systems (BESS), are devices that enable energy (e.g., electricity) from renewable sources, like solar and wind, to be stored and then released in response to demand when the power is needed.

Distributed Energy Resources (DER) are small-scale electricity supply or demand resources that are interconnected to the electric grid. They are power generation resources and are usually located close to load centers, and can be used individually or in aggregate to provide value to the grid.

Federated Learning (FL) aims at training a machine learning algorithm, for instance deep neural networks, on multiple local datasets contained in local nodes without explicitly exchanging data samples. The general principle includes training local models on local data samples and exchanging parameters (e.g., the weights and biases of a deep neural network) between these local nodes at some frequency to generate a global model shared by all nodes.

Federated Reinforcement Learning (FRL) enables multiple actors to build a common, robust machine learning model without sharing data, thus addressing critical issues such as data privacy, data security, data access rights and access to heterogeneous data.

A microgrid (MG) is a small network of electricity users with a local source of supply that is usually attached to a centralized national grid but is able to function independently, e.g., as a single controllable entity. Microgrids that include households typically range in size from 100 kW to 10 MW.

Reinforcement Learning (RL), as is known in the art, is about learning the optimal behavior in an environment to obtain maximum reward. This optimal behavior is learned through interactions with the environment and observations of how it responds.

State of Charge (SoC) is the level of charge of an electric battery relative to its capacity. SoC is usually expressed as percentage.

Time of Use (ToU) is the time of day that electricity is being used.

Renewable Energy Sources (RES) include wind, solar, hydropower, geothermal, biofuel, that are naturally replenished and preferably do not run out.

Figure 3:
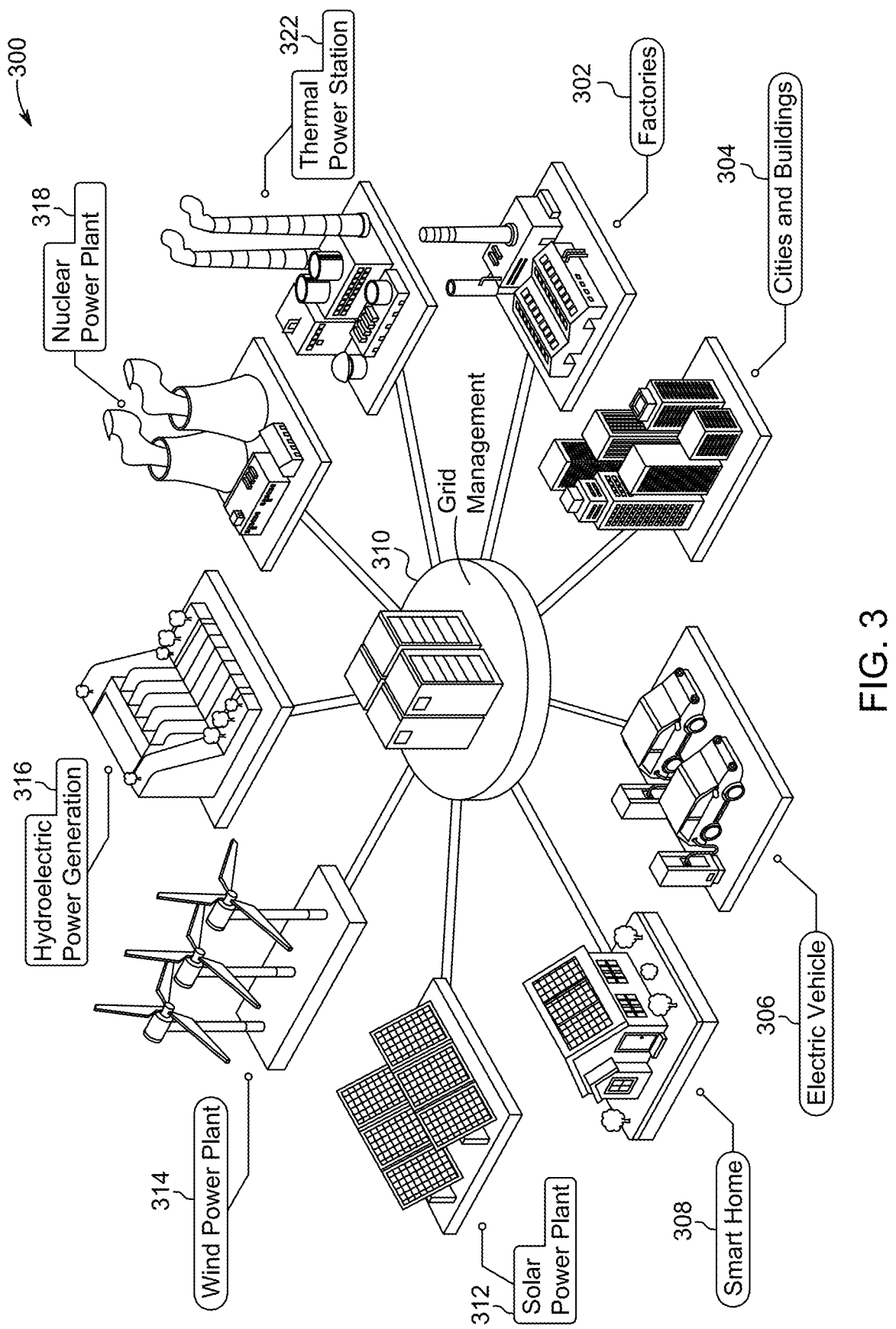
FIG. 3 illustrates a smart grid.

One approach to controlling a power grid having renewable energy sources is to incorporate a grid management system, generally referred to as a smart grid. FIG. 3 illustrates a smart grid. See www.vectorstock.com/royalty-free-vector/smart-grid-system-diagram-isometric-vector-34477024. A smart grid may include a grid management system 310 that manages energy production by solar power farms 312, wind power farms 314, hydroelectric power plants 316, nuclear power plants 318, fossil fuel power plants 322, load from factories and businesses 302, load from cities and buildings 304, load from charging electric vehicles 306, and smart homes 308. However, smart grid management has its own problems. The scattered heterogeneous data throughout the system makes it hard to manage the diverse system.

Figure 4:
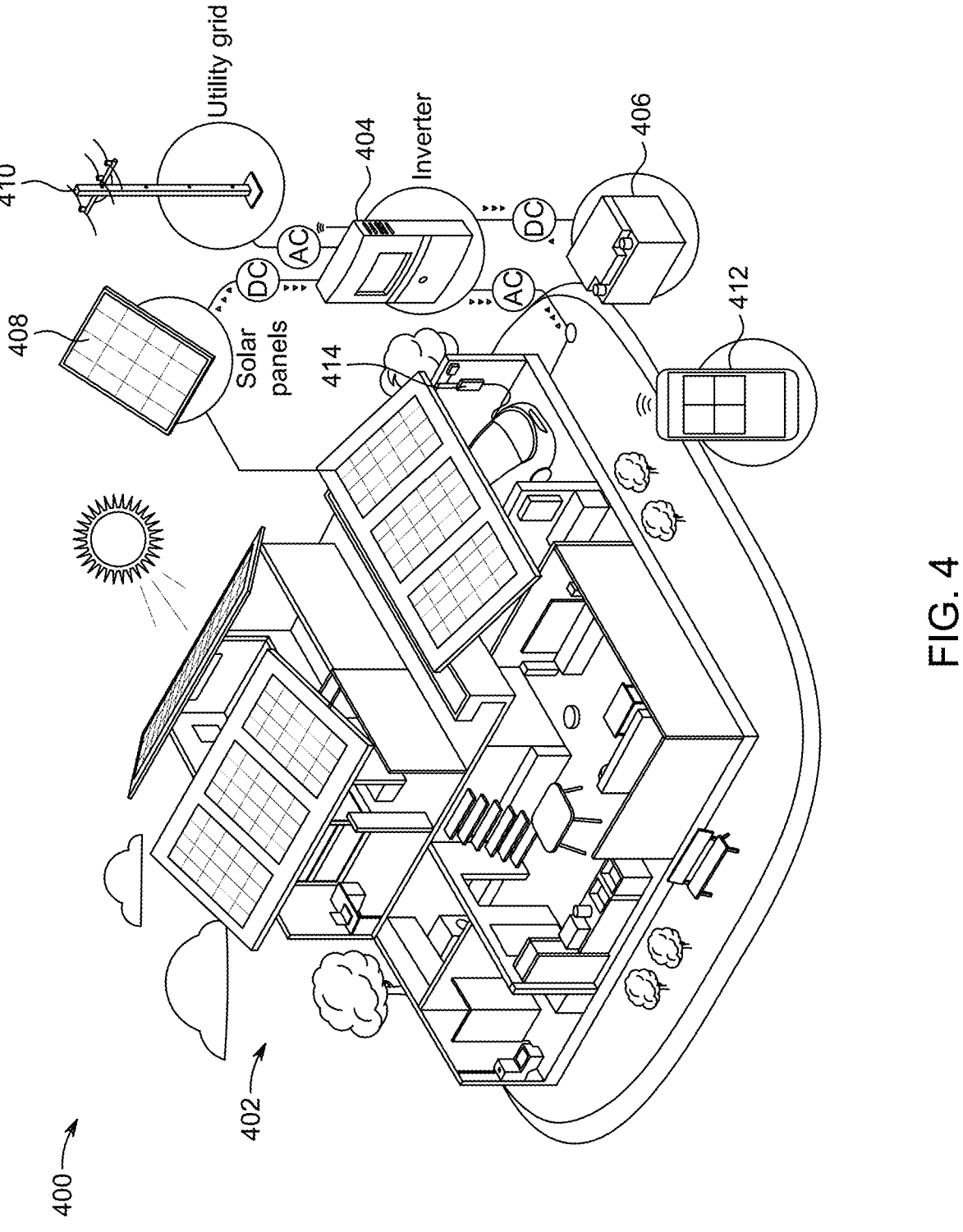
FIG. 4 illustrates a smart home.

FIG. 4 illustrates a smart home. See stock.adobe.com/at/images/solar-cell-house-installer-hybrid-component-system-for-smart-home-solar-panel-inverter-and-battery-in-house-diagram-isometric/542110050. A smart home 402 can produce its own renewable energy and control energy usage in order to meet its needs with minimal impact on carbon emissions. Renewable energy sources do not match energy demand, so a typical smart home 402 can store energy in a battery array 406. An inverter 404 changes the energy from renewable sources into energy suitable for household electricity, typically changing from DC to AC. In the case of a smart home 402, one type of renewable energy is solar, which is handled by solar panels 408 (photovoltaic panels). A smart home 402 can include a monitor and control application 412 (e.g., mobile App) for monitoring energy usage and for remote control of electricity using devices, such as lighting, appliances, heating and air conditioning, to name a few. A smart home may be equipped for a charging station 414 for charging an electric vehicle.

Figure 5:
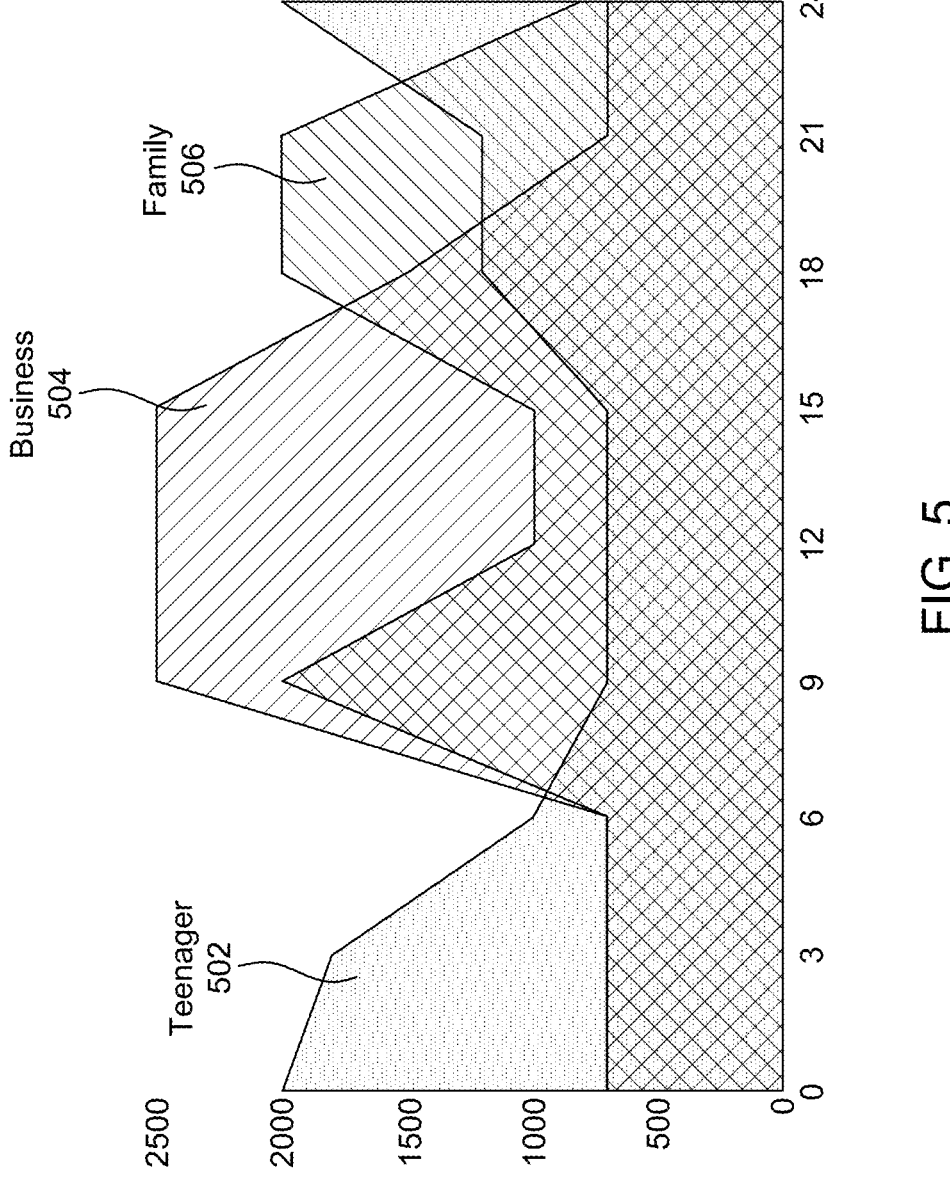
FIG. 5 illustrates energy usage profiles in a smart home.

FIG. 5 illustrates energy usage profiles in a smart home. A household will typically have energy usage that is based on who is at the house and how the house is used during the day. For example, if a household is used for business, home-office, purposes 504, there may be energy usage throughout the day. If a household has teenagers 502, there may a peak usage during late night and/or early morning periods, when the teenagers are at home. General family 506 usage may be greatest during the early evening hours.

A control approach for smart grid management includes model-based control, which takes the form of mathematical equations that describe the physical process. An example model-based control approach is Model Predictive Control. Another control approach is a data-driven, model-free method. An example data-driven approach is machine learning, in particular reinforcement learning. A further alternative control approach is a hybrid control approach. An example hybrid approach is fuzzy logic control.

Figure 6:
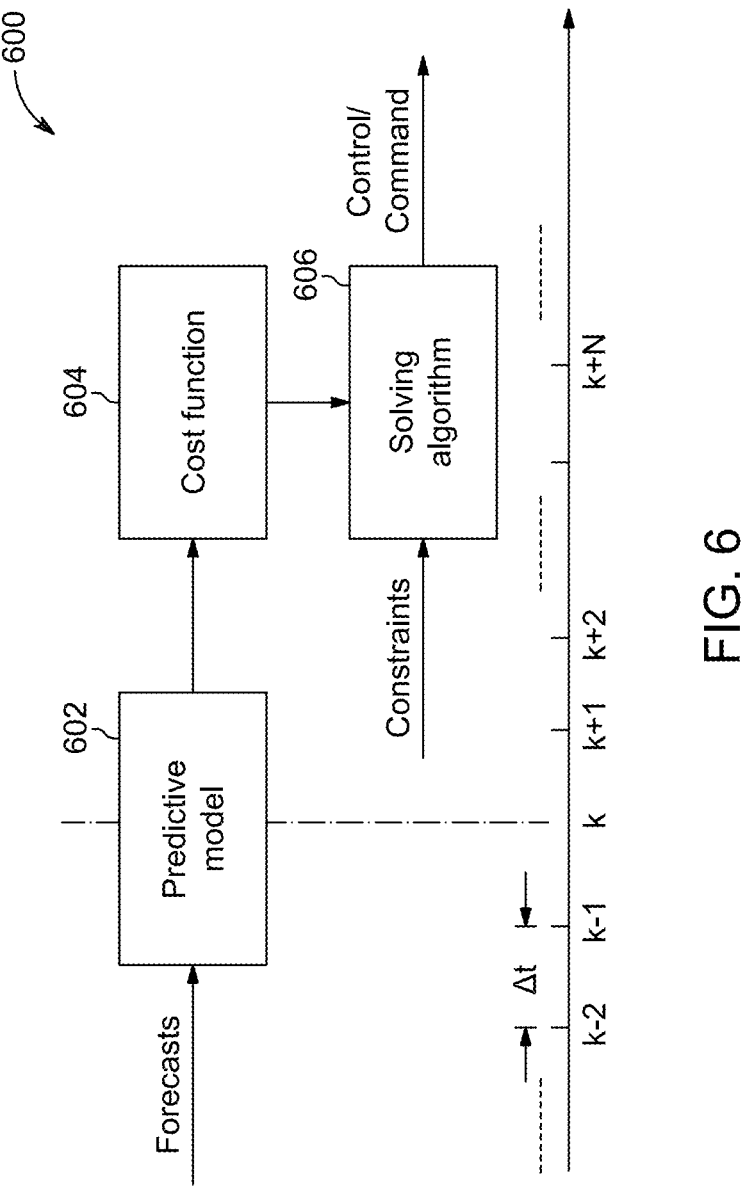
FIG. 6 is a block diagram of an overview of a MPC controller.

Model Predictive Control (MPC) is a conventional mathematical model approach to a control system. FIG. 6 is a block diagram of an overview of a MPC controller. See Jiefeng Hu and Yinghao Shan and Josep M. Guerrero and Adrian Ioinovici and Ka Wing Chan and Jose Rodriguez, Model predictive control of microgrids—An overview, Renewable and Sustainable Energy Reviews, Vol. 136, pages 110422, 2021. An MPC controller 600 includes a predictive model 602, a cost function 604, and the solution algorithm 606. An MPC controller 600 does not need historical data and can output a near optimal solution. However, a MPC controller 600 is complex and difficult to design and implement. It is especially difficult to make changes to accommodate for hardware changes, including degradation due to wear and tear, and/or hardware failure. An MPC controller 600 can be computationally intensive, making the approach generally unsuitable for small or embedded microgrids.

Figure 7:
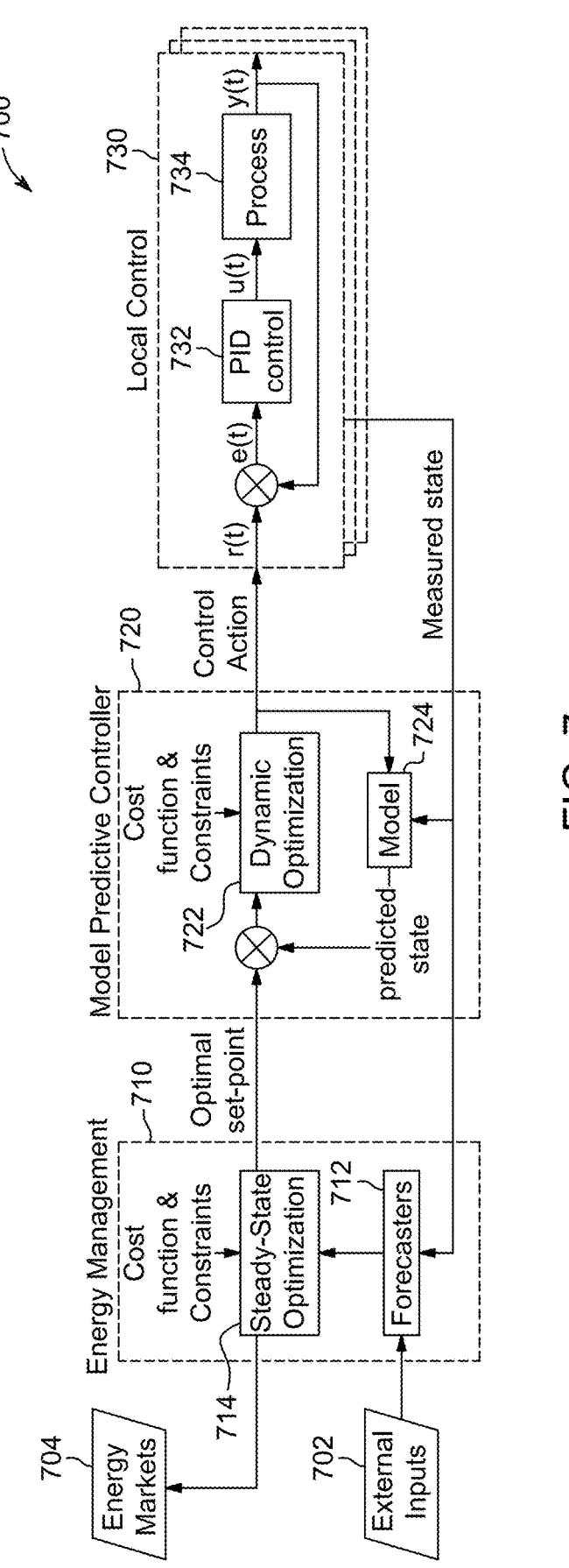
FIG. 7 is a flow diagram of a MPC control approach for grid management.

FIG. 7 is a flow diagram of a MPC control approach for grid management. The approach 700 includes an input 702 to receive external inputs from the smart grid and an output to external markets 704. The external inputs 702 are input to forecasters 712. The results of the forecasters 712 are fed to the steady state optimization function 714. The optimization function 714 produces an optimal set point. The model predictive controller 520 takes the optimal set point and runs a dynamic optimization 722 and a model 724 to iterate a predicted state. The model predictive controller 720 generates a control action for a number of local controls 730. Each local control 730 includes a control function, e.g., PID control 732, to control a process 734. A measured state is fed back to the forecasters 712.

The data-driven approach involves creating specific energy systems controlled by machine learning models, which optimize the usage of the available resources. See José R. Vázquez-Canteli, Stepan Ulyanin, Jérôme Kämpf, and Zoltán Nagy. Fusing TensorFlow with building energy simulation for intelligent energy management in smart cities. *Sustainable Cities and Society*, 45:243-257, 2019. ISSN 2210-6707. doi:

doi.org/10.1016/j.scs.2018.11.021, incorporated herein by reference in its entirety. A type of machine learning model that can be applied to control microgrids is reinforcement learning.

Figure 8:
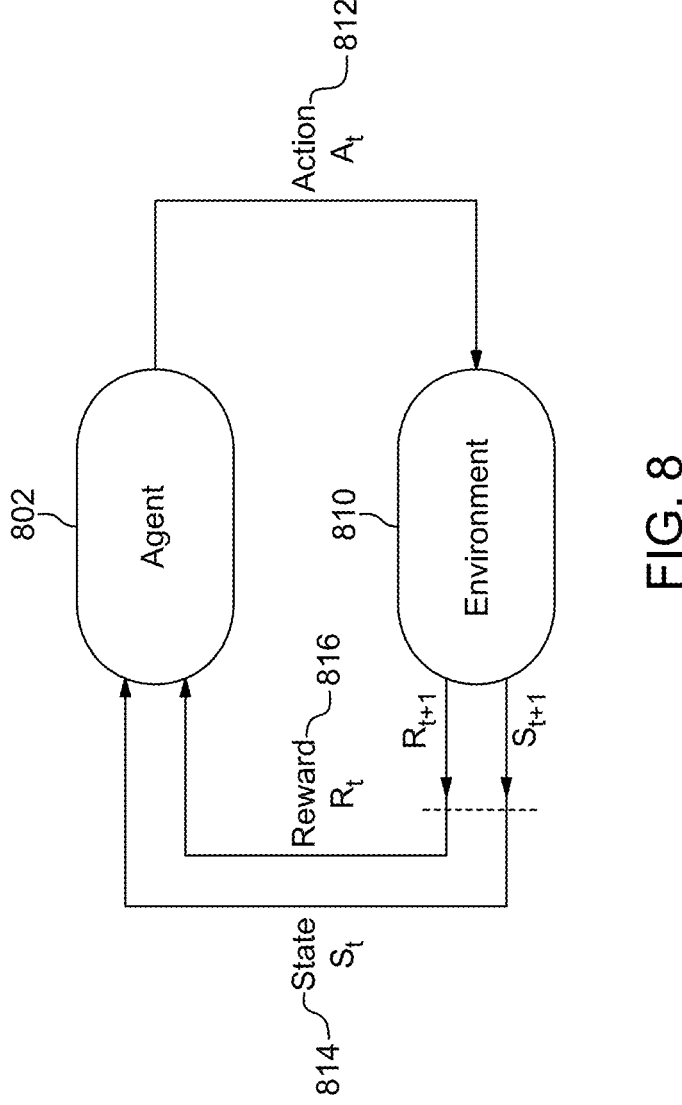
FIG. 8 A basic Reinforcement Learning arrangement.

A basic Reinforcement Learning arrangement is shown in FIG. 8. See Sutton, Richard S. and Barto, Andrew G., Reinforcement Learning: An Introduction, The MIT Press, 2018. In Reinforcement Learning, an Agent network 802 learns to perform actions 812 for an environment 810. The Agent 802 is an entity that interacts with an environment 810 by perceiving its surroundings via sensors, then acting through actuators and effectors. As the Agent 802 interacts with the environment 810 through sensing, reasoning and action, the environment changes to a state 814 and can generate a reward 816 for the state change that resulted from the action. For purposes of this disclosure, an agent is a machine learning model, preferably a multi-layered neural network.

Figure 9:
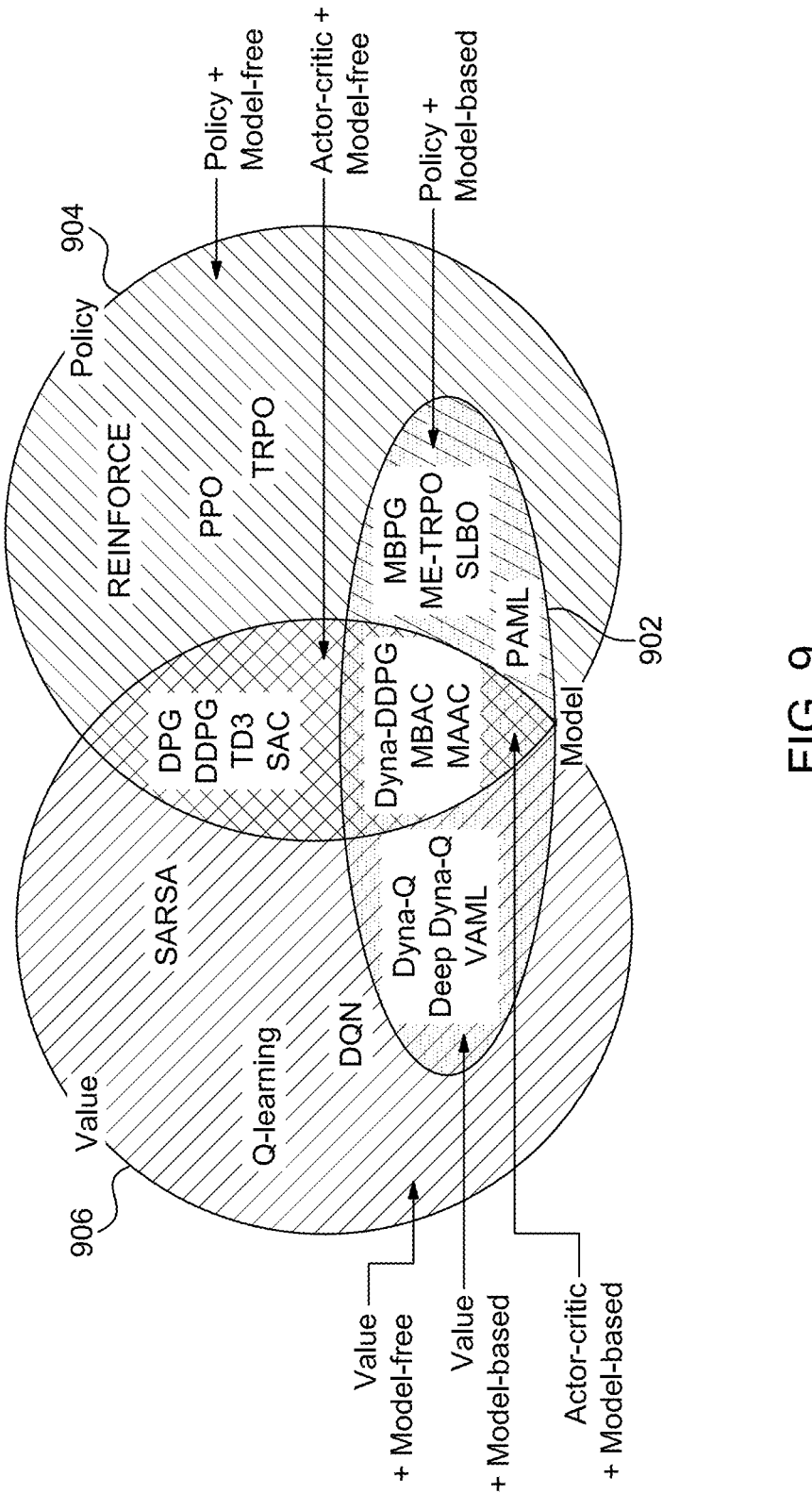
FIG. 9 is a Venn diagram that groups approaches to implement a reinforcement learning algorithm.

Various reinforcement learning approaches have evolved from some of the original value-based approaches, to include a policy and a model. FIG. 9 is a Venn diagram that groups approaches to implement a reinforcement learning algorithm. See Silver, David, UCL course on RL, 2015, www0.cs.ucl.ac.uk/staff/d.silver/web/Teaching.htmlURL www.youtube.com/playlist. Three groups of approaches to implement reinforcement learning algorithms include Value-based 906, Policy-based 904 and Model-based 902. A Policy-based reinforcement learning method involves a policy that the action performed in every state helps to gain maximum reward in the future. Two types of policy-based methods are deterministic and stochastic. In deterministic methods, for any state, the same action is produced by the policy. In stochastic methods, every action has a certain probability, which is determined by a stochastic policy. In a value-based reinforcement learning method, the model tries to maximize a value function. The agent is expecting a long-term return of the current states under a policy. In a model-based reinforcement learning method, the model is a virtual model for each environment. The agent learns to perform in that specific environment.

The overlap of Policy-based and Value-based includes an Actor-critic that is model-free. An overlap of Policy and Model includes a Policy-based and model-based. A Value-based category itself is a Value and Model-free. An overlap of Value-based and Model-based is Value and Model-based. An Actor-critic and Model-based approach is in a classification that is an overlap of Value-based, Model-based, and Policy-based.

In the present disclosure, consideration has been given as to the effect of the integration of stochastic DER, such as solar panels, on the performance of reinforcement learning algorithms in MG control. In embodiments, a RL approach has been determined to meet each layer's objective. Layer 1 household agents can seek to reduce their energy bill by managing a storage system at home. In Layer 2, the MG agents can define trading prices in a microgrid, aiming to reduce the carbon emission by promoting energy exchange within neighboring houses. Finally, layer 3 can encourage energy exchange between microgrids by setting exchange prices and ensuring that the distribution system's physical constraints are respected.

Figure 10:
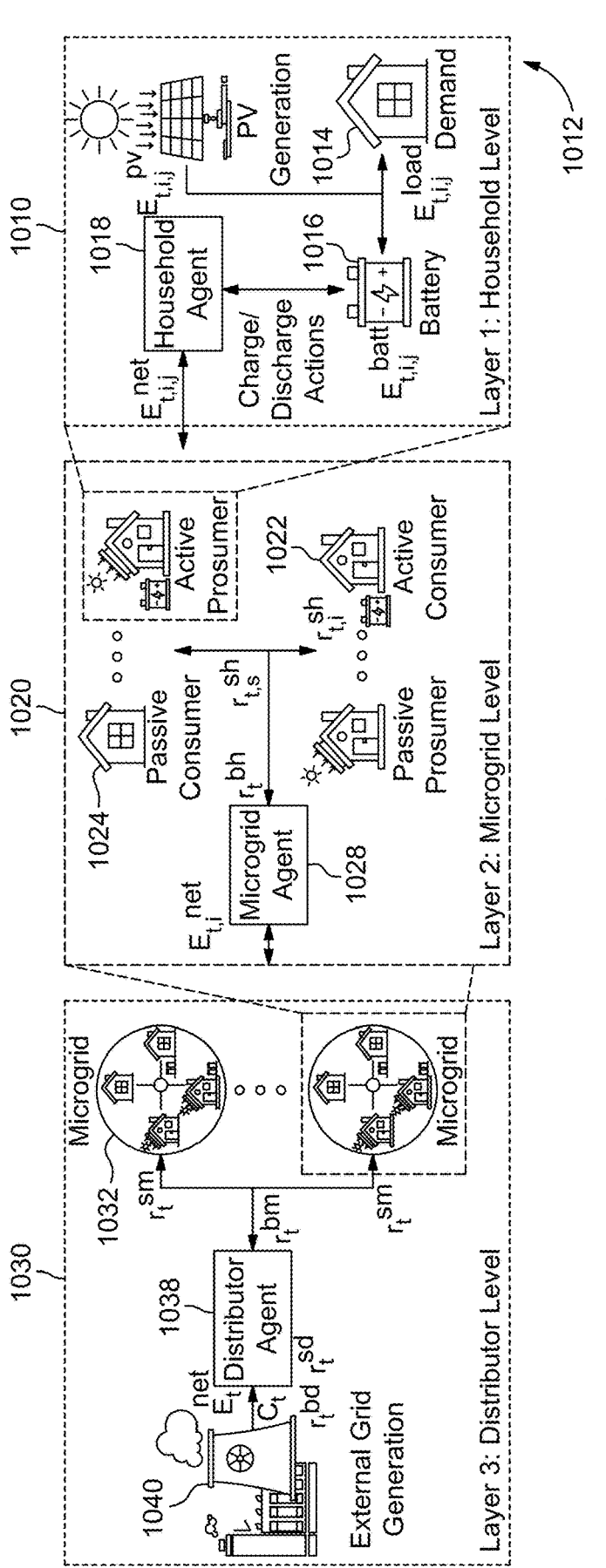
FIG. 10 a three-layer hierarchical RL architecture.

A RL approach that can achieve these objectives has a three-layer hierarchical RL architecture, as shown in FIG. 10. Each layer has its own set of agents, each set with different objectives, pursued greedily. In other words, each layer gives priority to pursuing its own objectives. In this framework, a set of G microgrids 1032 is denoted as $M=\{m_1, m_2, \ldots m_i, \ldots m_G\}$; a group of $D_i$ households 1022, 1024 belonging to a microgrid i is denoted as $H_i=\{h_{i,1}, h_{i,2} \ldots, h_{i,j}, \ldots, h_{i,D_i}\}$, the current time step is denoted as t.

1. First Layer: Household

In the household layer 1010, there are four different cases: 1) households that have no access to any energy asset being only able to consume ("passive consumers" 1024); 2) households that have access to photovoltaic panels to produce electricity during day-hours ("passive prosumers"); 3) prosumer households that have access to batteries which allow them to have energy dispatch capabilities ("active prosumers"); and 4) consumer households who also have access to photovoltaic panels as well as energy storages which provide them the potential to sell surplus energy back to the microgrid ("active consumers" 1022). Households without batteries ("passive consumers" or "passive prosumers") do not need to execute control actions as they do not have such capabilities to react to energy fluctuations (e.g., due to climate change changes). In contrast, those "actionable" agents 1018 (active prosumers, active consumers) can take action to charge and discharge the batteries 1016 and can affect the demand and supply in the microgrid. Based on the above logic, the equations of this layer are as follows:

$$E^{st}_{t,i,j} = E^{imp1}_{t,i,j} + E^{imp2}_{t,i,j} + E^{imp3}_{t,i,j} \quad (1)$$

$$E^{sp}_{t,i,j} = E^{exp1}_{t,i,j} + E^{exp2}_{t,i,j} + E^{exp3}_{t,i,j} \quad (2)$$

$$E^{net}_{t,i,j} = E^{st}_{t,i,j} - E^{sp}_{t,i,j} = E^{load}_{t,i,j} - E^{pv}_{t,i,j} \pm E^{batt}_{t,i,j} \quad (3)$$

TABLE 1

Table of defined symbols

| | L1: Household | L2: Microgrid | L3: Distribution | Type | Unit |
|---|---|---|---|---|---|
| Net | $E^{net}_{t,i,j}$ | $E^{net}_{t,i}$ | $E^{net}_t$ | Energy | Wh |
| Demand | $E^{load}_{t,i,j}$ | | | Energy | Wh |
| PV Gen | $E^{pv}_{t,i,j}$ | | | Energy | Wh |
| Battery | $E^{batt}_{t,i,j}$ | | | Energy | Wh |
| Shortage | $E^{st}_{t,i,j}$ | $E^{st}_{t,i}$ | $E^{st}_t$ | Energy | Wh |
| Surplus | $E^{sp}_{t,i,j}$ | $E^{net}_{t,i}$ | $E^{sp}_t$ | Energy | Wh |
| L1 Import | $E^{imp1}_{t,i,j}$ | | | Energy | Wh |
| L1 Export | $E^{exp1}_{t,i,j}$ | | | Energy | Wh |
| L2 Import | $E^{imp2}_{t,i,j}$ | $E^{imp2}_{t,i}$ | | Energy | Wh |
| L2 Export | $E^{exp2}_{t,i,j}$ | $E^{imp2}_{t,i}$ | | Energy | Wh |
| L3 Import | $E^{imp3}_{t,i,j}$ | $E^{imp3}_{t,i}$ | $E^{imp3}_t$ | Energy | Wh |
| L3 Export | $E^{exp3}_{t,i,j}$ | $E^{imp3}_{t,i}$ | $E^{imp3}_t$ | Energy | Wh |
| Emission | — | — | $C_t$ | GHG | $CO_2$/Wh |
| Sell | $r^{sh}_{t,i}$ | $r^{sm}_t$ | $r^{sd}_t$ | Price | \$/Wh |
| Buy | $r^{bh}_{t,i}$ | $r^{bm}_t$ | $r^{bd}_t$ | Price | \$/Wh |

Where "st" is shortage and "sp" is surplus. In the case of consumer households with no photovoltaic panel (passive consumers), the generation $$E^{pv}_{t,i,j} = 0.$$

When $$E^{net}_{t,i,j} \geq 0$$

(called "shortage" state), it means there is extra energy needed from external sources (e.g., retailers or other households). When $$E^{net}_{t,i,j} < 0$$

(called "surplus" state), there is surplus energy available to sell back to the external power grid or other households in shortage. The equation (3) presents a constraint that should be satisfied as it is impossible to have both scenarios simultaneously. Finally, the objective function of this layer is:

$$\min \begin{cases} E^{imp3}_{t,i,j}\left(r^{sd}_t + c_t\right) + E^{imp2}_{t,i,j} r^{sm}_{t,i} + E^{imp1}_{t,i,j} r^{sh}_{t,i}, & \text{if } E^{net}_{t,i,j} \geq 0, \\ E^{exp3}_{t,i,j} r^{bd}_t + E^{exp2}_{t,i,j} r^{bm}_{t,i} + E^{exp1}_{t,i,j} r^{bh}_{t,i}, & \text{if } E^{net}_{t,i,j} < 0. \end{cases} \quad (4)$$

The objective function is a greedy function. Each household agent takes actions to maximize its own rewards, i.e., seeks to minimize cost of energy usage by prioritizing utilization of its own batteries and/or renewable energy source for its energy. At the same time, a household agent is rewarded by sale of energy to other households in a microgrid.

Household Agent 1018 (State, Action, Reward):

Households 1012 can obtain energy from a renewable energy source, e.g., photovoltaic cells 1014, or batteries 1016. The household agent 1018 maintains a state, based on the battery state of charge, $$\left\{t, B^{soc}_{t,i,j}\right\}$$

and performs an action, $$E^{batt}_{t,i,j} \in \left[-\beta^{dch\cdot max}_{i,j}, \beta^{ch\cdot max}_{i,j}\right]$$

including a range of fully discharging a battery to fully charging a battery.

The reward is reflected in a solution of the objective function (4) in terms of a price for selling energy to other households in the microgrid in the face of utilizing its own energy from renewable sources.

11

2. Second Layer: Microgrid

In the second layer 1020, a microgrid agent defines the sell price $$r_{t,i}^{sh}$$

and the buy price $$r_{t,i}^{bh}$$

for energy exchange between households in a microgrid. Its objective is greedy as the layer maximizes the use of local energy within the microgrid by defining the pricing policy for local transactions. The pricing policy is such that it encourages energy exchange between households within the microgrid. The objective is represented as the following equations:

$$E_{t,i}^{st} = E_{t,i}^{imp2} + E_{t,i}^{imp3}, E_{t,i}^{imp2} = \sum_j E_{t,i,j}^{imp2}, E_{t,i}^{imp3} = \sum_j E_{t,i,j}^{imp3}, \quad (5)$$

$$E_{t,i}^{sp} = E_{t,i}^{exp2} + E_{t,i}^{exp3}, E_{t,i}^{exp2} = \sum_j E_{t,i,j}^{exp2}, E_{t,i}^{exp3} = \sum_j E_{t,i,j}^{exp3}, \quad (6)$$

$$E_{t,i}^{net} = E_{t,i}^{sp} - E_{t,i}^{st}. \quad (7)$$

Where "st" is storage and "sp" is surplus. A microgrid will experience an energy shortage state when the local energy is insufficient to cover the internal demand and will experience an energy surplus state when the distributed generation surpasses the internal demand. In the first case, a microgrid could access energy available in other microgrids. In the second case, it could sell energy to other microgrids experiencing a shortage. If energy is unavailable/over-produced at the current microgrid layer, it will be imported or exported to the third layer (distributor). With this, the second layer's objective function is represented as the following equation:

$$\min \begin{cases} E_{t,i}^{imp3} \left( r_t^{sd} + c_t \right) + E_{t,i}^{imp2} r_t^{sm}, & \text{if } E_{t,i}^{net} \geq 0, \\ E_{t,i}^{imp3} r_t^{bd} + E_{t,i}^{exp2} r_t^{bm}, & \text{if } E_{t,i}^{net} < 0. \end{cases} \quad (8)$$

Microgrid Agent 1028 (State, Action, Reward):

In a microgrid, each home is electrically interconnected to each other and has independent and different load profiles and DERs. When a microgrid is in shortage, it can access energy available in neighboring microgrids.

The microgrid agent 1028 maintains a state of energy surplus or energy shortage, $$\{t, E_{t,i}^{sp}, E_{t,i}^{st}\}$$

and performs an action of accessing energy from other microgrids or selling energy to other microgrids, $$\alpha_i \in [0, 1] \; \beta_i \in [0, 1]$$

12

The reward is reflected in a solution of the objective function (8) for utilizing local energy that includes energy from renewable sources and selling energy to other microgrids.

2.3 Third Layer: Distributor

In the third layer 1030, the distributor agent tries to shape the overall load among the multiple microgrids 1032, encouraging energy trading and simultaneously minimizing the carbon emission by setting the buy $$\left( r_t^{bm} \right)$$

and sell $$\left( r_t^{sm} \right)$$

prices of energy exchanged between the microgrids 1032. The prices for selling energy $$\left( r_t^{sd} \right)$$

and accepting surplus $$\left( r_t^{bd} \right)$$

from outside the microgrids are not controlled in this layer and are treated as external inputs (from the second layer). To define the objective function of the distributor, the following is first defined:

$$E_t^{st} = E_t^{imp3} = \sum_i E_{t,i}^{imp3} \quad (9)$$

$$E_t^{sp} = E_t^{exp3} = \sum_i E_{t,i}^{exp3} \quad (10)$$

$$E_t^{net} = E_t^{st} - E_t^{sp} = E_t^{imp3} - E_t^{exp3} \quad (11)$$

Where "st" is shortage and "sp" is surplus. Then, the distributor's objective function is defined as follows:

$$\min \begin{cases} E_t^{imp3} \left( r_t^{sd} + c_t \right), & \text{if } E_t^{net} \geq 0, \\ E_t^{exp3} r_t^{bd}, & \text{if } E_t^{net} < 0. \end{cases} \quad (12)$$

In addition, in an embodiment there is only one distributor and the energy consumed within or between microgrids has negligible carbon impact. A simple local energy market can be implemented based on the physical distance between the household and the microgrids.

Distributor Agent 1038: (State, Action, Reward):

A Distributor has several customers aggregated in microgrids. The objective of the distributor agent at this level is to minimize its costs while maintaining the grid's stability.

The distributor agent 1038 maintains a state of energy storage or energy surplus, $$\{t, E_{t,i}^{sp}, E_{t,i}^{st}\}$$

and performs an action, $$\alpha \in [0, 1] \; \beta \in [0, 1]$$

Of supplying energy to the grid. The reward is reflected in a solution of the objective function (12) which includes minimizing energy supply from non-renewable energy sources.

Figure 11:
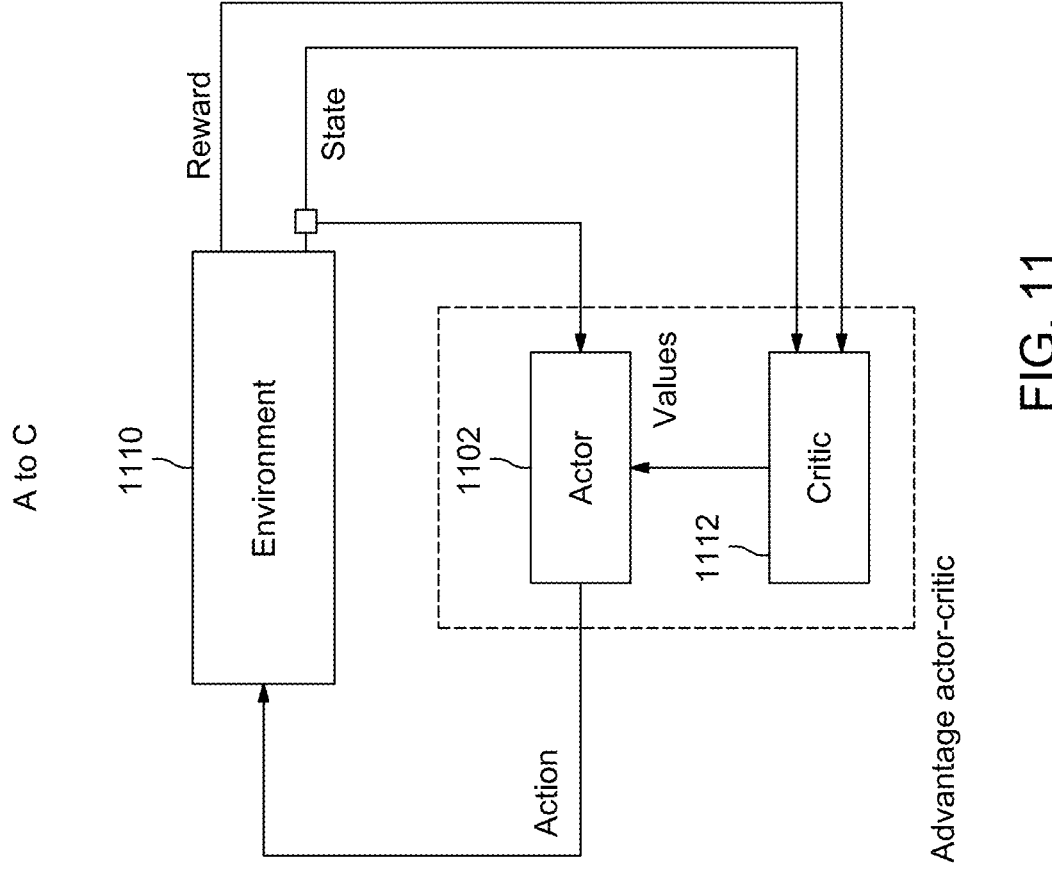
FIG. 11 is a flow diagram of the Advantage Actor-Critic approach to implementing reinforcement learning.

FIG. 11 is a flow diagram of the Advantage Actor-Critic approach to implementing reinforcement learning. See Diederichs, Elmar, Reinforcement Learning—A Technical Introduction, Journal of Autonomous Intelligence, Vol. 2, page 25, 2019. In this approach, the objective of the agent is to maximize the probability of having the trajectories that show the higher sum reward. Defined as:

$$J(\theta) = E_{\pi_\theta}\left[\sum_t \gamma^t r_t\right] \tag{13}$$

It can be understood as the expected sum of the discounted rewards obtained by completing one episode following a defined policy $\pi_\theta$. The factor $\gamma$ helps prevent the sum from going infinite and gives more relevance to the rewards obtained in the short term. The idea of this RL method is to maximize equation (13) using stochastic gradient ascent. By using the definition of expectation, the policy gradient is defined as:

$$\nabla_\theta J(\theta) = E_{\tau \sim \pi_\theta(\tau)}\left[\left(\sum_{t=1}^T \nabla_\theta \log \pi_\theta(a_t|s_t)\right)\left(\sum_{t=1}^T r(s_t, a_t)\right)\right] \tag{14}$$

In A2C, an estimator (a neural network) is used to represent the policy $\pi_\theta(a_t|s_t)$, named Actor 1102. The Actor 1102 will map the states to the actions and, from this, will learn which are optimal. Its training follows the next steps:

Sample i trajectories $\tau^i$ using the actor policy.
Assuming the policy gradient definition in equation (14).
Updating the weights $\theta$ of the policy as follows: $\theta \leftarrow \theta + a\nabla_\theta J(\theta)$.
Sequentially running multiple trajectories is a long process. For that reason, batch training is generally implemented to speed up the learning of the policy estimator 1102. By doing so, the exploration speed increases, modifying the equation 14 as follows:

$$\nabla_\theta J(\theta) \approx \frac{1}{N}\sum_{i=1}^N \sum_{t=1}^T\left[\nabla_\theta \log \pi_\theta(a_t^i|s_t^i)\left(\sum_{t=1}^T r(s_t^i, a_t^i)\right)\right] \tag{15}$$

However, by doing so, an issue is added: The variance of $\nabla_\theta J(\theta)$ increases. To help solve this, the Advantage action is introduced. First, start by understanding that the term

14

$$\sum_{t=1}^T r(s_t^i, a_t^i)$$

is the empirical value of the Q(s, a) function, as it represents the expected reward can be obtained from doing an action $a_t$ while in state $s_t$. Finding a value V independent of the neural network parameters $\theta$, subtract it from the Q function to re-calibrate the rewards towards the average action. Thus, the advantage function is defined as:

$$A^\pi(s_t, a_t) = Q^\pi(s_t, a_t) - V^\pi(s_t) \tag{16}$$

The algorithm A2C gets its name from the use of the advantage function 16, and the addition of an extra neural network (the Critic 1112) that approximates $V^\pi(s_t)$ and will be trained with the experienced $Q^\pi(s_t, a_t)$. In other words, the critic 1112 evaluates the actions taken by the actor 1102 on the environment 1110 and approximates the corresponding values.

Figure 12:
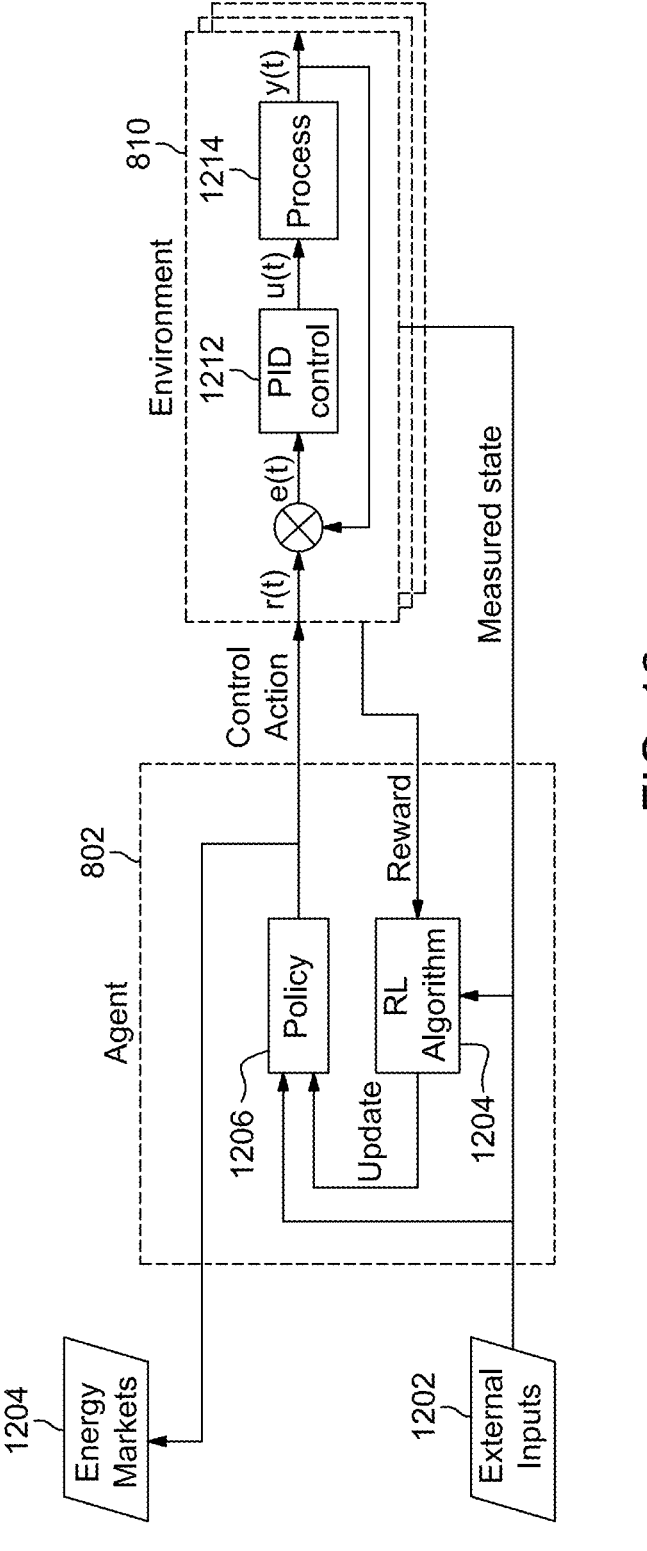
FIG. 12 is a flow diagram of a A2C reinforcement learning control approach for grid management.

FIG. 12 is a flow diagram of a A2C reinforcement learning control approach for grid management. The approach 1200 includes an input 1202 to receive external inputs from the smart grid and an output to external markets 1204. The external inputs 1202 are input to a reinforcement learning algorithm 1204. The results of the ML algorithm 1204 are fed to the Policy function 1206. The Policy 1206 produces an optimal control action. The agent 602 takes the optimal control action on the environment 610 to iterate a predicted state. The Agent 602 generates a control action for a number of environments 610. Each environment 610 includes a control function, e.g., PID control 1012, to control a process 1014. A measured state is fed back to the RL algorithm 1204.

Figure 13:
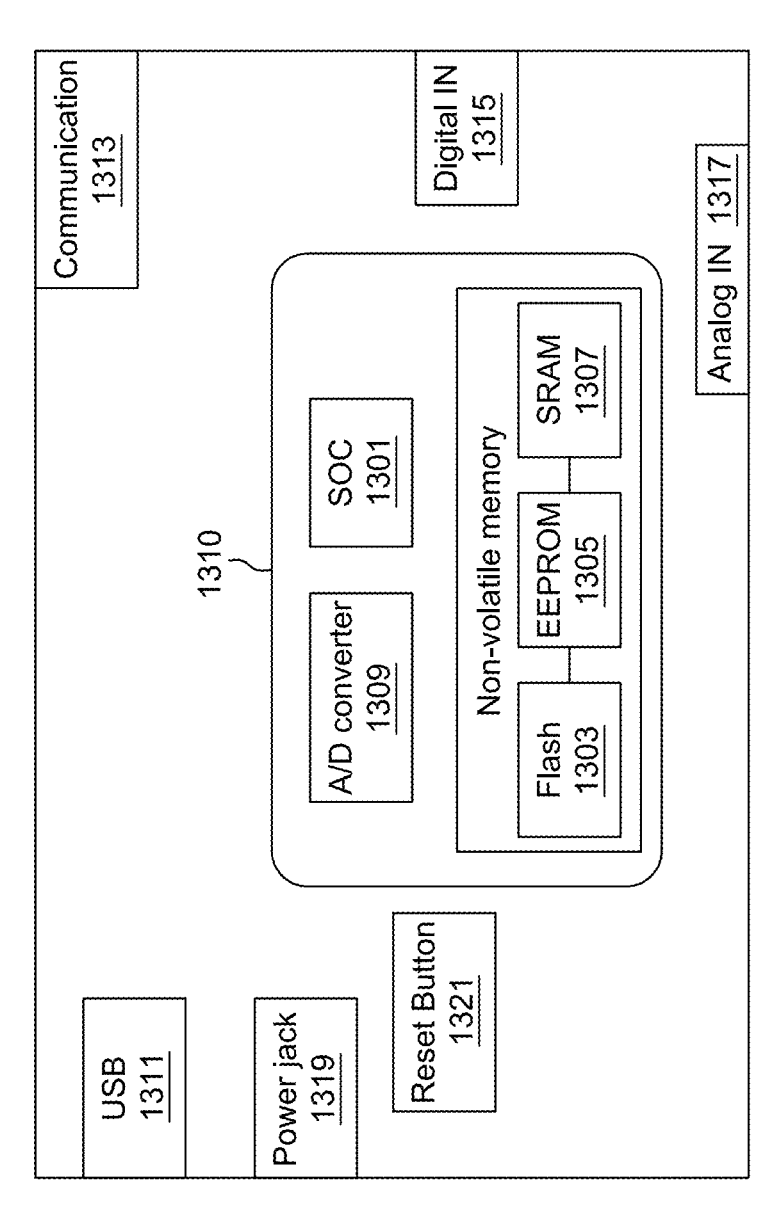
FIG. 13 is a block diagram of a hardware implementation for performing a control approach.

FIG. 13 is a block diagram of a hardware implementation for performing a control approach.

The computer-based control system 101 may be based on a microcontroller. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, the computer-based system 101 is an integrated circuit board 101 with a microcontroller 1310. The board includes digital I/O pins 1315, analog inputs 1317, hardware serial ports 1313, a USB connection 1311, a power jack 1319, and a reset button 1321. It should be understood that other microcontroller configurations are possible. Variations can include the number of pins, whether or not the board includes communication ports or a reset button.

The microcontroller is a 8-bit AVR RISC-based microcontroller having 256 KB flash memory 1303, SRAM 1307, EEPROM 1305, general purpose I/O lines, general purpose registers, a real time counter, six flexible timer/counters, a 16-channel 10-bit A/D converter 1309, and a JTAG interface for on-chip debugging. The microcontroller is a single SOC that achieves a throughput of 16 MIPS at 16 MHz and operates between 4.5 to 5.5 volts. The recommended input voltage is between 7-12V. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

Figure 14:
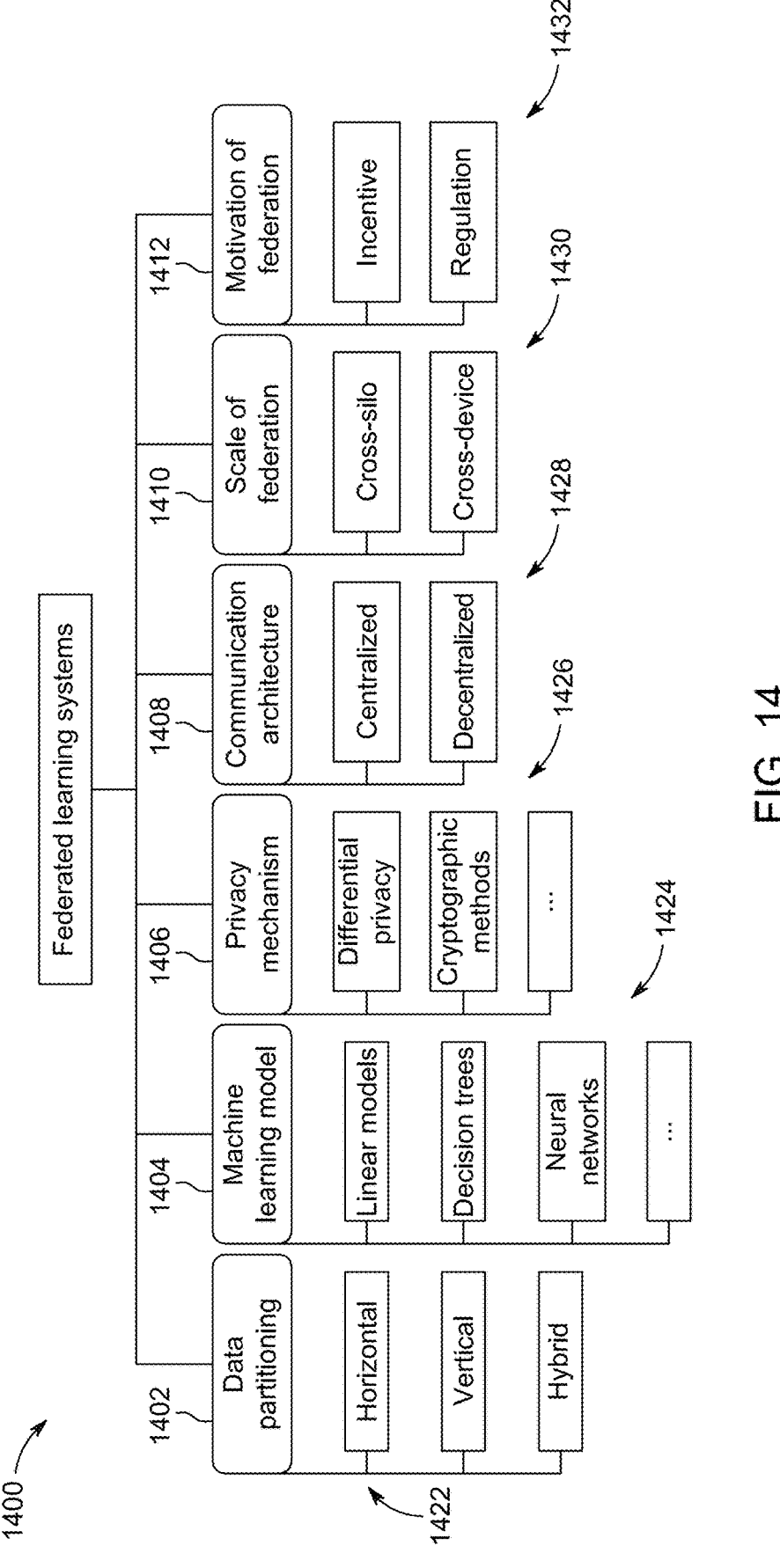
FIG. 14 is a chart of categories of Federated Learning Systems.

FIG. 14 is a chart of categories of Federated Learning Systems 1400. See Qinbin Li and Zeyi Wen and Zhaomin Wu and Sixu Hu and Naibo Wang and Xu Liu and Bingsheng He, A Survey on Federated Learning Systems: Vision, Hype and Reality for Data Privacy and Protection, CoRR, 2019.In general, federated learning systems involve multiple parties collaboratively training machine learning models without exchanging their raw data. The output of the learning system is a machine learning model for each party (which can be same or different). A typical federated learning system has a constraint that given an evaluation metric such as test accuracy, the performance of the model learned by federated learning should be better than the model learned by local training with the same model architecture.

Federated Learning Systems have developed with a wide variety of arrangements and features. In Federated Learning (FL) systems 1400, data partitioning 1402 can be Horizontal, Vertical, or a hybrid of Horizontal and Vertical.

In horizontal FL 1422, the datasets of different parties have the same feature space but little intersection on the sample space. This is a natural data partitioning especially for the cross-device setting, where different users try to improve their model performance on the same task using FL. Also, the majority of FL systems adopt horizontal partitioning. Since the local data are in the same feature space, the parties can train the local models using their local data with the same model architecture. The global model can simply be updated by averaging all the local models.

Federated Learning systems can be implemented using any of various types of Machine Learning Models 1404, including linear models, decision trees, and neural networks.

The most widely used machine learning model is neural network (NN) 1424, which achieves state-of-the-art results in many tasks such as image classification and word prediction.

Federated Learning systems can be configured with a privacy mechanism 1406 in order to protect the information that is exchanged between the local models and the global model. Privacy mechanisms 1406 can include differential privacy mechanisms that apply different levels of privacy, either by an opt-out decision or by design. Cryptographic methods 1426 can be applied to protect data from being detected by unauthorized parties.

Federated Learning systems can be implemented using a particular Communication Architecture 1408, including a centralized communication arrangement or a decentralized communication arrangement. In the centralized communication arrangement 1428, the data flow is often asymmetric, which means a manager aggregates the information (e.g., local models) from parties and sends back training results. The parameter updates on the global model are always done in this manager. The communication between the manager and the local parties can be synchronous or asynchronous.

The FedAvg Federated Learning algorithm is a centralized FL framework 1428. In each iteration, the server first sends the current global model to the selected parties. Then, the selected parties update the global model with their local data. Next, the updated models are sent back to the server. Last, the server averages all the received local models to get a new global model. FedAvg repeats this process until reaching a specified number of iterations. The global model is the final output.

Federated Learning systems can be implemented with different scales of federation 1410, including cross-silo and cross-device.

In cross-device FLS, the number of parties is relatively large and each party has a relatively small amount of data as well as computational power.

In the cross-device setting 1430, the manager is usually a powerful central server. It conducts the training of the global machine learning model and manages the communication between the parties and the server.

Federated Learning systems can be motivated 1412 by an incentive or controlled based on regulation. In the case of motivation by incentive 1432, the party that contributes more can benefit more from federated learning.

Figure 15:
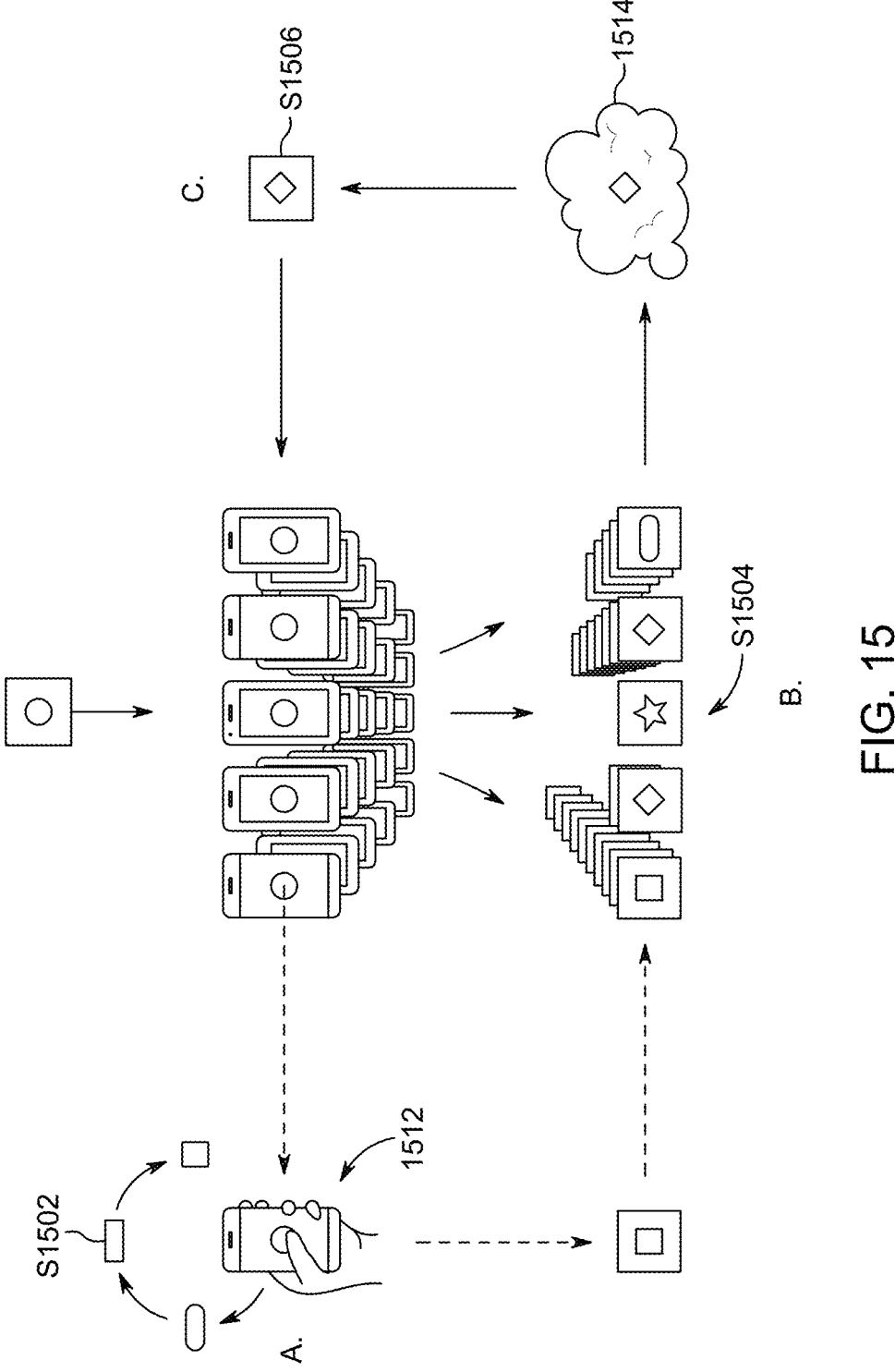
FIG. 15 illustrates one possible flow for federated learning.

FIG. 15 illustrates one possible flow for federated learning. See McMahan, Brendan and Ramage, Daniel and Research Scientists, Federated Learning: Collaborative Machine Learning without Centralized Training Data, 2017, ai.googleblog.com/2017/04/federated-learning-collaborative.html.

In an implementation of Federated Learning, machine learning can be implemented in a local device. Using Federated Learning, local devices can collaboratively learn a shared prediction model while keeping all the training data on the device. This goes beyond the use of local models that make predictions on local devices (like the Mobile Vision API and On-Device Smart Reply) by bringing model training to the device as well.

The Federated Learning is performed as steps in which, in Step S1502 the device 1512 downloads a current model, improves it by learning from data on the device, and then summarizes the changes as a small focused update. In Step S1504, only this update to the model is sent to the cloud 1514, using encrypted communication, where it is immediately averaged with other user updates to improve the shared model. All the training data remains on the device, and no individual updates are stored in the cloud. In Step S1506, the updated model is downloaded to the device 1512.

Figure 16:
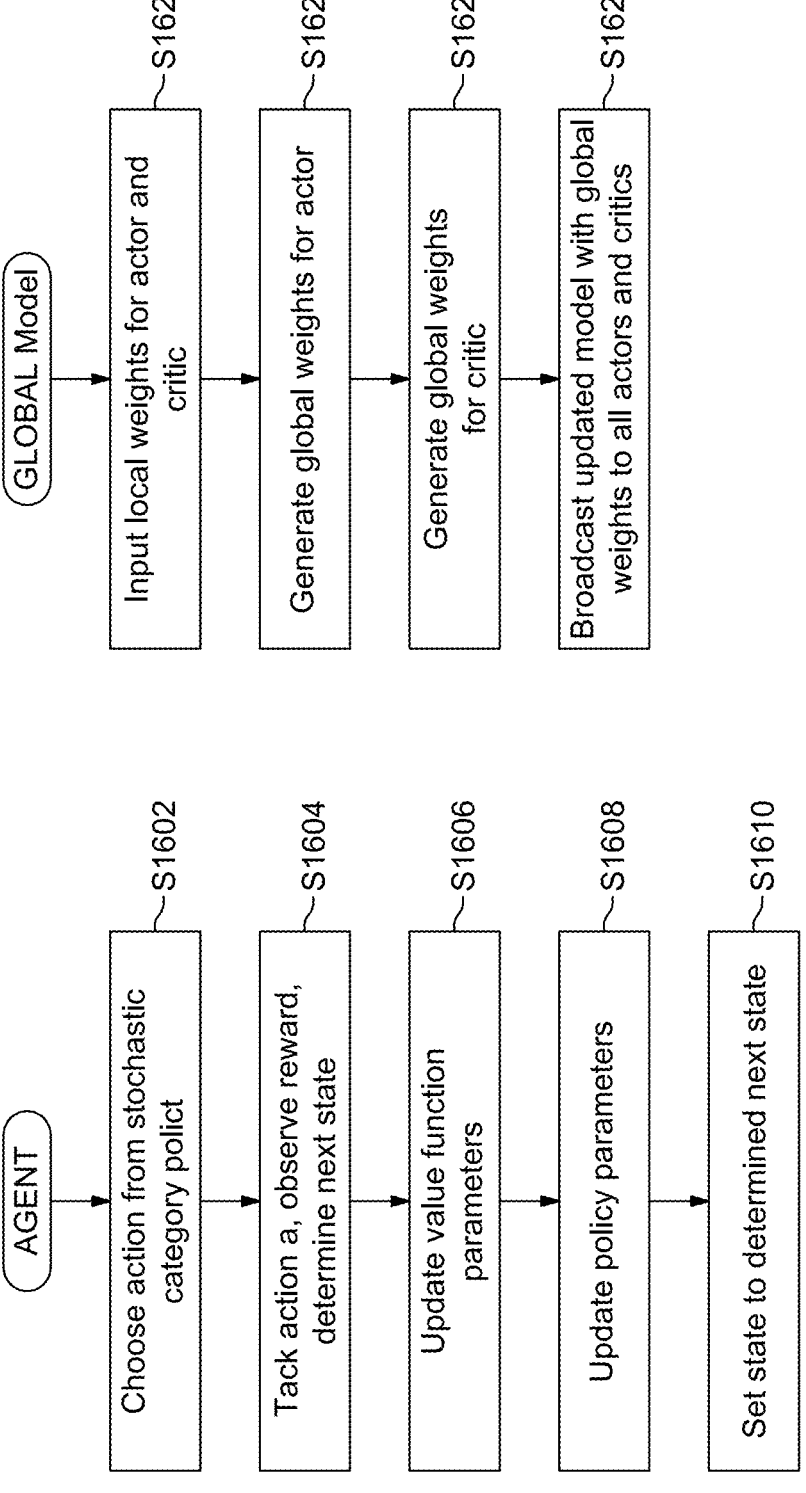
FIG. 16 is a flowchart for a federated learning method.

FIG. 16 is a flowchart for a federated learning method. In one embodiment, individual household agents perform an A2C Federated Learning algorithm. In step S1602, the agent chooses an action from a stochastic categorical policy. In S1604, the agent takes the chosen action, observes the reward, and determines the next state. In S1606, the agent updates value function parameters. In S1608, the agent updates policy parameters. In S1610, the agent sets the current state to the next state.

Federated learning can be performed using a FedAvg algorithm for A2C household agents. In S1622, a centralized machine learning computer conducts FedAvg for a global actor. In S1624, the centralized computer conducts FedAvg for a global critic. In S1626, the centralized computer broadcasts the updated model to all household actors and critics. In one embodiment, the broadcasting is performed periodically, for example, every hour, every day, every week, certain times per day, to name a few.

In one embodiment, the broadcasting can be performed after a predetermined number of training epochs, including 200, 500, etc.

In one embodiment, the broadcasting is performed based on the amount of data of actor and critic local weights that is received. As an example, the amount of data of actor and critic local weights may be a percentage of total households, such as 50%, 75%, etc. of total households.

The A2C FL algorithm is as follows.

---

Algorithm 2: Main A2C-FL algorithm.

---

Input: Policy $\pi_\theta$, value function $V_\phi$, learning rate $\alpha$, discount factor $\gamma$
Output: Optimal policy $\pi_{\theta*}$, optimal value function $V_\phi$.
Initialize $\theta$ and $\phi$ randomly, sync_ep = 500
for each episode do
 | Initialize state s
 | while s is not terminal do
 | | Choose action $\alpha$ from stochastic categorical policy $\pi_\theta(s)$
 | | Take action $\alpha$, observe reward r, and next state s' from rollout $\mathfrak{R}$.
 | | Update value function parameters: $\phi_{t+1} \leftarrow \phi_t - \beta \nabla_\phi (V_\phi(s_t) - R_t)^2$
 | | Update policy parameters: $\phi_{t+1} \leftarrow \theta + \alpha \delta V_\theta \log \pi_\theta$ (a|s)
 | | Set s $\leftarrow$ s'
 | end
 | if episode % sync..ep == 0 then

| | Upload actor and critic weights $\omega_h^a \wedge \omega_h^c$

| | syncweights, wait for algorithm $\mathfrak{Z}$
 | | Get updated local models $\omega_h{}^a \leftarrow \omega_G{}^a$; $\omega_h{}^c \leftarrow \omega_G{}^c$
 | end
end

---

Algorithm 3: FedAvg for A2C agents.

---

Input: actor and critic local weights $t$, $\omega_h^a \wedge \omega_h^c$, $\forall\, h \in MG$ Output: updated global weights actor and critic $\omega_G^a$, $\omega_G^c$ Parameters: number of households H;

Conduct *FedAvg* for actor $\omega_G^a \leftarrow \dfrac{1}{N}\sum_{i=0}^{N} \omega_h^a$ Conduct *FedAvg* for critic $\omega_G^c \leftarrow \dfrac{1}{N}\sum_{i=0}^{N} \omega_h^c$ Broadcast updated model to all actors and critics

---

In one embodiment, updated weights of the microgrid agent are uploaded to a microgrid global agent. The microgrid global agent determines an average of the uploaded updated weights of the microgrid agents as averaged microgrid agent weights. The averaged weights from the microgrid global agent are uploaded to the microgrid agents.

Simulation Experiments

In order to develop an initial simulation model to demonstrate the model, energy usage data was analyzed to determine profiles for demand, generation and grid energy source mixes.

Residential Load

Figure 17A:
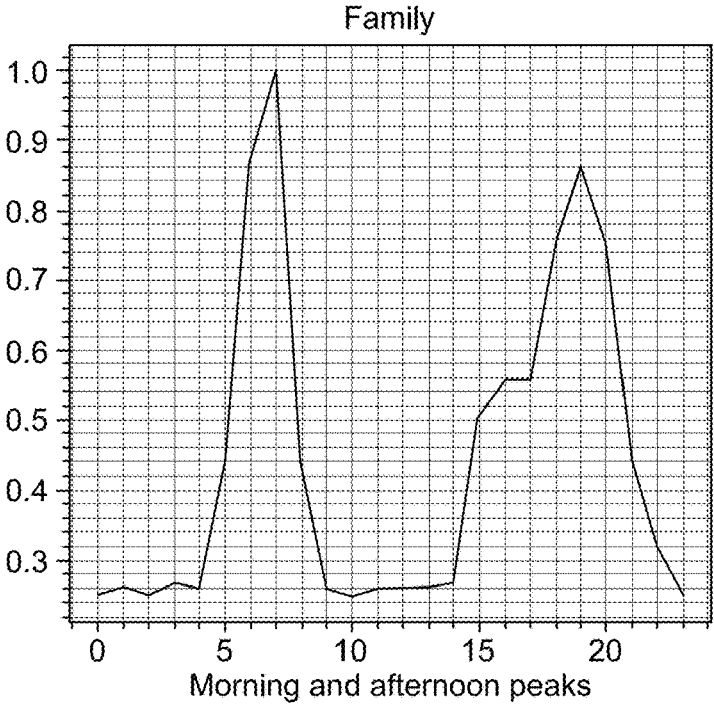
FIGS. 17A, 17B, 17C are graphs of energy demand profiles at one household.
Figure 17B:
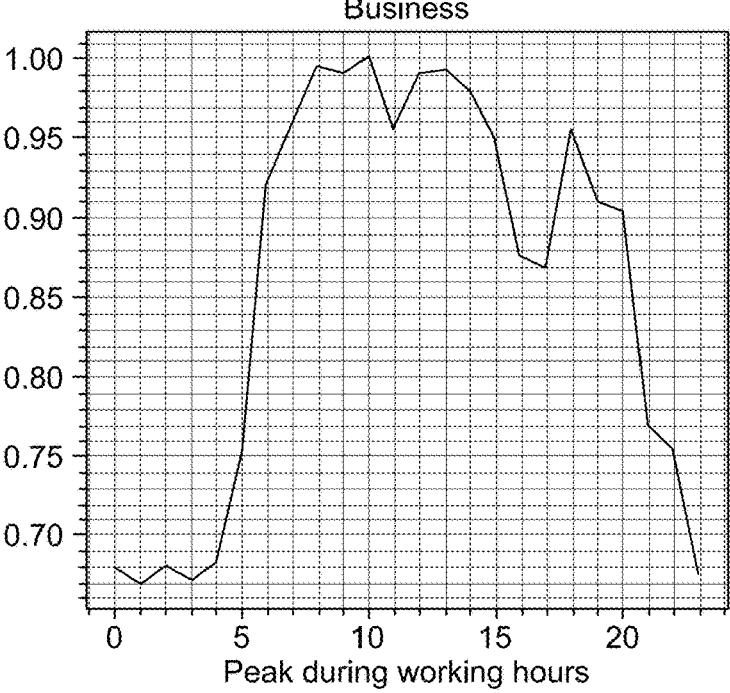
Figure 17C:
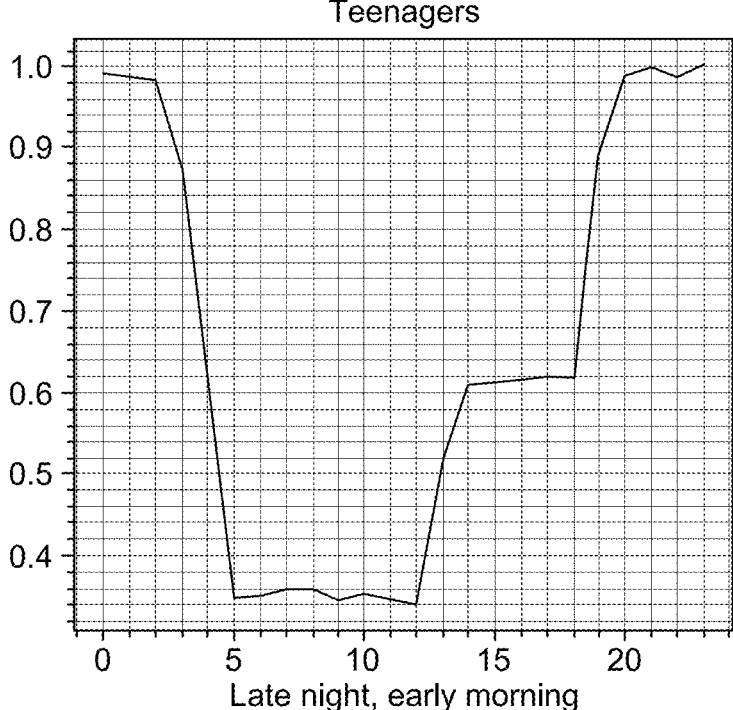

FIGS. 17A, 17B, 17C are graphs of energy demand profiles at one household, broken out by usage type, including family, business, and teenager.

In Layer 1, three types of profiles are defined for residential load data: family, teenagers, and home business. Depending on the type, arbitrary 24-hour base profiles are established representing each case's expected consumption. The load is parametrized by Eload,max i,j∈[0, 1] that defines the peak consumption. A permanent constant consumption proportional to the peak load is denoted as Eload,c i,j with a default value of 0.2 (20% of the peak load is constantly consumed).

A noise component is added to the constant consumption, modeled again as a normal distribution Nload(μload, σload), with μload=0 and σload=0.01 by default.

PV Generation

FIGS. 18A, 18B, 18C, 18D are graphs of PV generation profiles.

The data from solar panel generation belongs to the Layer 1 of our scenario, as it is a DER belonging to the households.

It is modeled by creating a base from a rectified sin function tunned to reach its peak after 12 steps, simulating the peak of solar energy on a clear sky day. It is scaled using the parameter Epv,max i,j∈[0, 1] and receives perturbation from a noise component modeled as a normal distribution Npv (μpv, σpv), where we defined by default μpv=0 and σpv=0.1, but it can be changed as needed.

Figure 18A:
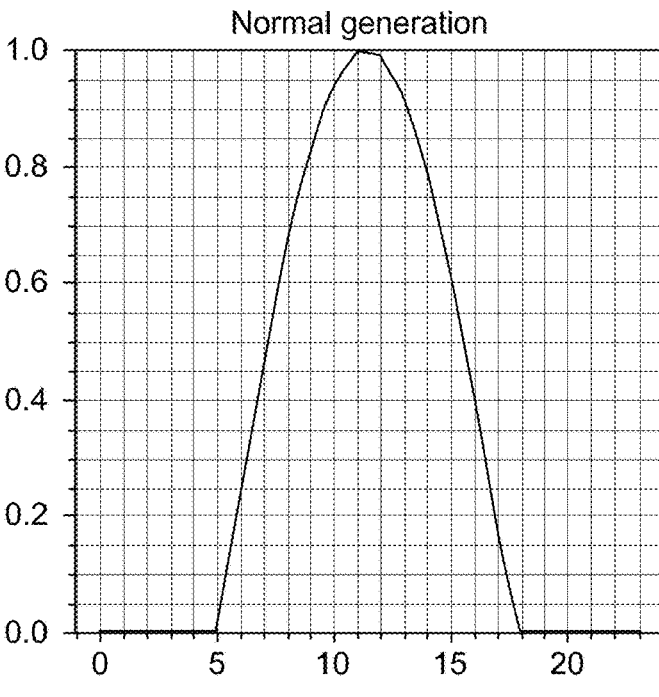
FIGS. 18A-18D are graphs of PV generation profiles.
Figure 18B:
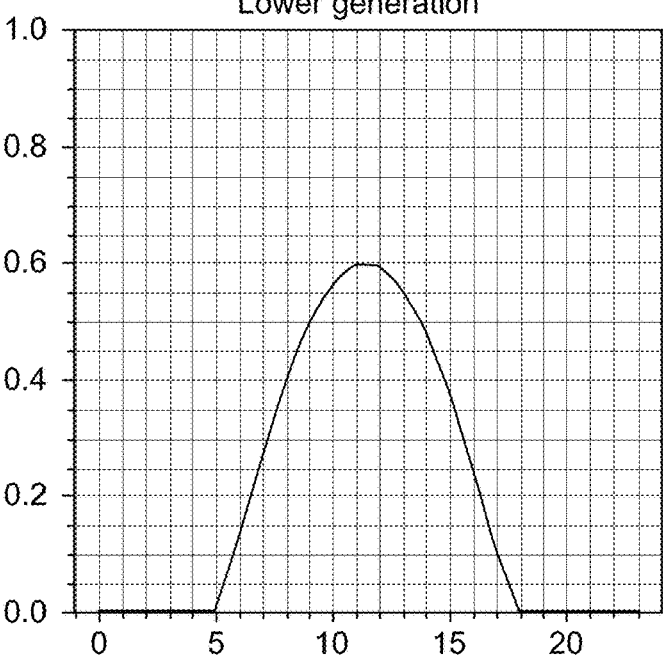
Figure 18C:
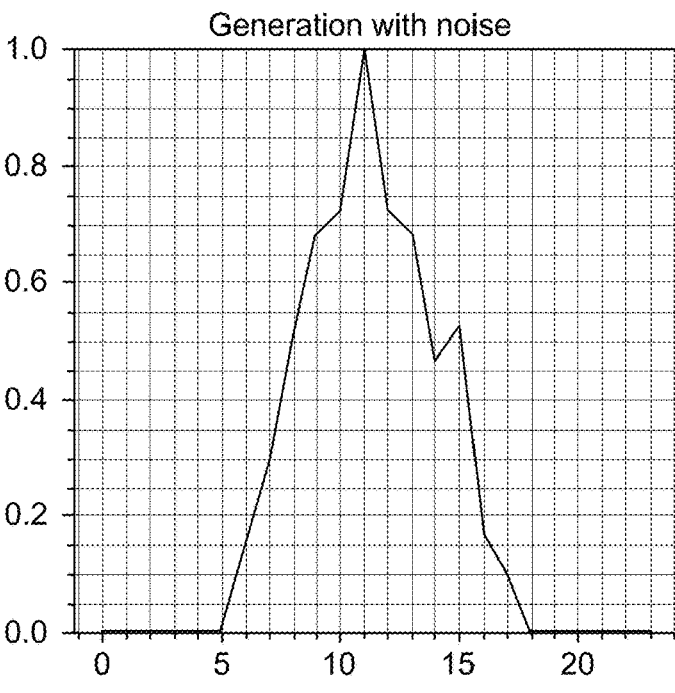
Figure 18D:
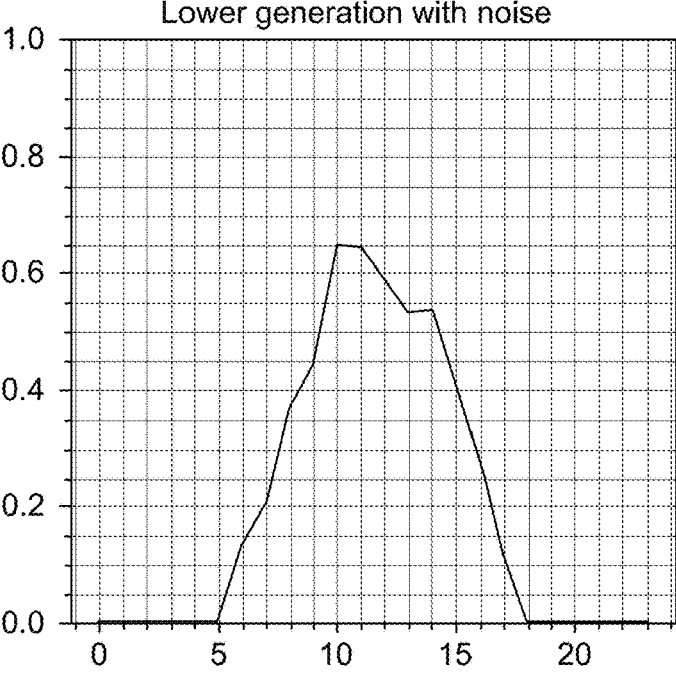
Figure 19A:
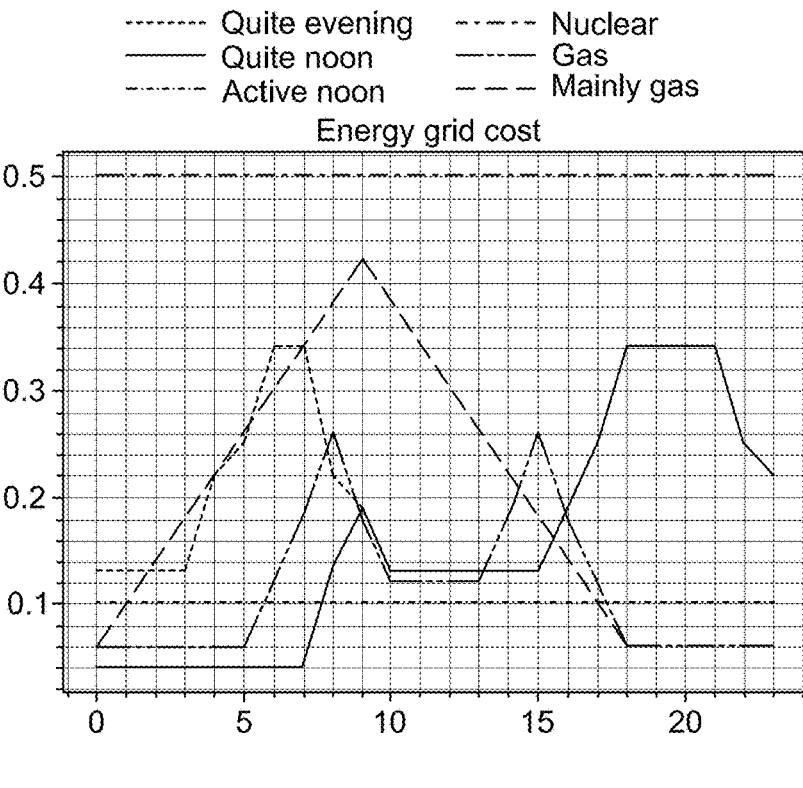
FIGS. 19A, 19B, 19C, 19D are graphs of grid energy source mix profiles.
Figure 19B:
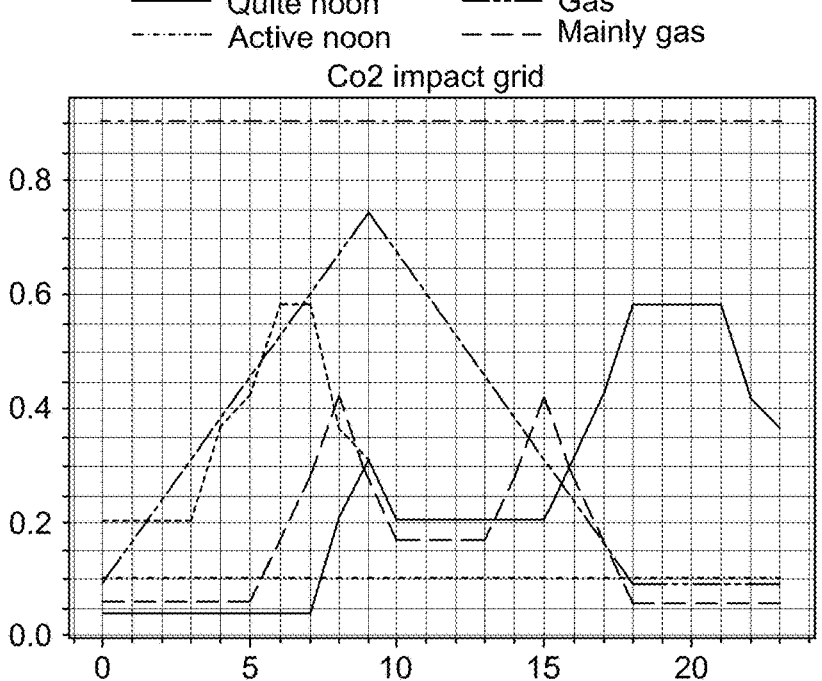
Figure 19C:
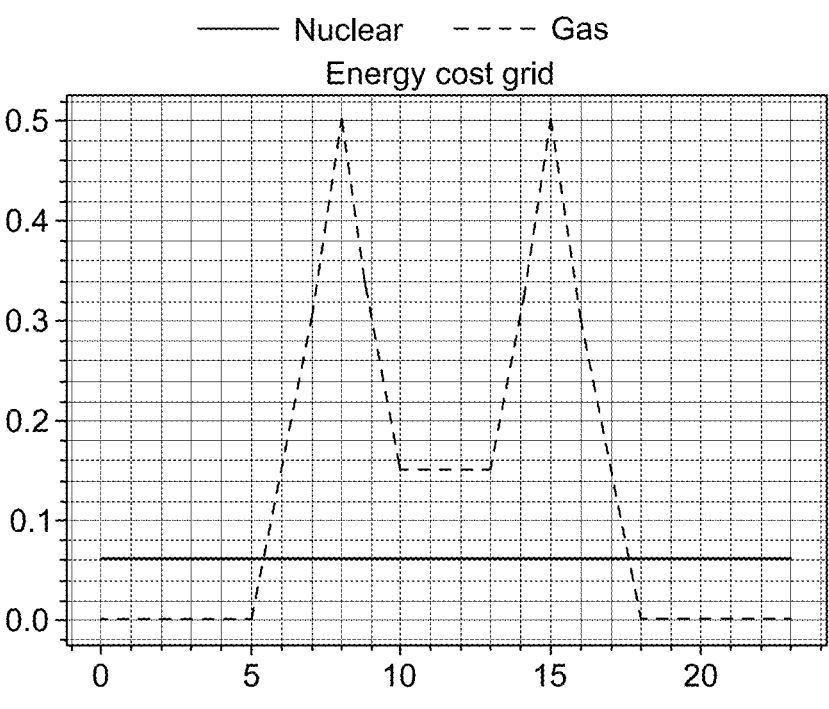
Figure 19D:
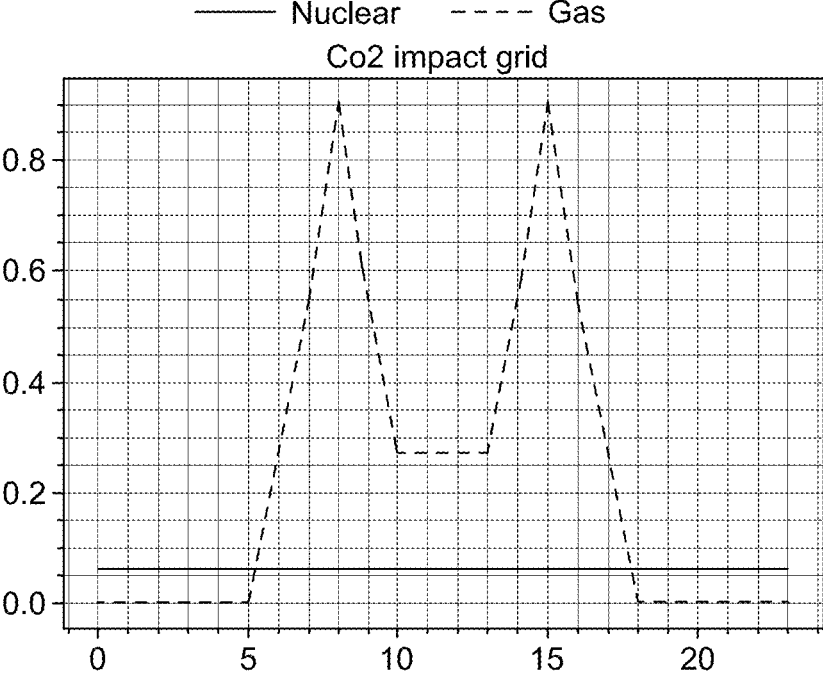

PV power generation requires certain conditions for ideal power levels. FIG. 18A is a graph of power under ideal conditions. FIG. 18B is a graph of power due to conditions that can affect power generation. Certainly, time of day can affect PV power generation. Direct sunlight is limited to certain hours of the day. PV panels have a low efficiency generally ranging from about 15 percent to a high of about 20 percent. The efficiency is the amount of electricity that is output for a given of sunlight that hits the panel area. PV generation can also vary depending on temperature. In addition, as shown in FIGS. 18C and 18D, electricity obtained by PV generation can be further reduced by noise in the electrical signal.

FIGS. 19A, 19B, 19C, 19D are graphs of grid energy source mix profiles, and their effects on cost and CO2 impact.

19A. Different daily profiles for energy generation on the energy provider side. According to the kind of expected kind of day, the generation profile varies, as well as the generation sources (nuclear is a stable generation all day long, gas could ramp up during the day). The profiles quiet evening, quiet noon and active noon just represent different setups how energy could be generated according to the expected demand.

19B. Similar to 19A but this graph represents the emission factor during the day according to the different generation setup (combination of gas and nuclear).

19C. Grid generation profiles for nuclear (stable) and gas (two generation spikes) regarding their energy grid cost.

19D. Grid generation profiles for nuclear (stable) and gas (two generation spikes) regarding their grid Co2 impact.

Dataset Generation

A data generator can synthetically create the time series data for solar panel generation, residential load, energy price, and energy emissions. The data generator has several advantages over using real or existing datasets. First, it reduces the dependency on finding or collecting ideal datasets that match smart grid problem setup and objectives. Secondly, the data generator can control the level of stochasticity and variability in the data, which enables testing of different scenarios and assumptions.

Finally, the data generator can enable use of optimizers as the reference point for evaluating the performance of RL algorithms since it can generate data with known optimal solutions. Min-max scaling can be performed for each type of data that is generated by restricting all the variable values to the range [0, 1]. For all the cases, the number of generated data points is defined by the maximum number of time steps T.

Figure 20:
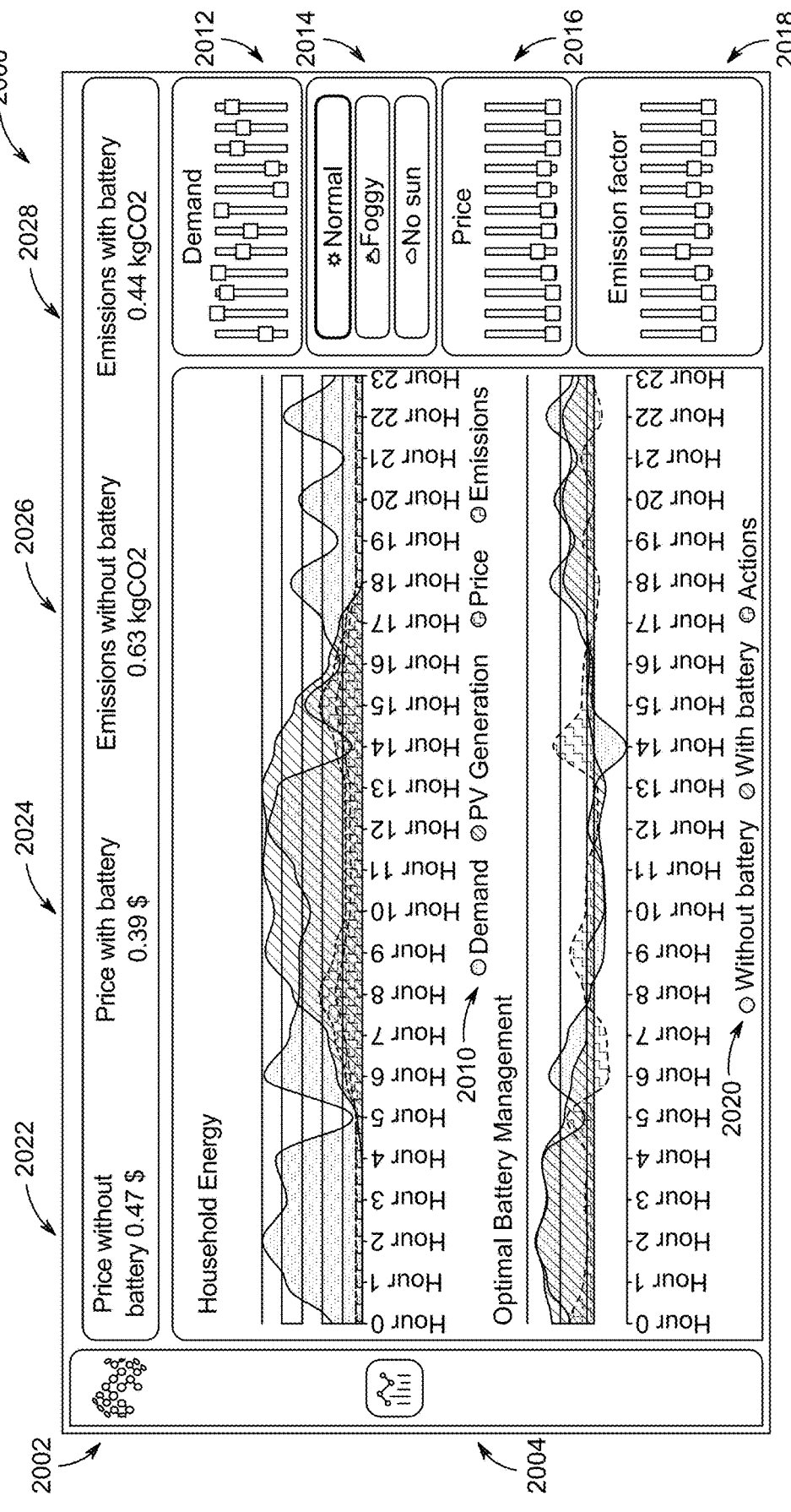
FIG. 20 illustrates a user interface for performing a simulation.

FIG. 20 illustrates a user interface screen 2000 for an interactive simulation of household energy usage and battery management under control of the reinforcement learning agents. The user interface screen 2000 can display a first plot of simulation results for household energy usage 2002 including an energy demand, PV generation, price, and CO2 emissions over time 2010 during a 24-hour period. The user interface screen can display, for each household, an average price without a battery 2022, an average price with a battery 2024, CO2 emissions without a battery 2026, and CO2
emissions with a battery 2028. The user interface screen
2000 can display a second plot of simulation results for
optimal battery management 2004 including energy usage
without a battery, with a battery, and battery management
actions 2020.

The user interface screen 2000 can be used to set param-
eters for the simulation. The parameters can include daily
demand 2012, weather conditions 2014 of normal, foggy, no
sun, price 2016, and CO2 emission 2018.

Dataset

The data used in the experimental implementation is
synthetically generated based on real-life data. For this
implementation, 24 steps are defined representing the hours
within a day, with the possibility of extending to more steps
if required. Energy demand profiles can be characterized as
three different demand profiles, each representing a specific
use: family, with demand peaks in the morning and early
afternoon (refer to the trend shown in FIG. 21A); teenagers,
with peaks late in the afternoon till early morning (refer to
the trend shown in FIG. 21B); house business, with high
energy usage in the middle of the day (refer to the trend
shown in FIG. 21C). These non-shiftable demands are
generated with noise, different energy baselines, and a
dependency on stochastic variables such as outside tempera-
ture. Referring to FIG. 21D, grid energy cost and carbon
emissions are defined for two different sources, nuclear and
gas. Nuclear has a more negligible cost and carbon emission
than gas. Nuclear is constant for price and emissions since
the production is stable. However, there is not enough
nuclear to supply all the houses. Hence a decision has been
made to produce most main-grid energy with gas which is
more expensive than nuclear energy and emits more carbon
emissions.

Energy Price and Emissions

Layer 3 data of the main grid includes external inputs that
are influenced by the availability of generators, market
regulations, policy changes, unexpected events, etc. It can be
assumed that the main grid can always supply any demand,
so the relevant aspects to consider are how the prices change
and the impact of energy sources. In a preferred setup, the
main grid has both nuclear and gas generation at its disposal.
Then, to compute the price of energy and its climate impact,
the following parameters are used: nuclear energy rate $$(r_t^{nuclear}),$$

nuclear energy emission factor $$(c_t^{nuclear}),$$

gas energy rate $$(r_t^{gas})$$

and gas energy emission factor $$(c_t^{gas}).$$

Following the real world behavior of nuclear and gas
generation technologies, it can be assumed that nuclear
maintains constant power during the day, defined as $E^{nucle}_{-ar.ratio}$, and that the gas generation has a planned generation
profile that can also be inputted as a parameter.

Dataset Generation

Figure 21A:
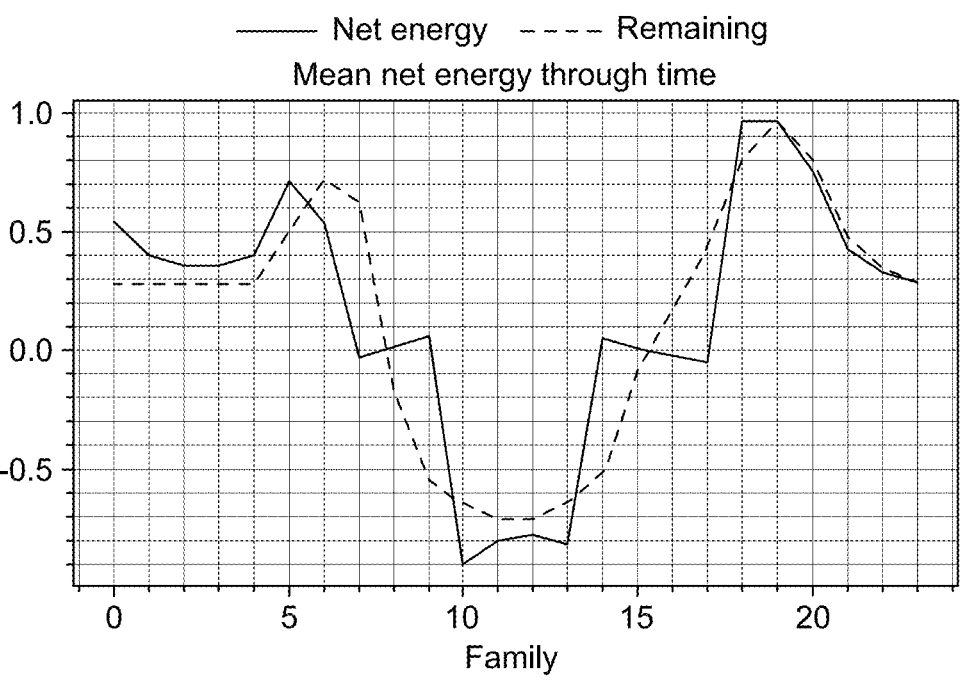
FIGS. 21A-21C are graphs of three different demand profiles.
Figure 21B:
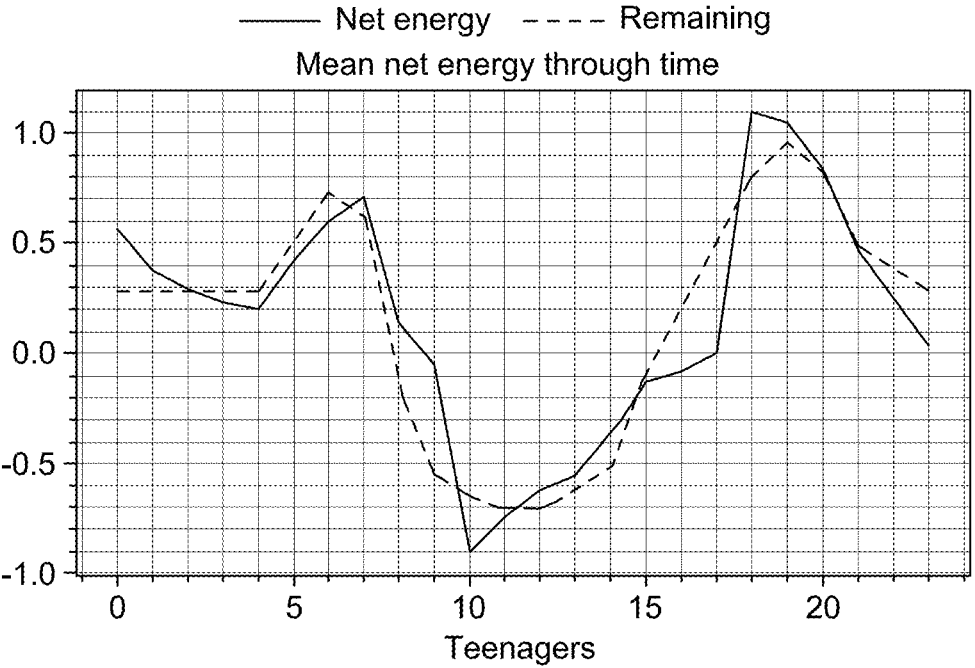
Figure 21C:
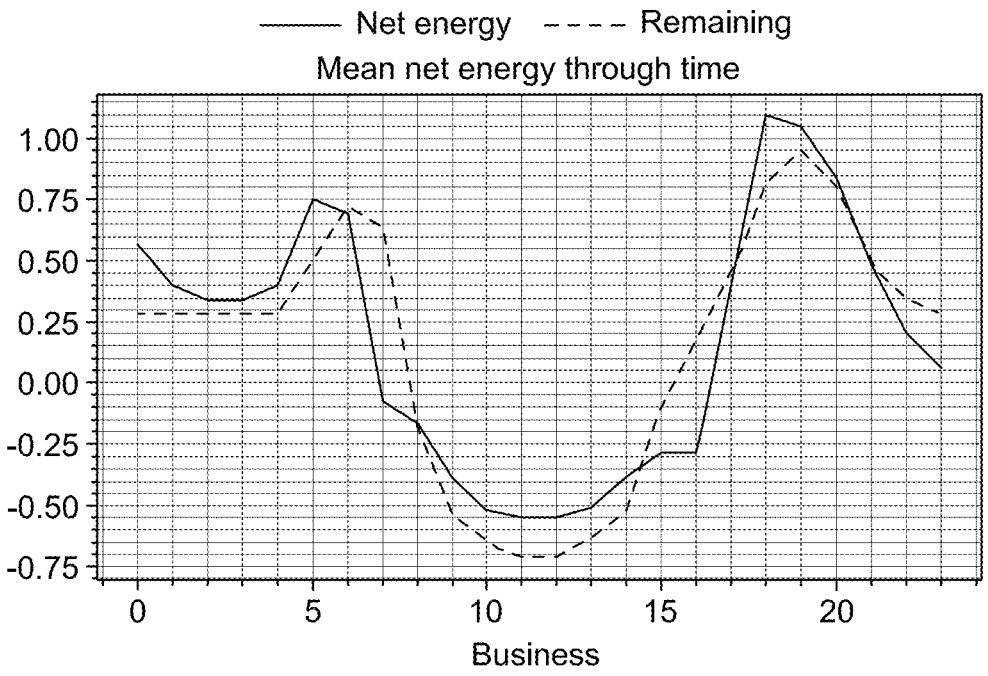
Figure 21D:
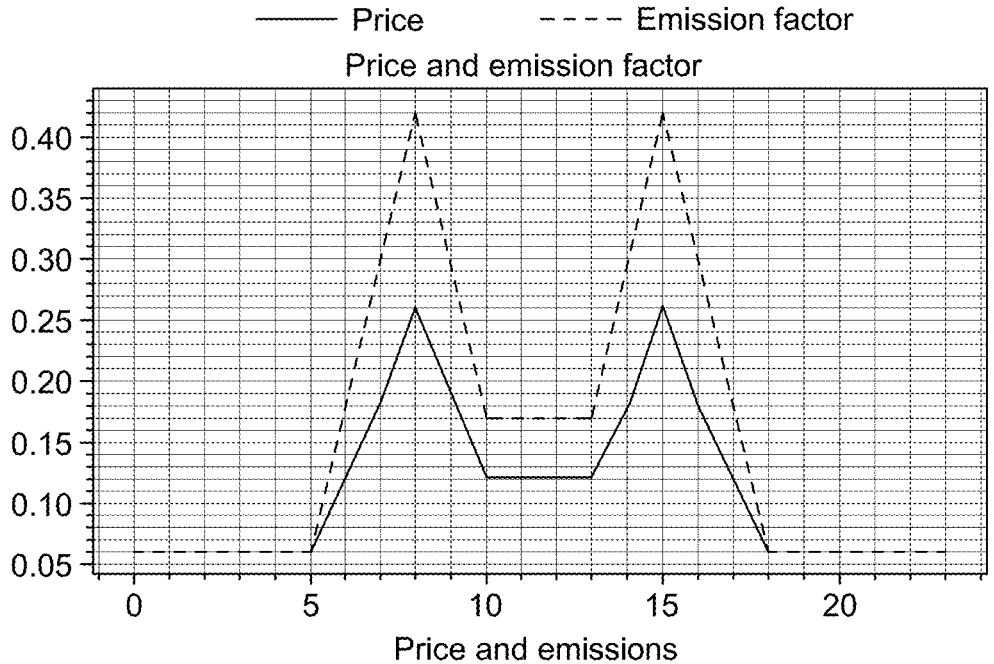
FIG. 21D is a graph of grid energy cost and carbon emissions for two different sources.

The dataset generated for an experimental implementa-
tion has the following parameters (all of them normalized):

The demand profiles are explained above: family, teen-
ager, business with respect to FIGS. 21A-21C

Peak load maximum: The maximum the house can con-
sume.

PV (photovoltaic) peak generation: The maximum elec-
tricity that is possible to generate with the solar panels
for a house.

Battery Characteristics

Random state of charge: decide if the battery will start
with a random percentage.

Capacity: energy capacity of the battery/array of batteries
in (kWh) when is not normalized.

Efficiency: A value between 0 and 1 represents the one-
way efficiency of the battery, considering the same
efficiency for charging and discharging (%).

State of charge (SoC) max and min: Value between 0 and
1 representing the highest value and the lowest the SoC
a battery can reach.

P charge max: Maximum charging rate of a battery (%).

P discharge Max: Minimum battery charging rate (%).

Sell Price: Price for injecting energy into the battery
(reward to the prosumers).

Buy price: Price for using energy from the battery
($/kWh).

Figure 22A:
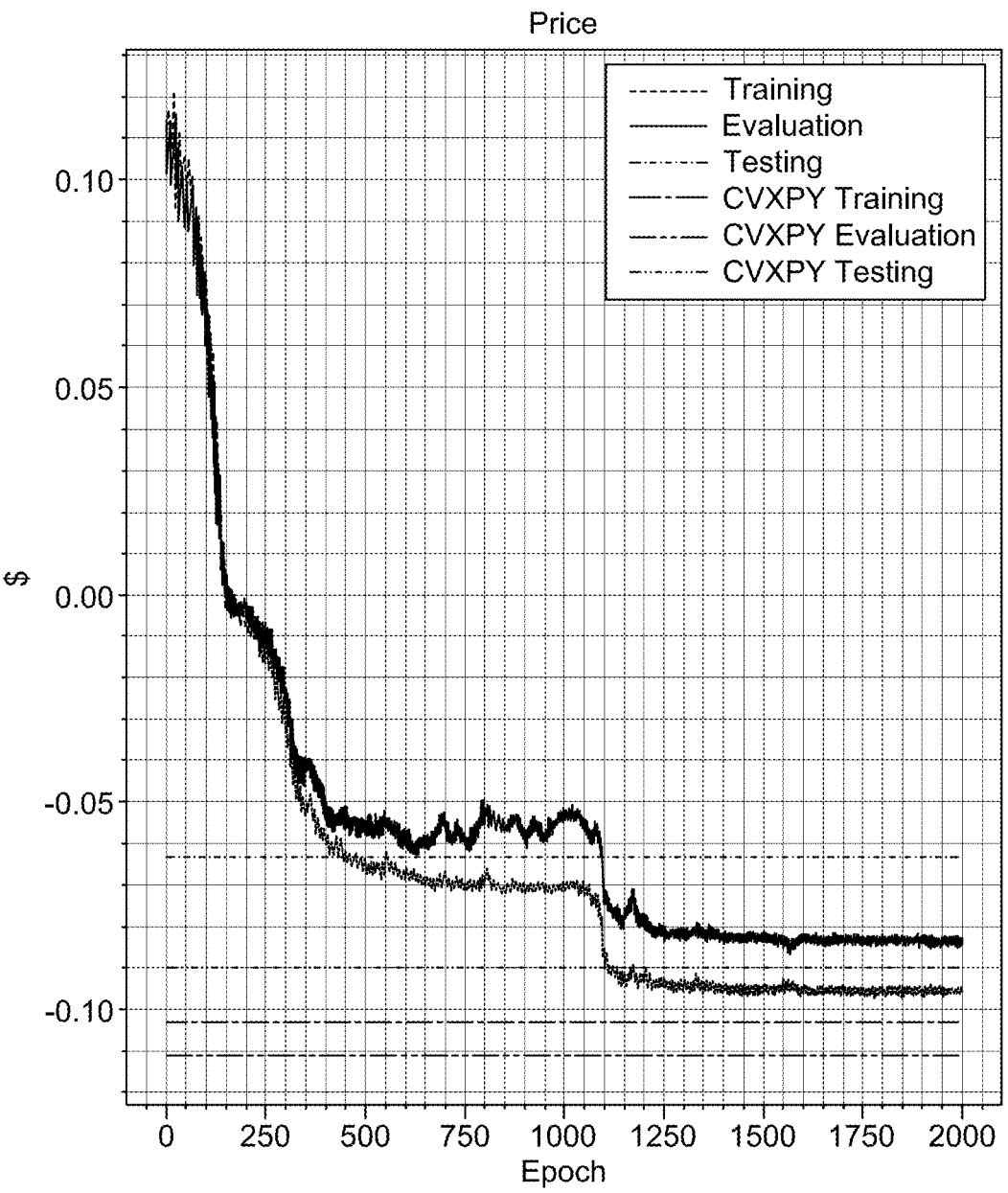
FIG. 22A, 22B graphs of configurations for the training, evaluating, and testing.
Figure 22B:
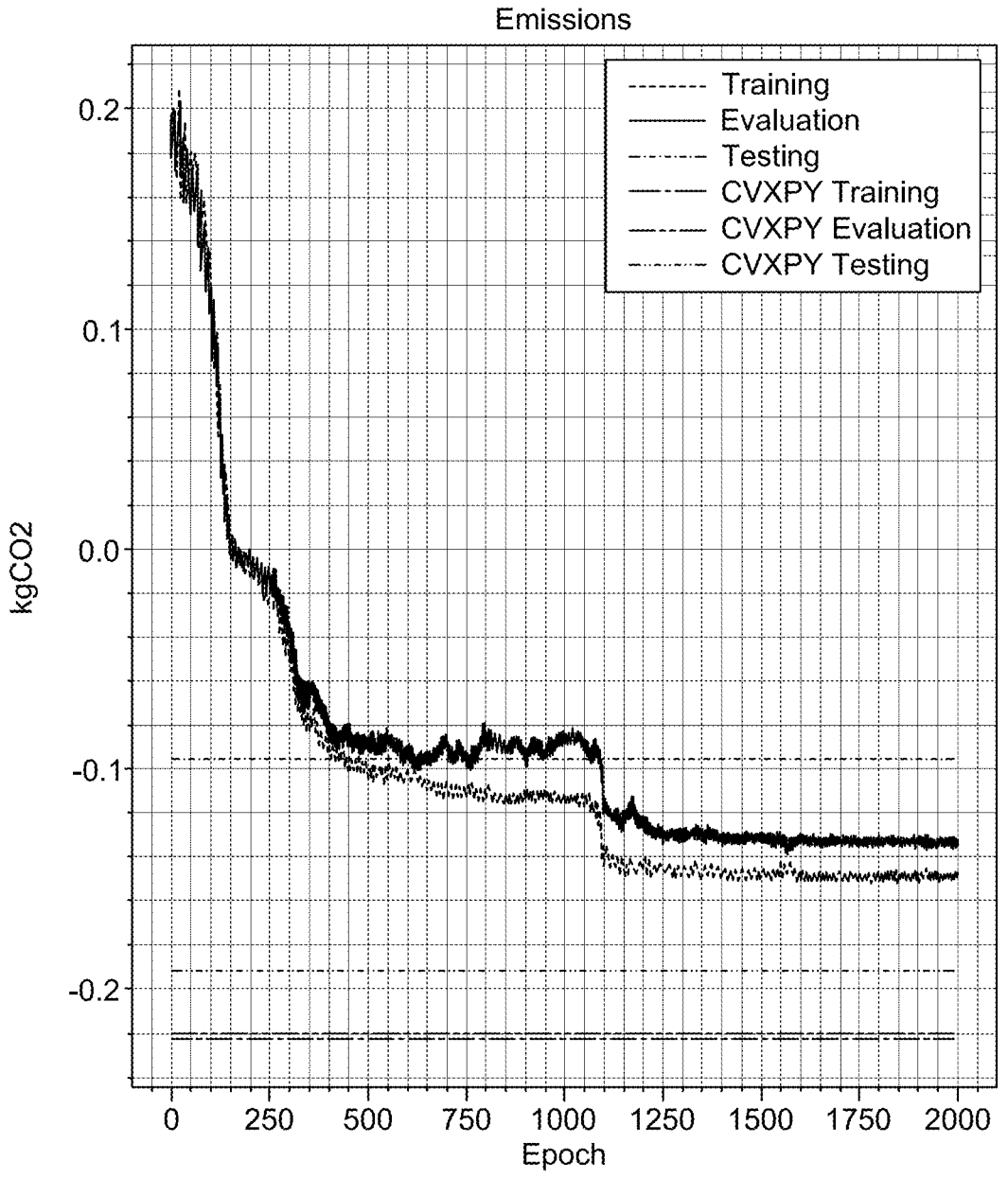
Figure 23A:
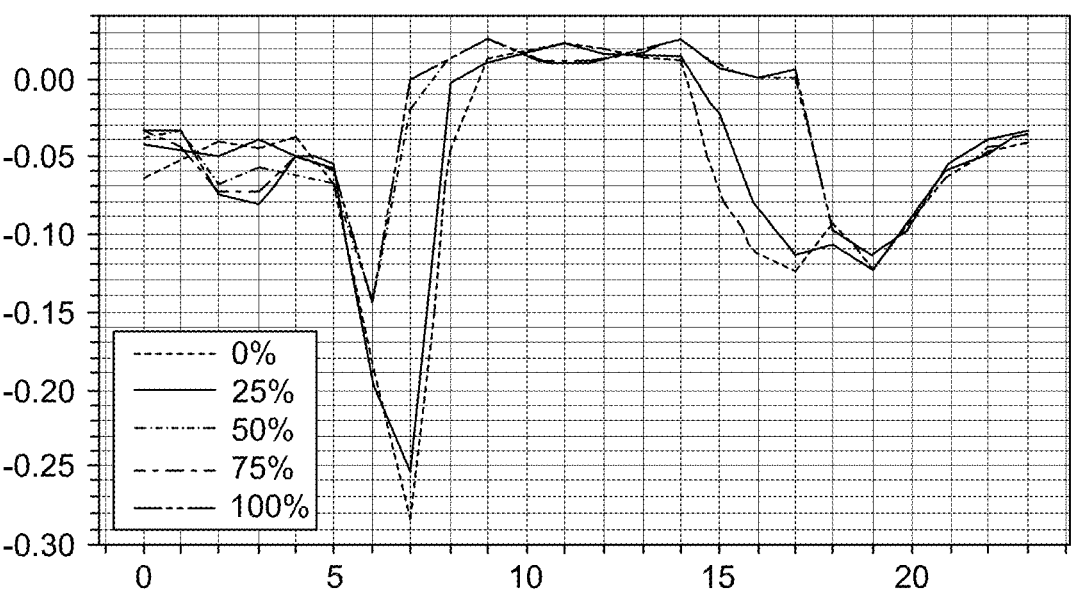
FIGS. 23A-23J are graphs of results of the A2C with a dataset that does not have noise.
Figure 23B:
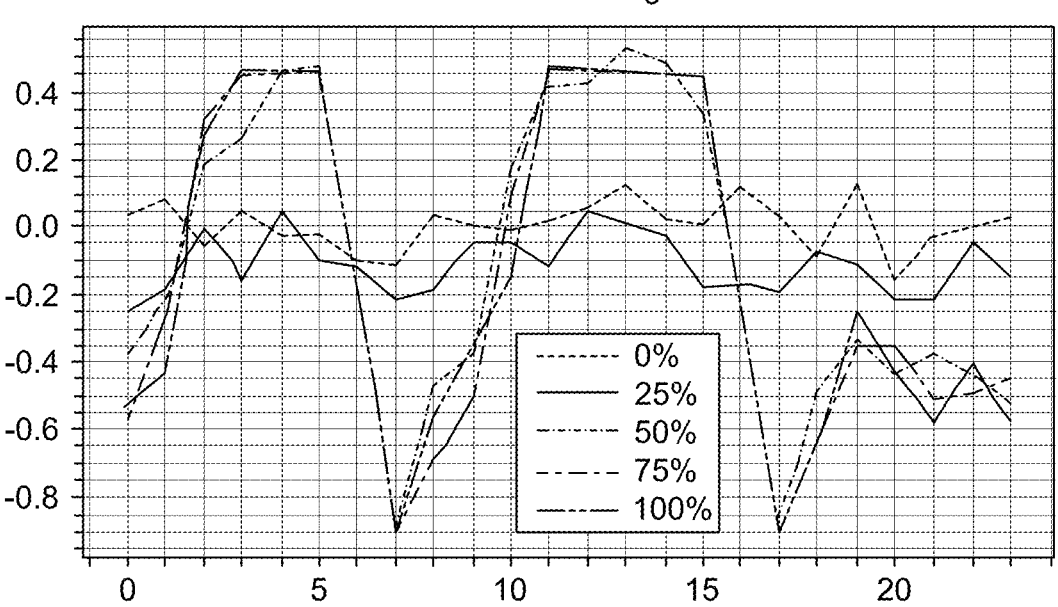
Figure 23C:
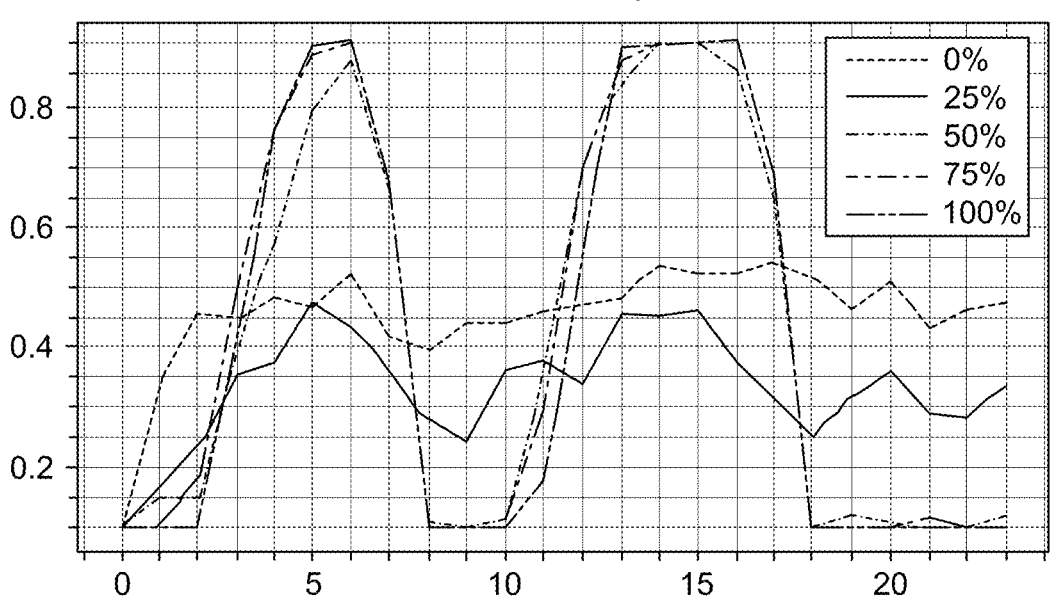
Figure 23D:
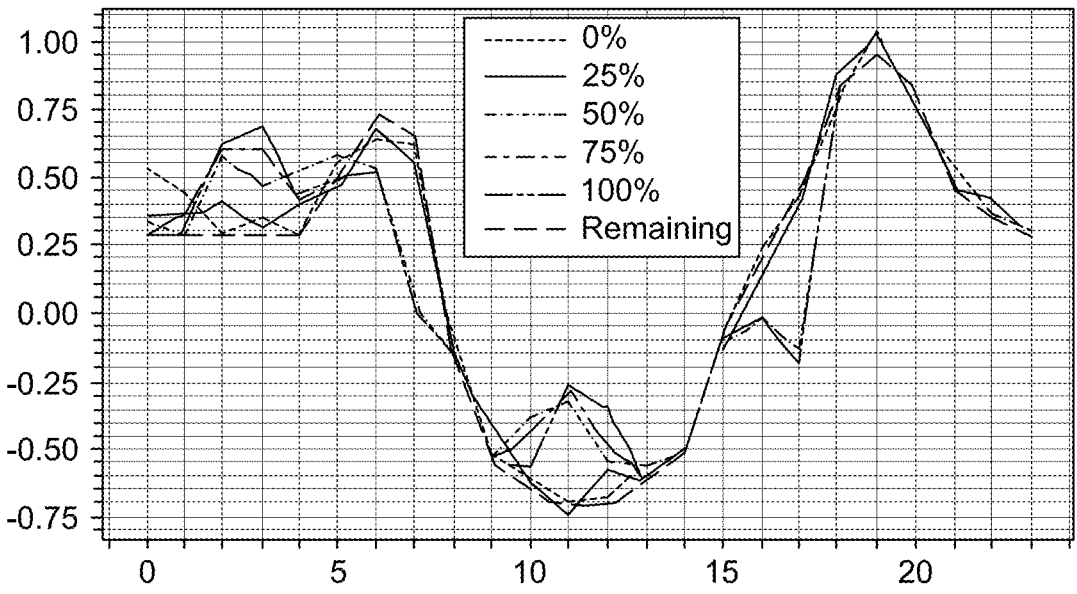
Figure 23E:
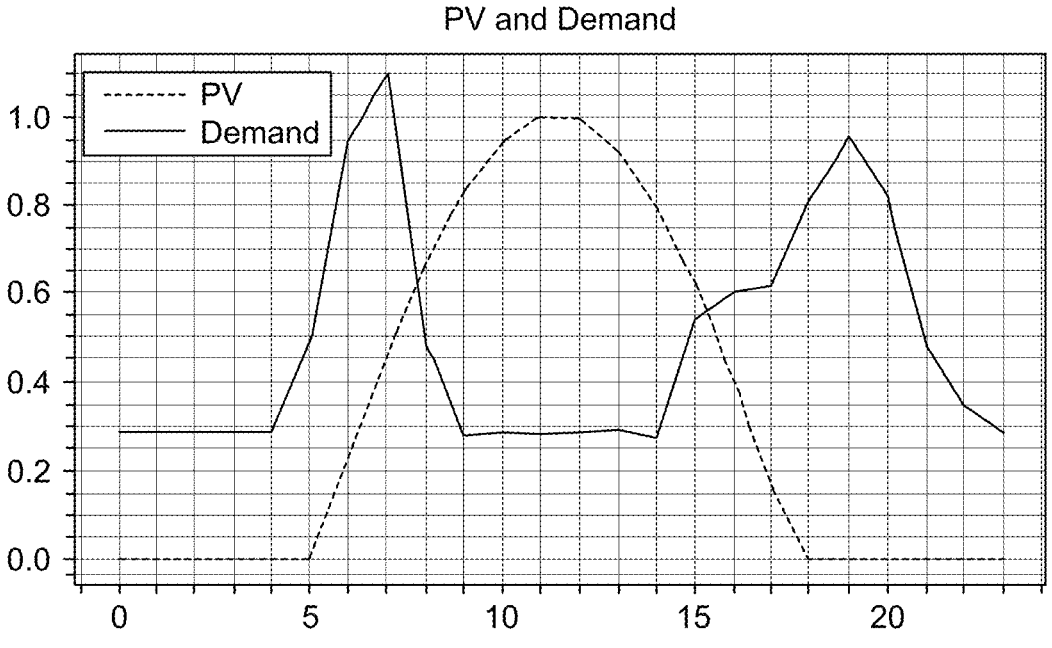
Figure 23F:
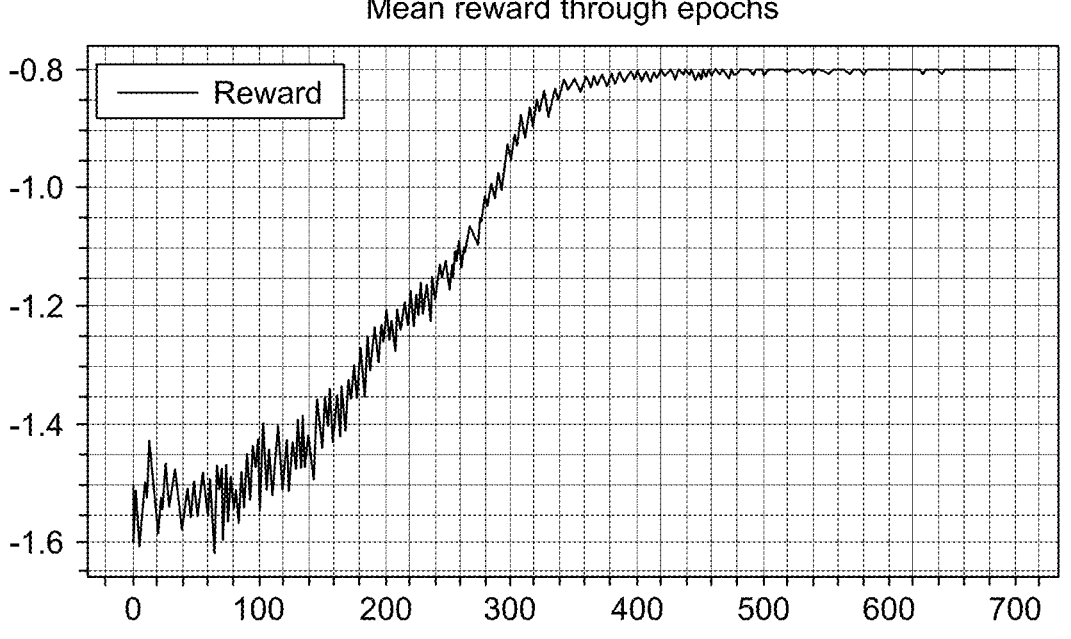
Figure 23G:
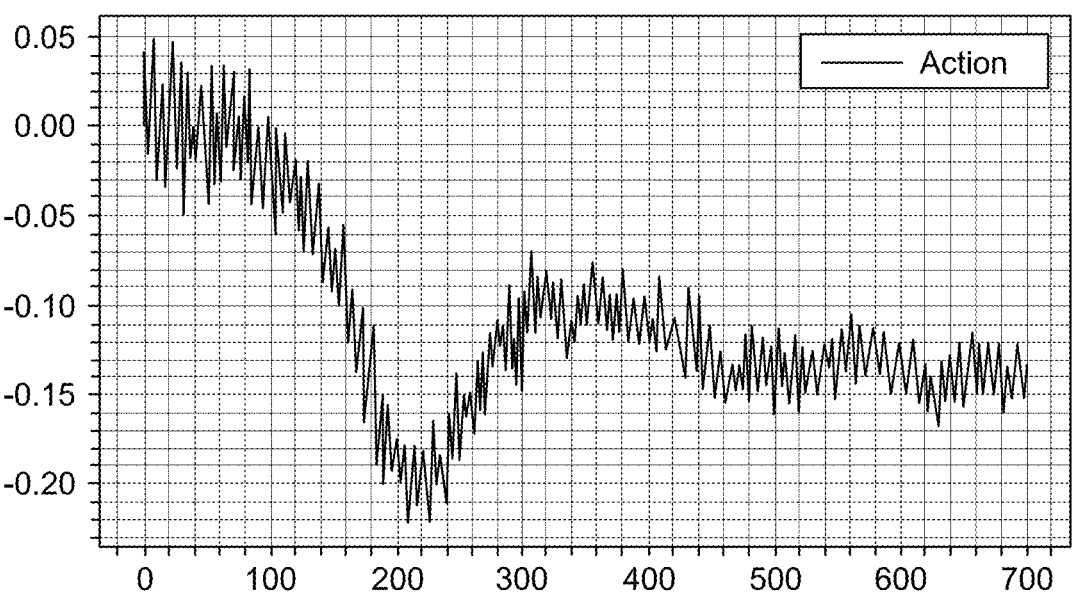
Figure 23H:
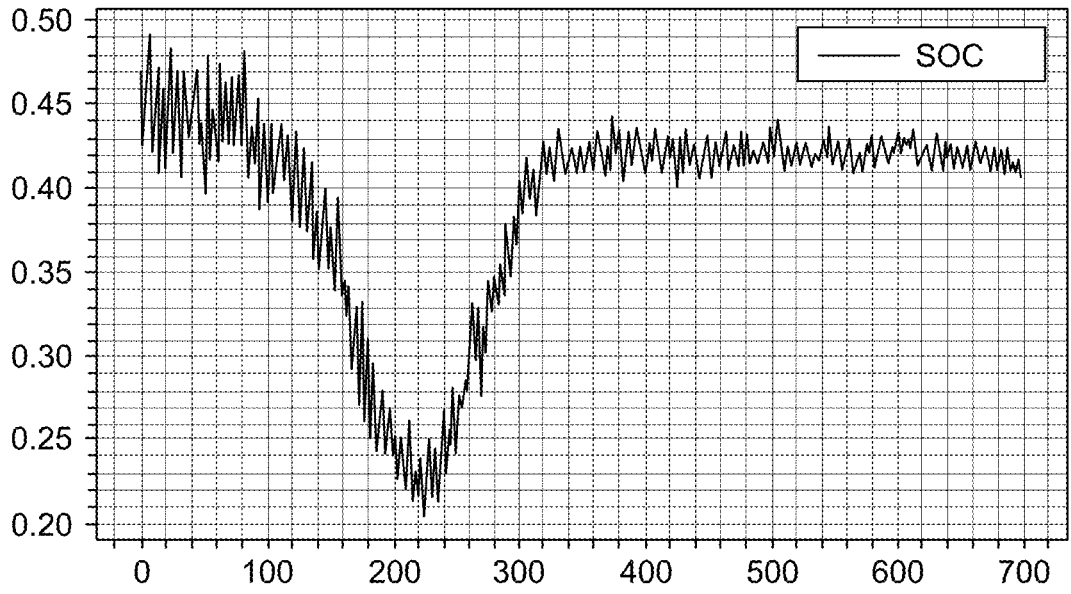
Figure 23I:
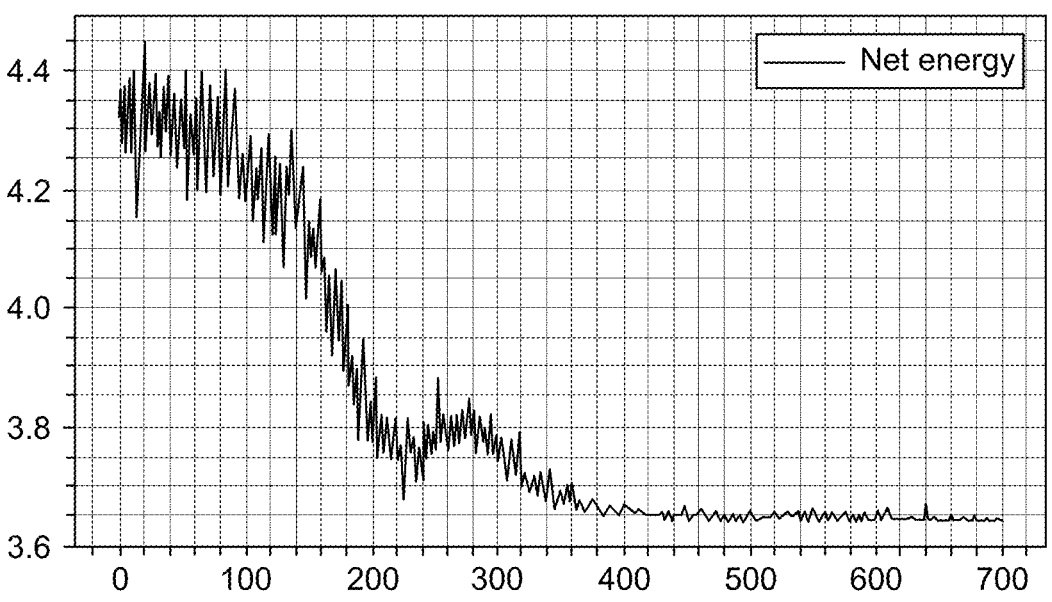
Figure 23J:
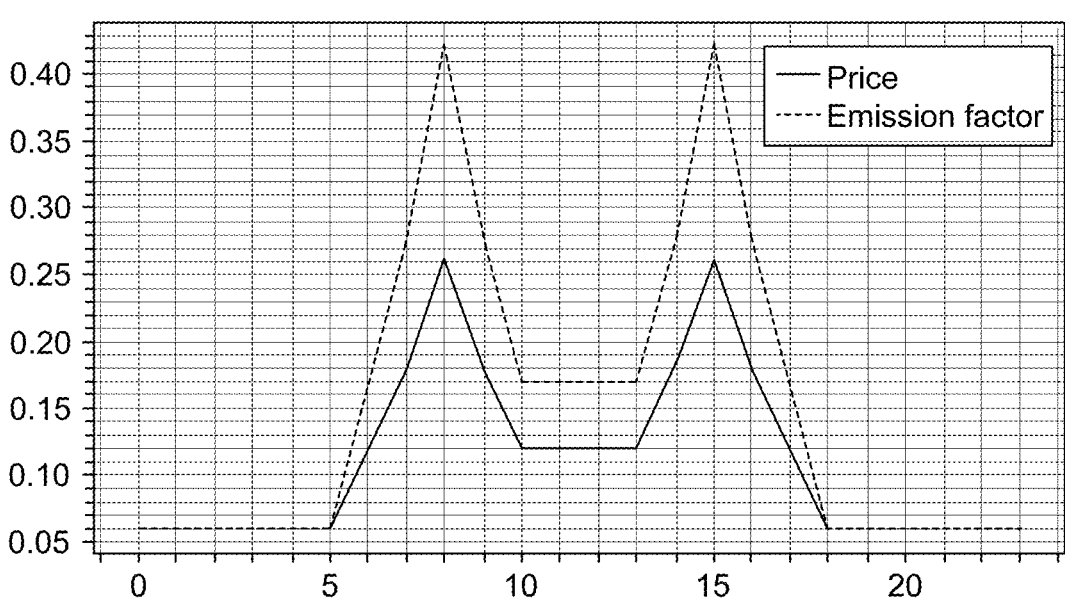
Figure 24A:
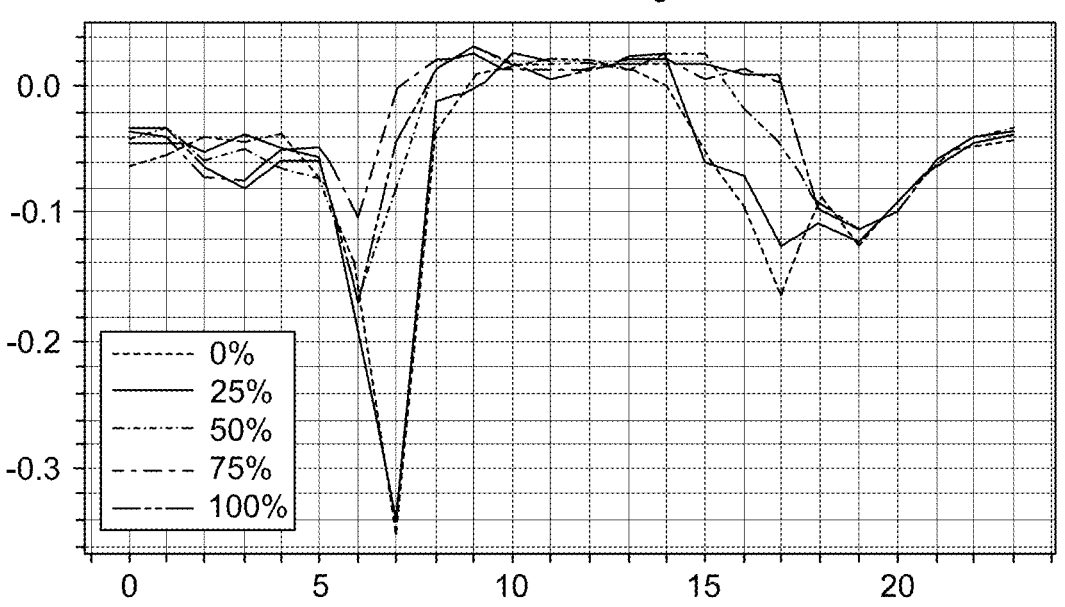
FIGS. 24A-24J are graphs of results of the a2C with a dataset that has noise.
Figure 24B:
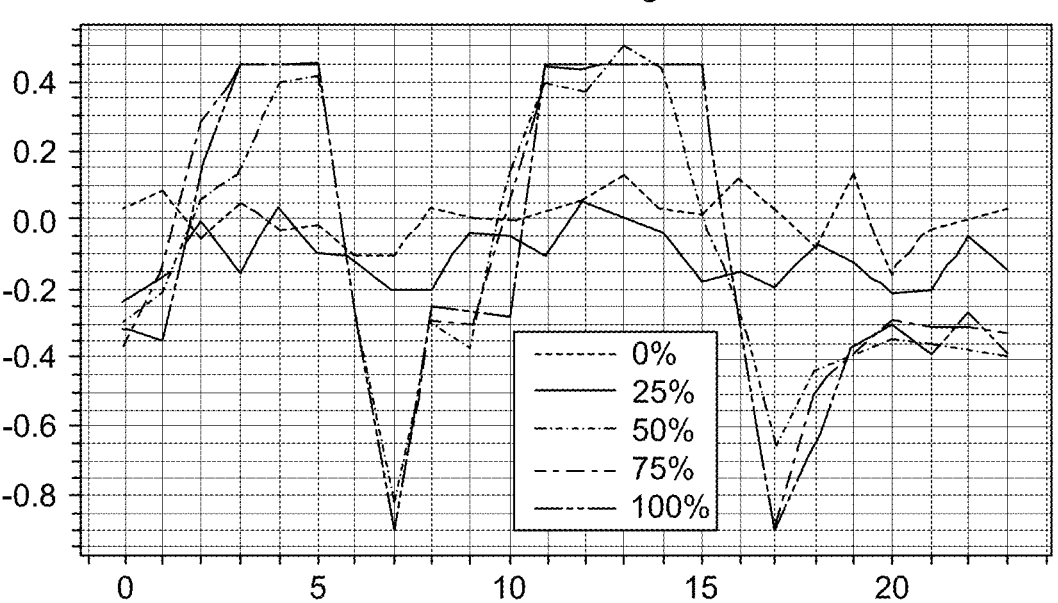
Figure 24C:
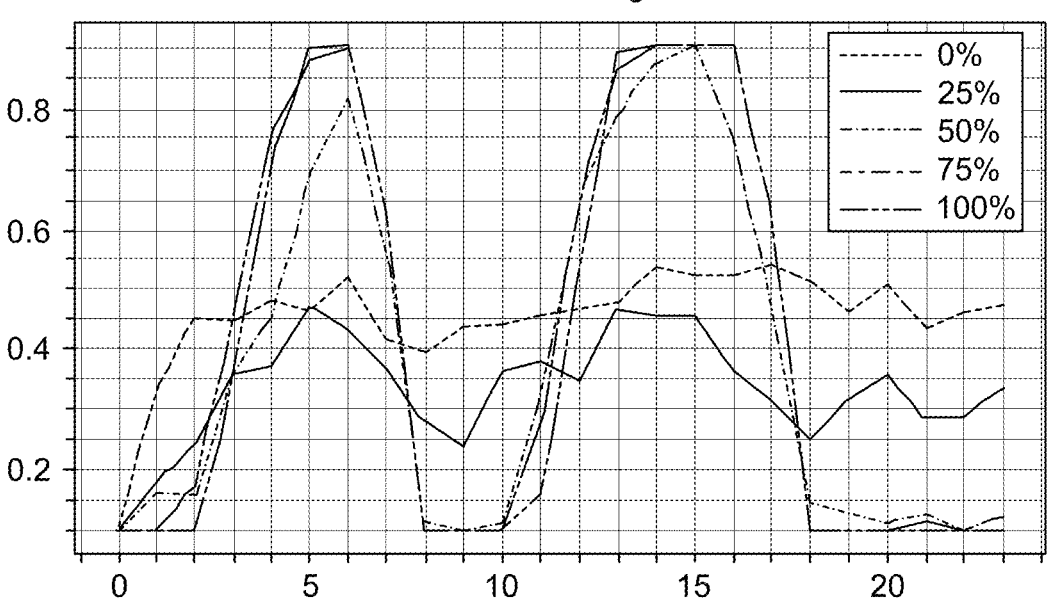
Figure 24D:
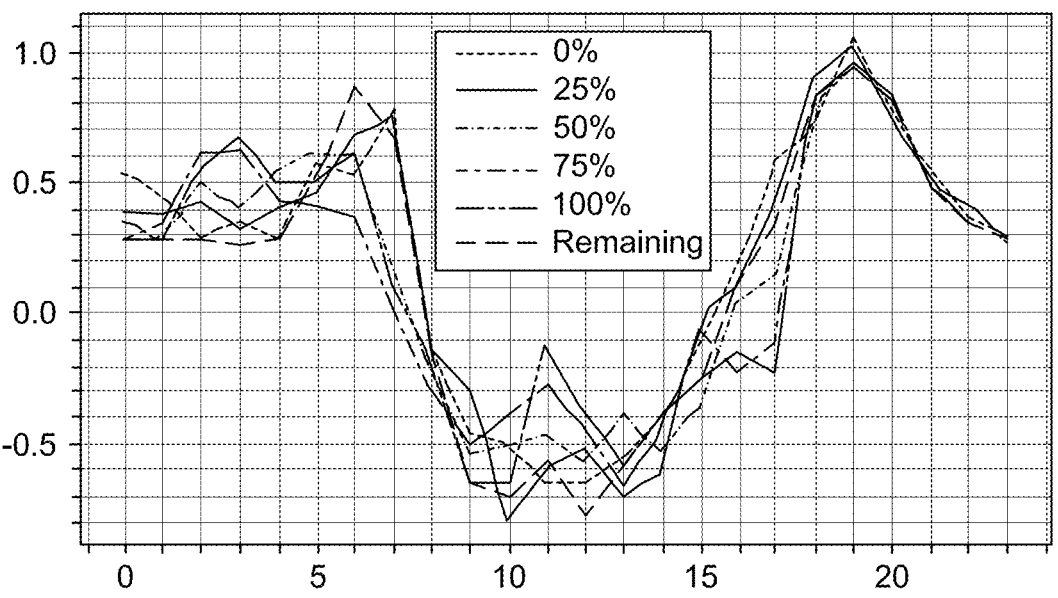
Figure 24E:
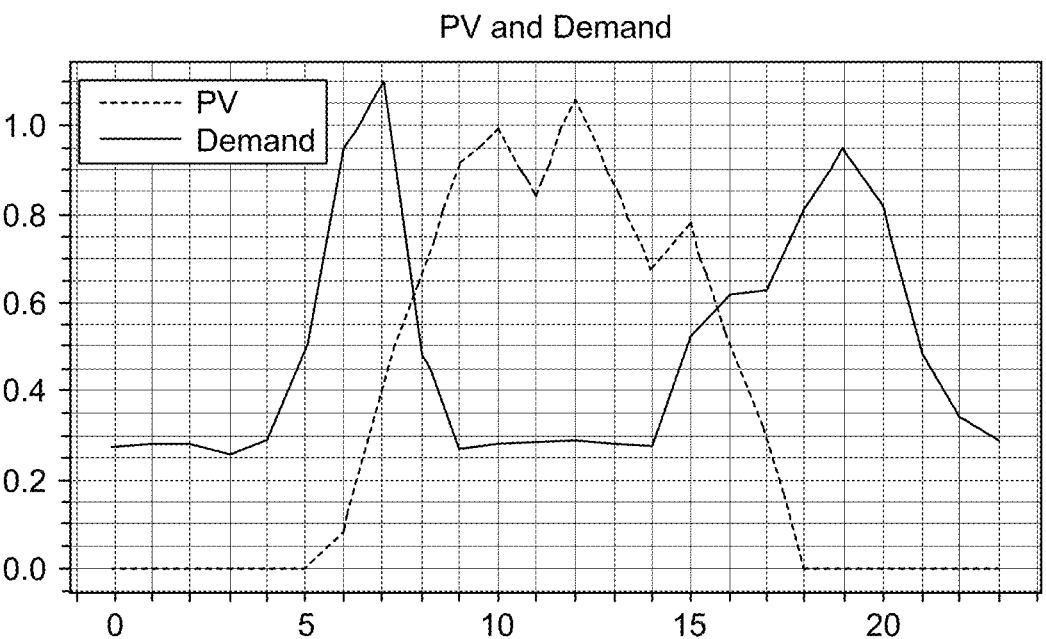
Figure 24F:
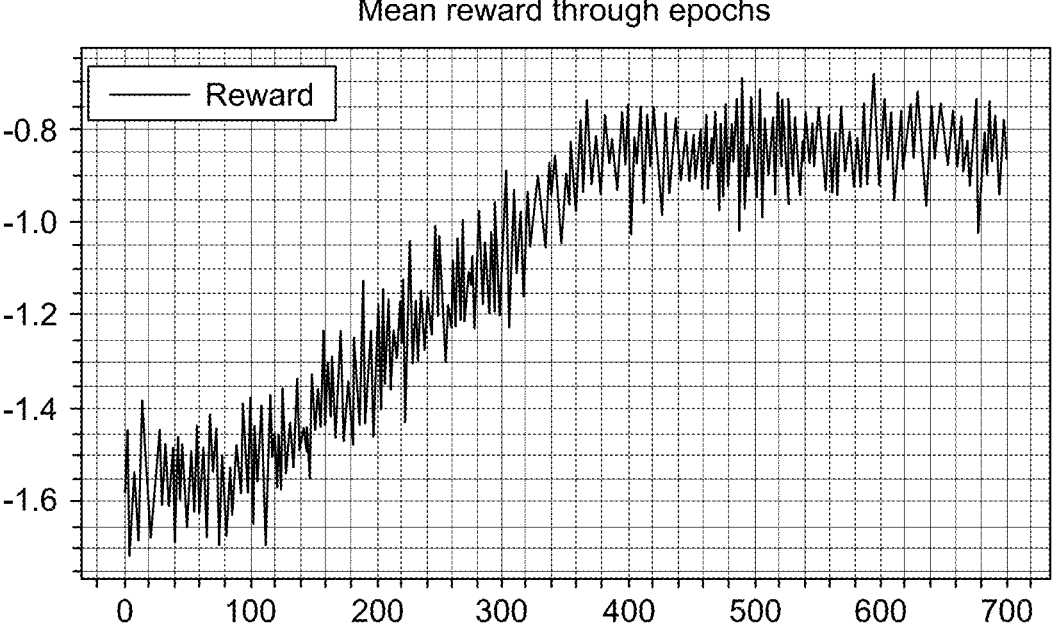
Figure 24G:
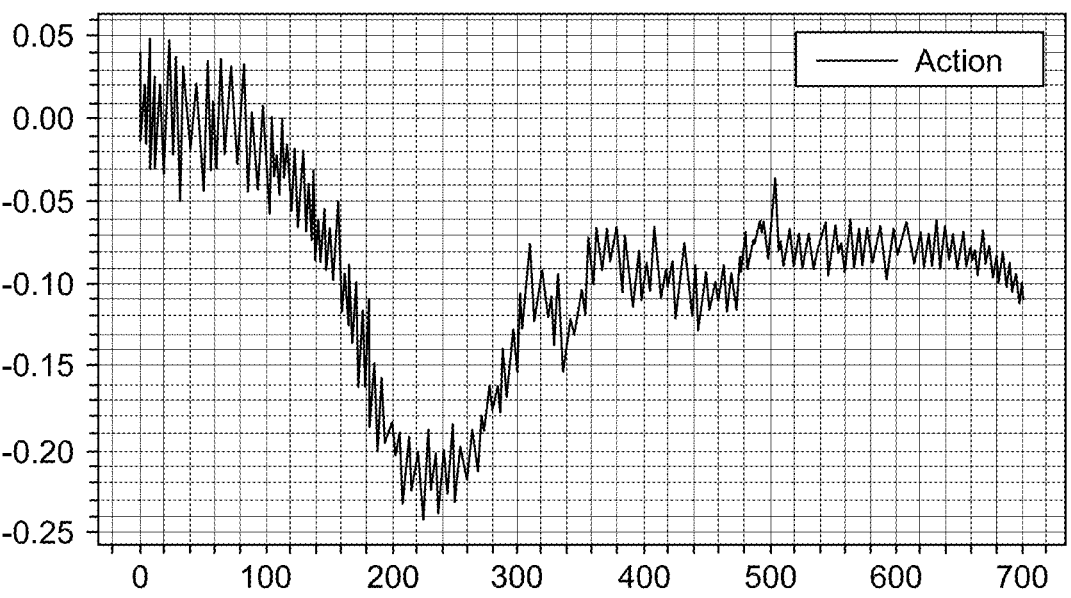
Figure 24H:
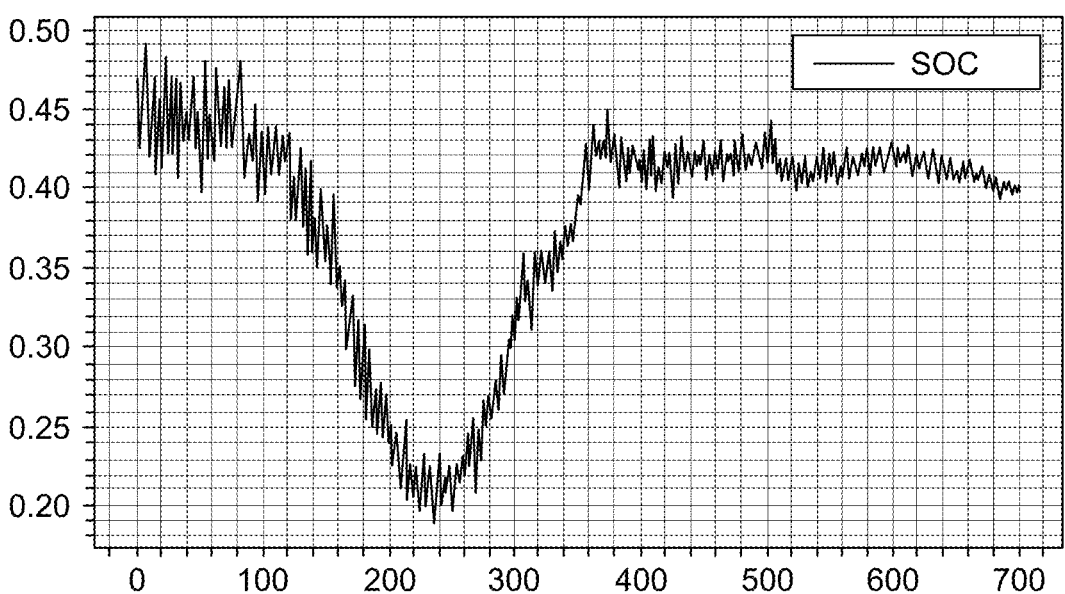
Figure 24I:
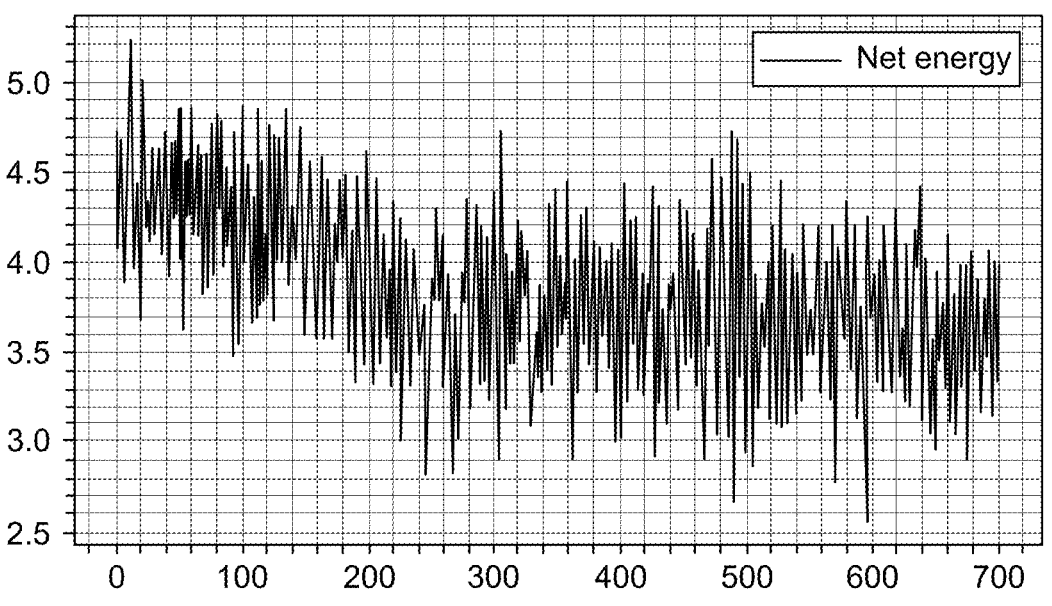
Figure 24J:
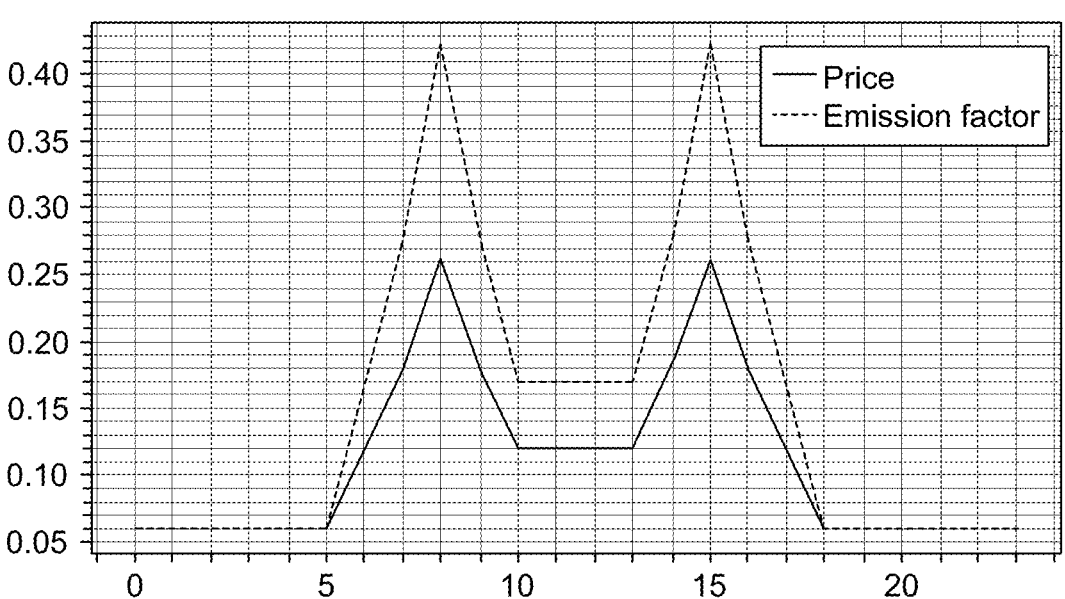

The configurations for the training, evaluating, and testing
in the experiment are found in FIGS. 22A and 22B. Price
score (FIG. 22A) and Emissions score (FIG. 22B) compari-
sons are illustrated between CVXPY solver and A2C in the
microgrid for all 3 stages (training, evaluation, and testing).
As demonstrated, for train and evaluation, the microgrids are
of 6 houses, but for testing, there are 10 houses. For the final
results, the RL algorithm works with multiple houses (mi-
crogrid) simultaneously, whereas before, the RL algorithm
was working with only one house.

FIGS. 23A-23J are graphs of results of the A2C with a
dataset that does not have noise. FIGS. 24A-24J are graphs
of results of the a2C with a dataset that has noise. The data
generated for the demand of the different houses are based
on the main pattern for each profile. Nonetheless, what
changes between homes is the state of the battery and the
generation of energy with the solar panels (PV), which is not
the ideal case because of the incorporation of noise (shown
in FIG. 23E and FIG. 24E in the figure "PV and Demand")
for the generation and the energy load, both modeled using
the Gaussian distributions $\mathcal{N}_v(0, 0.1)$ and $\mathcal{N}_{load}(0, 0.01)$.
Solar energy generation takes a sine function, shifting it to
start after $\mathcal{N}$ 5 am and shortening it to mimic the morning/
daylight. After that, noise is incorporated to replicate the
possible cloud cover or weather conditions that can be
present. The noise shows that there's a different result in the
mean net energy through time (shown in FIG. 23D and FIG.
24D in the figure "Mean net energy through time").

Comparison RL Vs. FL

Figure 25A:
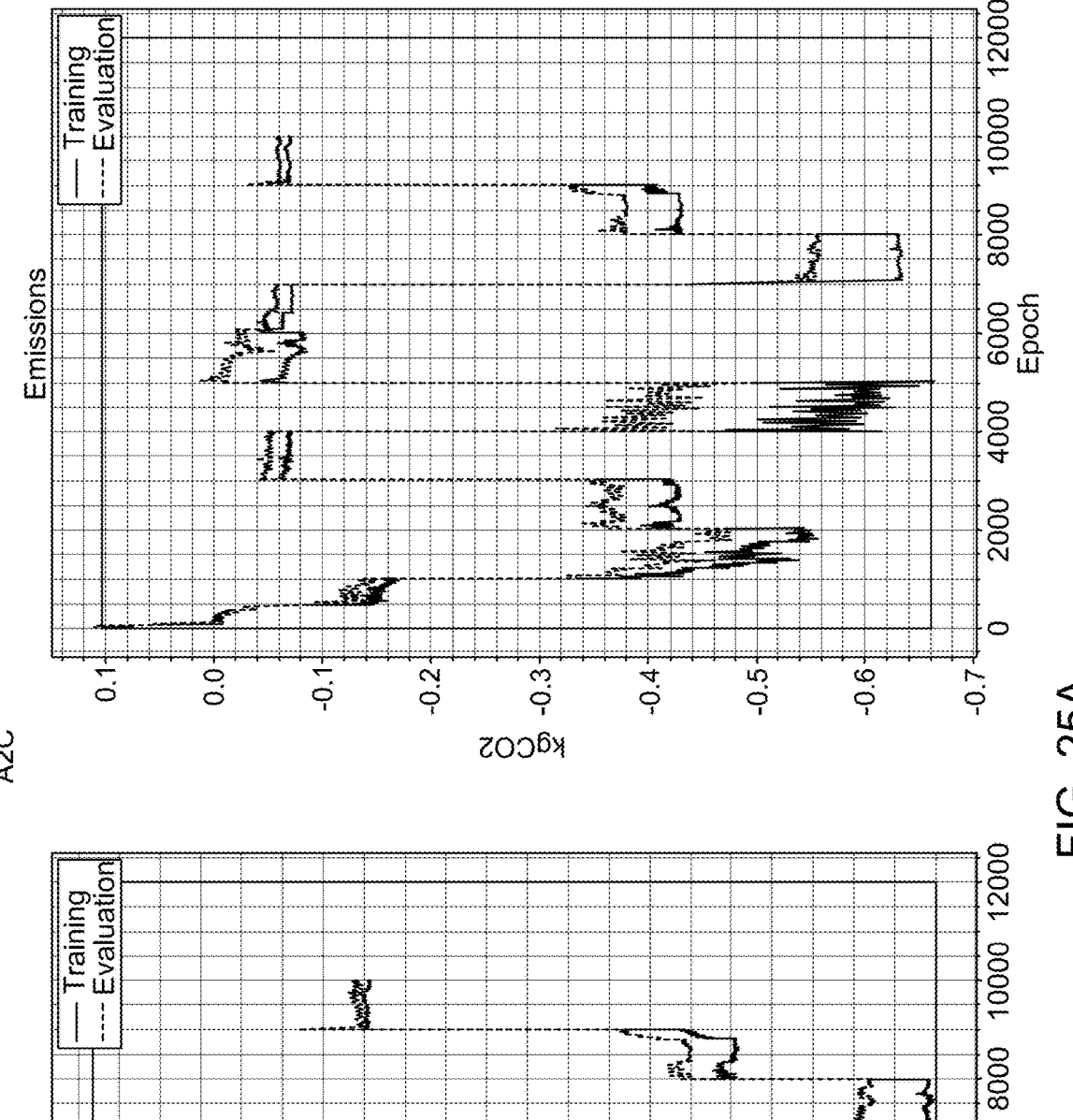
FIG. 25A illustrates results from a reinforcement learning A2C run.
Figure 25B:
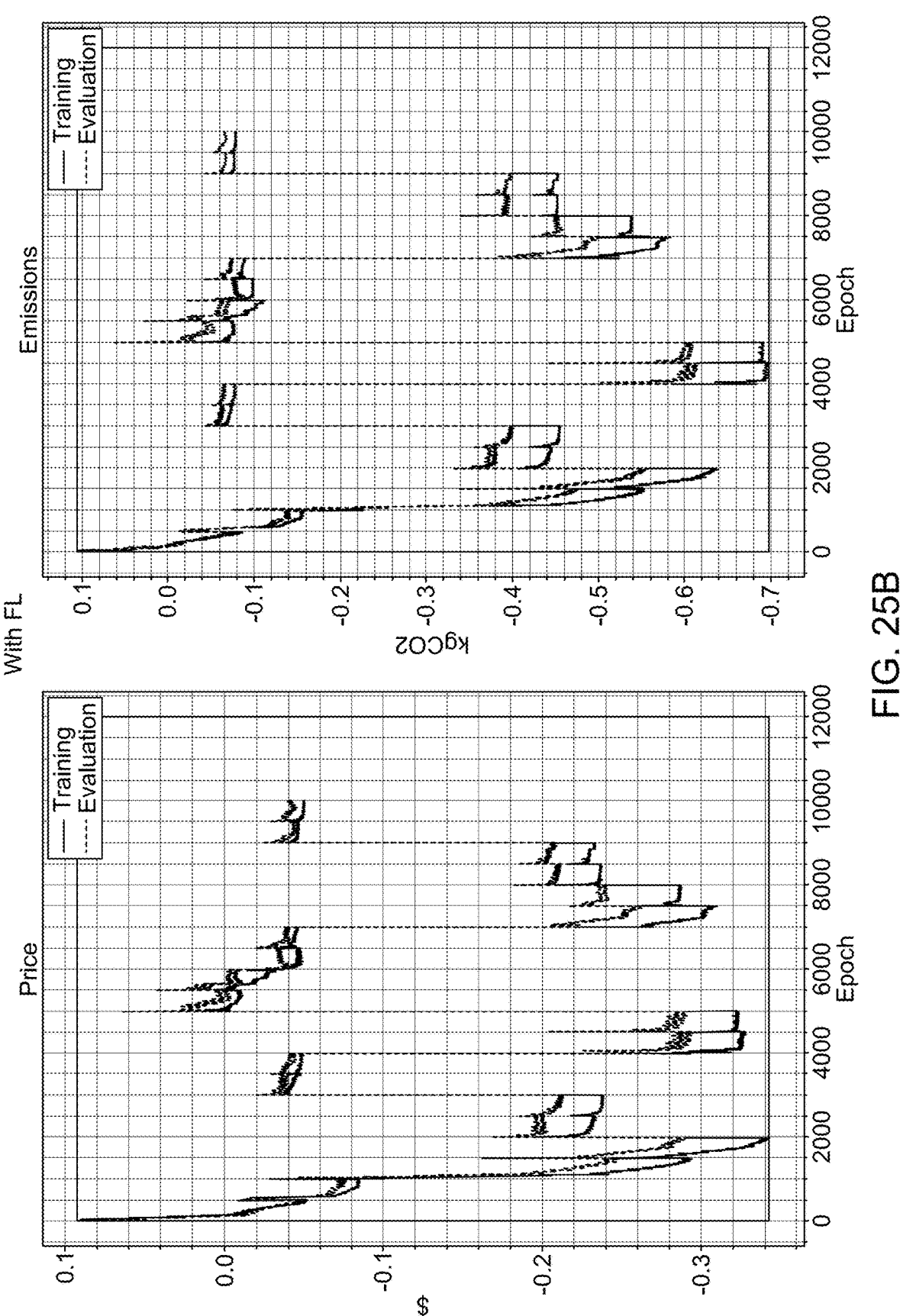
FIG. 25B illustrates results from a Federated Learning Run.

FIGS. 25A and 25B show the training and evaluation
score function through the epochs. Each stripe represents a
microgrid configuration, six in total. The agents go through
training and evaluation twice to test their adaptation capa-
bility.

21
22

A metric that can be used to evaluate two scenarios is determined for: one without batteries (base) and one with FRESCO. The metric assesses the system's overall performance by measuring the contribution of each household individually and aggregates the results at the microgrid and distributor levels.

$$P_{delta} = P_{base} - P_{FRESCO}, \tag{1}$$

$$C_{delta} = C_{base} - C_{FRESCO}, \tag{2}$$

Experiments and Results

In further experiments, Layer 1 household agents are trained using an Advantage Actor-Critic algorithm (A2C), which considers causality and microgrid attributes. These agents' actions are defined in the [−1, 1] range, where −1 means fully discharging the battery, and 1 means fully charging it. The agents are trained to be greedy in their objective of reducing bill price at the same time that they can adapt to external stimuli, like changes in the energy price or local energy availability coming from neighboring houses. The training set consists of 6 houses, the validation set of 6 other houses, and the testing set of 10 new houses. Every 200 episodes, the neural network parameters for both the actors and critics are synchronized using the FedAVG approach introduced by McMahan et al. (2016). See H. Brendan McMahan, Eider Moore, Daniel Ramage, and Blaise Aguera y Arcas. Federated learning of deep networks using model averaging. CoRR, abs/1602.05629, 2016. URL arxiv.org/abs/1602.05629, incorporated herein by reference in its entirety. The baseline to compare the performance of FRESCO is the values obtained when solving the same case with a linear solver. The CVXPY linear solver was used to establish the theoretically best possible result for the given scenarios. The results in Table 2 demonstrate better results than the standard RL approach.

TABLE 2

| Average performance of households. Lower is better for all except reward. | | | |
|---|---|---|---|
| | CVXPY | A2C – No FL | FRESCO |
| Train reward | −0.915 | −0.735 | −0.81 |
| Train price score | −0.103 | −0.097 | −0.10 |
| Train emission score | −0.223 | −0.1522 | −0.18 |
| Test price score | −0.0889 | −0.083 | −0.099 |
| Test emission score | −0.19 | −0.19 | −0.28 |

FRESCO framework uses federated reinforcement learning (FRL) to promote communication and cooperation among smart grids, which tend to be decentralized and must keep users' personal information private. The FRESCO framework considers external grid CO2 impact and prices, temperature, different distributed energy resources, and the diverse attributes of households. The framework enables stakeholders to trade energy optimally and in an automated manner without sharing consumer energy data. The results show that FRL can quickly adapt to grid changes and improve optimal policy convergence with a small hit in general training speed. The FRESCO framework can work with multiple interconnected microgrids and benefits all stakeholders by lowering energy bills, reducing electricity transmission rates, decreasing CO2 impact, and increasing participation in the energy market.

Size of Actor Network

Figure 26:
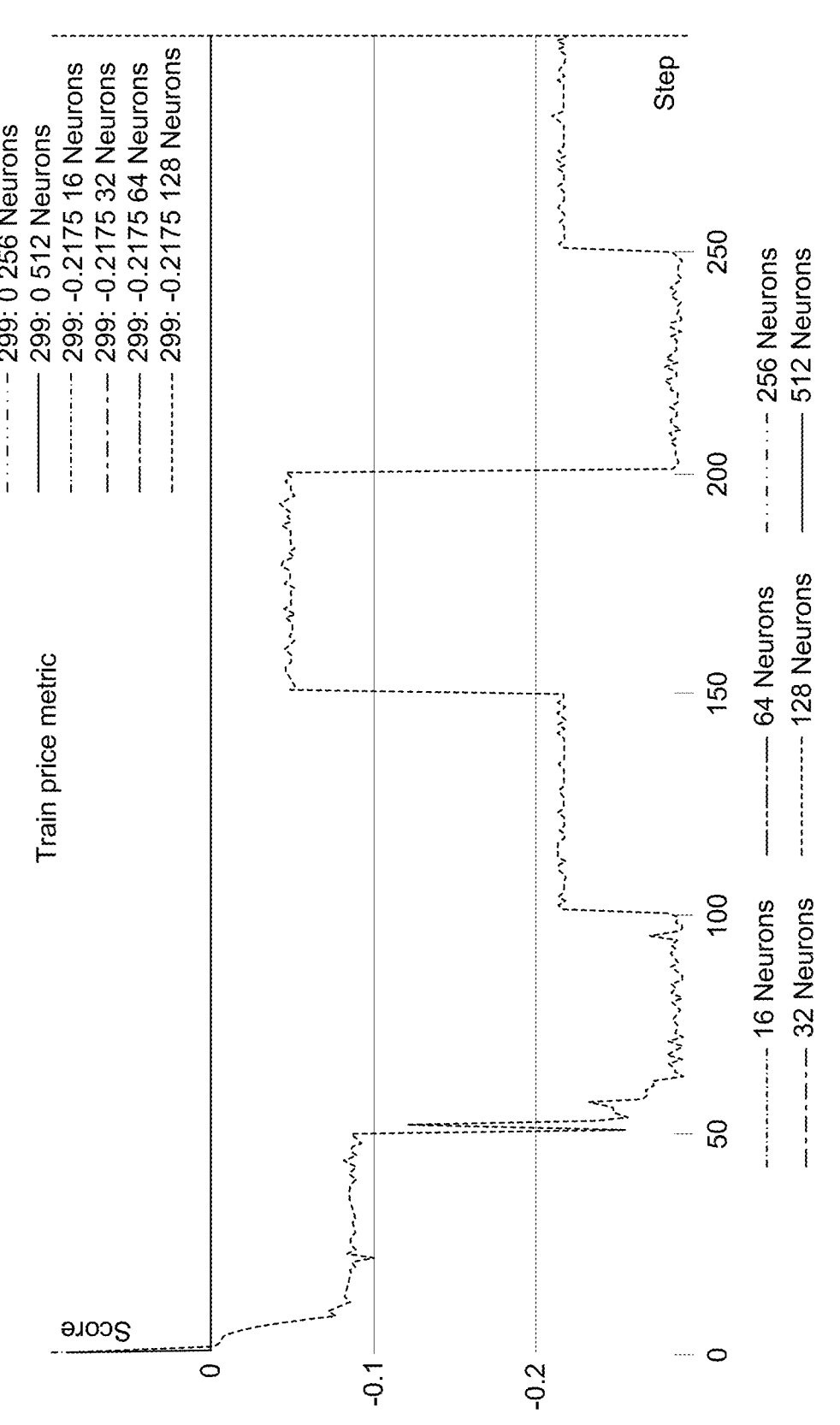
FIG. 26 shows a score that is relative to the baseline, without batteries.

An experiment can be performed to determine how size of the actor network affects performance and adaptability to generalization. FIG. 26 is a graph of training over 3 microgrid profiles (different starting conditions) 50 steps in each profile, where at the middle of training (150 steps) the loop is repeated. FIG. 26 shows how all the actor networks besides 128 neurons are not able to learn fast enough an appropriate policy (lower is better, as it is price) and cannot adapt when the profile changes. All of them settle in the baseline (red line)

Figure 27:
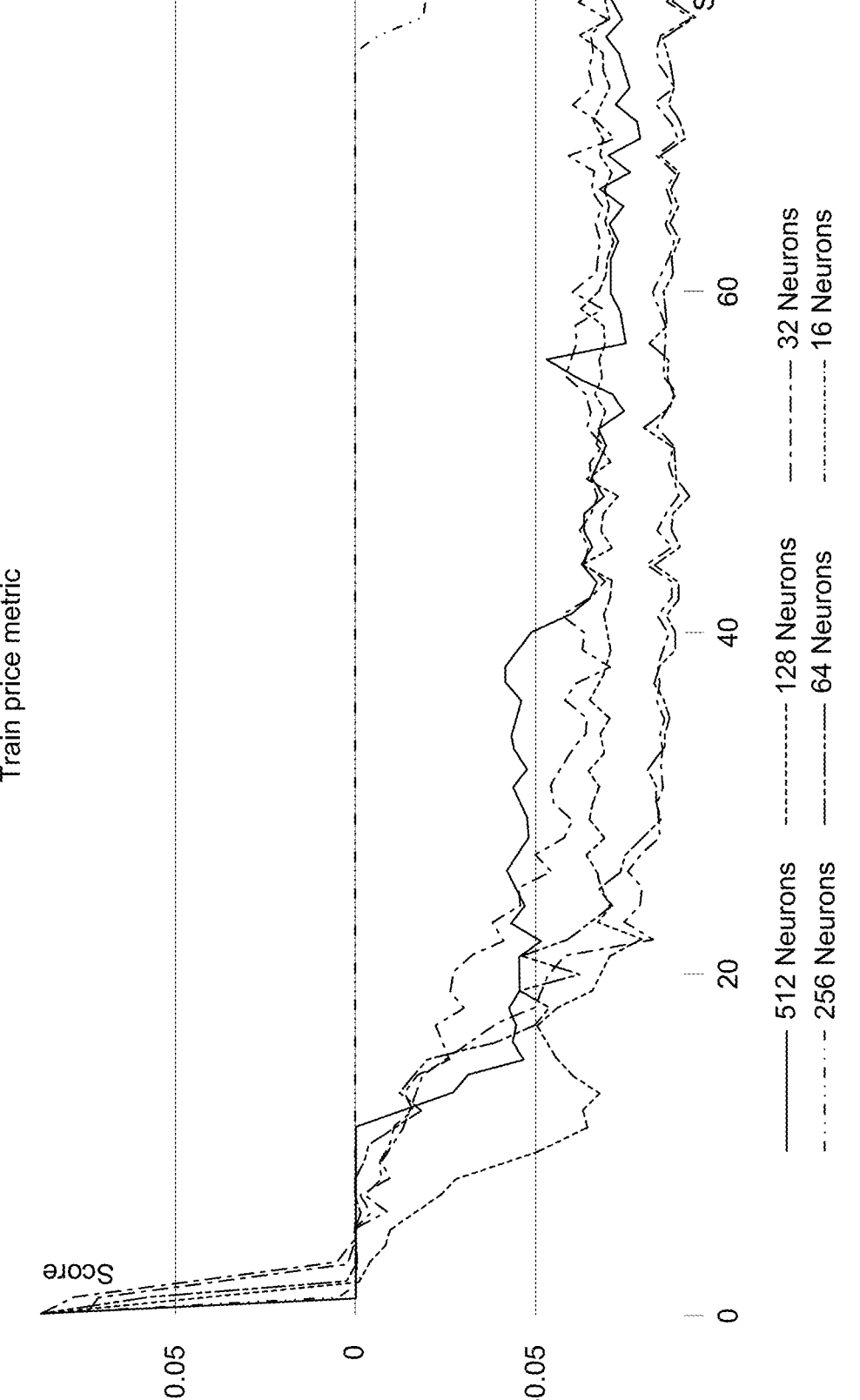
FIG. 27 is a graph of a train price metric.
Figure 28:
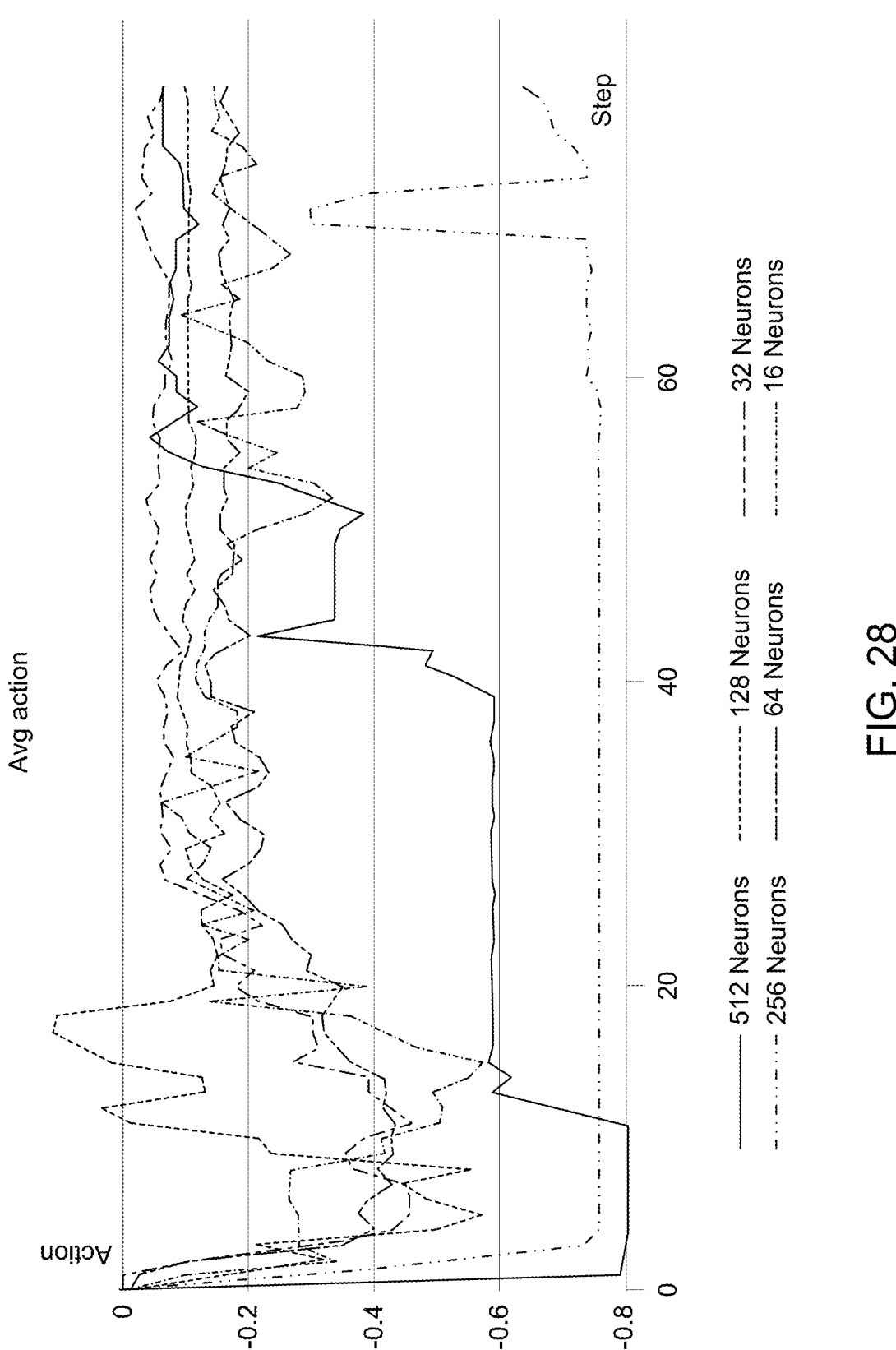
FIG. 28 is a graph of an average action.

FIGS. 27 and 28 are graphs of training over the same microgrid profile with various number of neurons in the actor network. FIG. 27 is a graph of a train price metric. FIG. 28 is a graph of an average action.

The graphs indicate that larger networks take longer to train, while small networks yield sub optimal performance and cannot learn a generalized policy. In addition, the graphs indicate that there is no single perfect approach.

One Vs Two Head Actor

Figure 29:
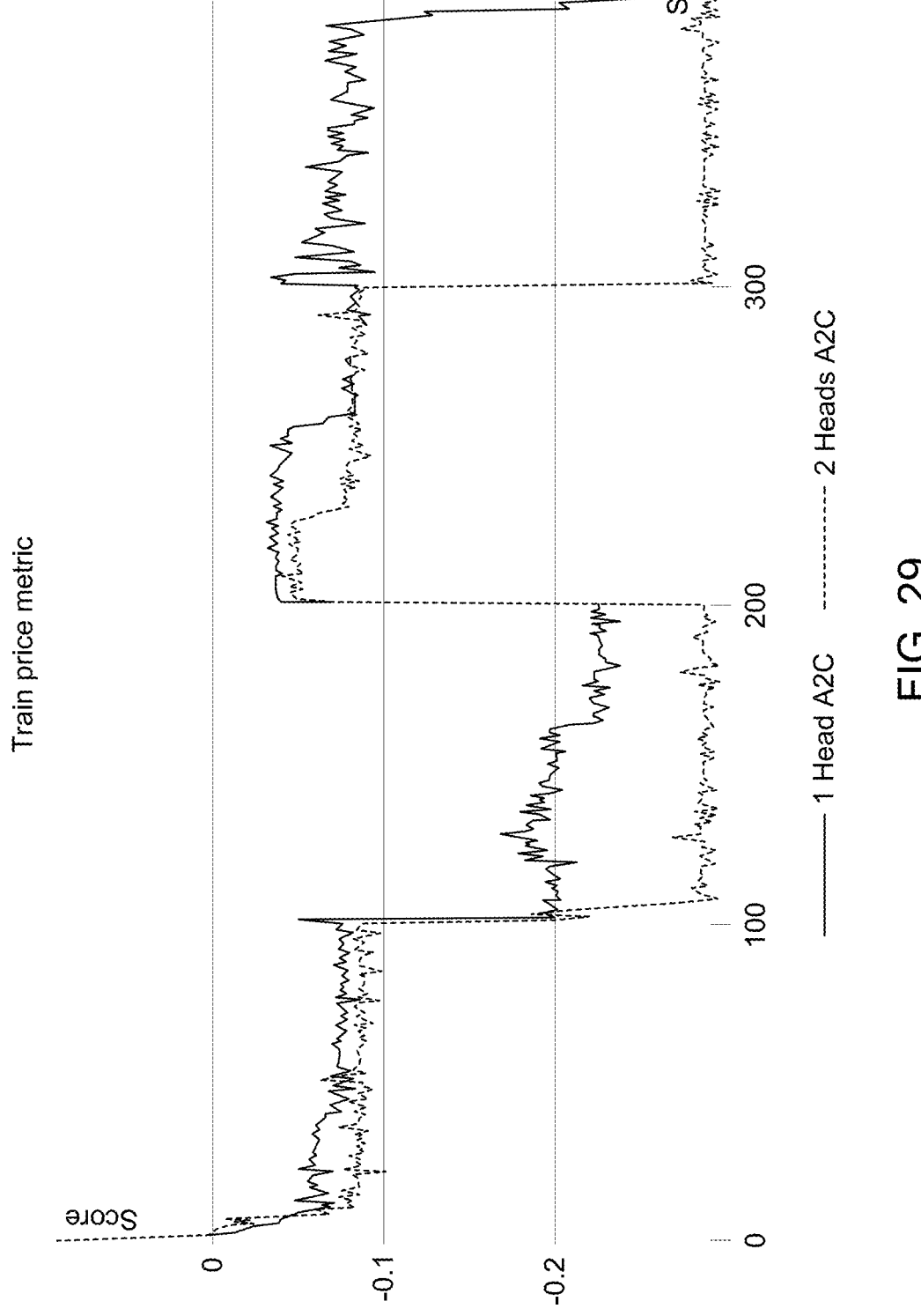
FIGS. 29 and 30 are graphs for one head actors vs two head actors.
Figure 30:
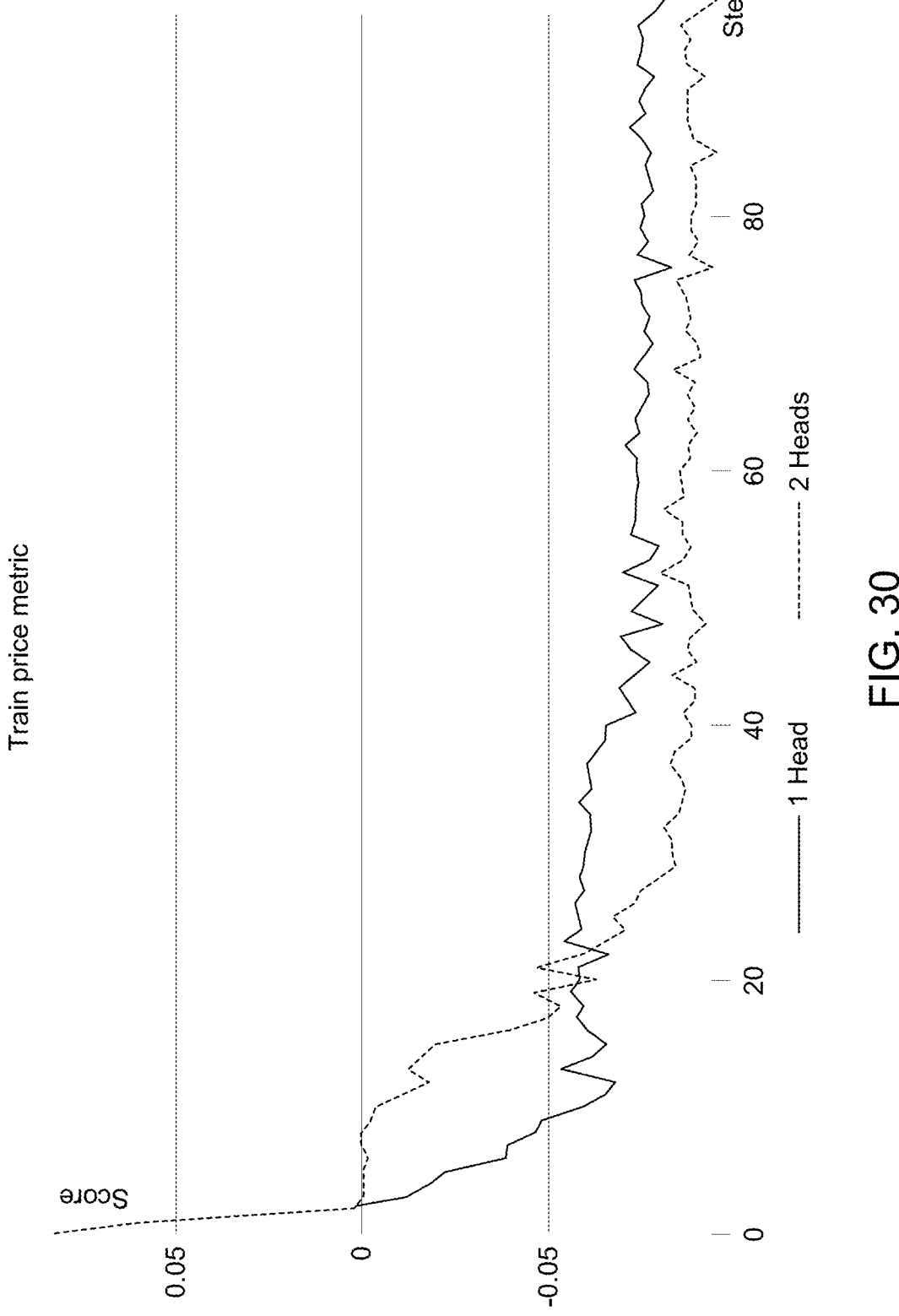

FIGS. 29 and 30 are graphs for one head actor vs two head actor-critic. FIG. 29 indicates that a two head actor-critic has better performance and generalization. FIG. 30 indicates that a two head actor-critic has slow but better convergence.

With and without Federated Learning

Figure 32:
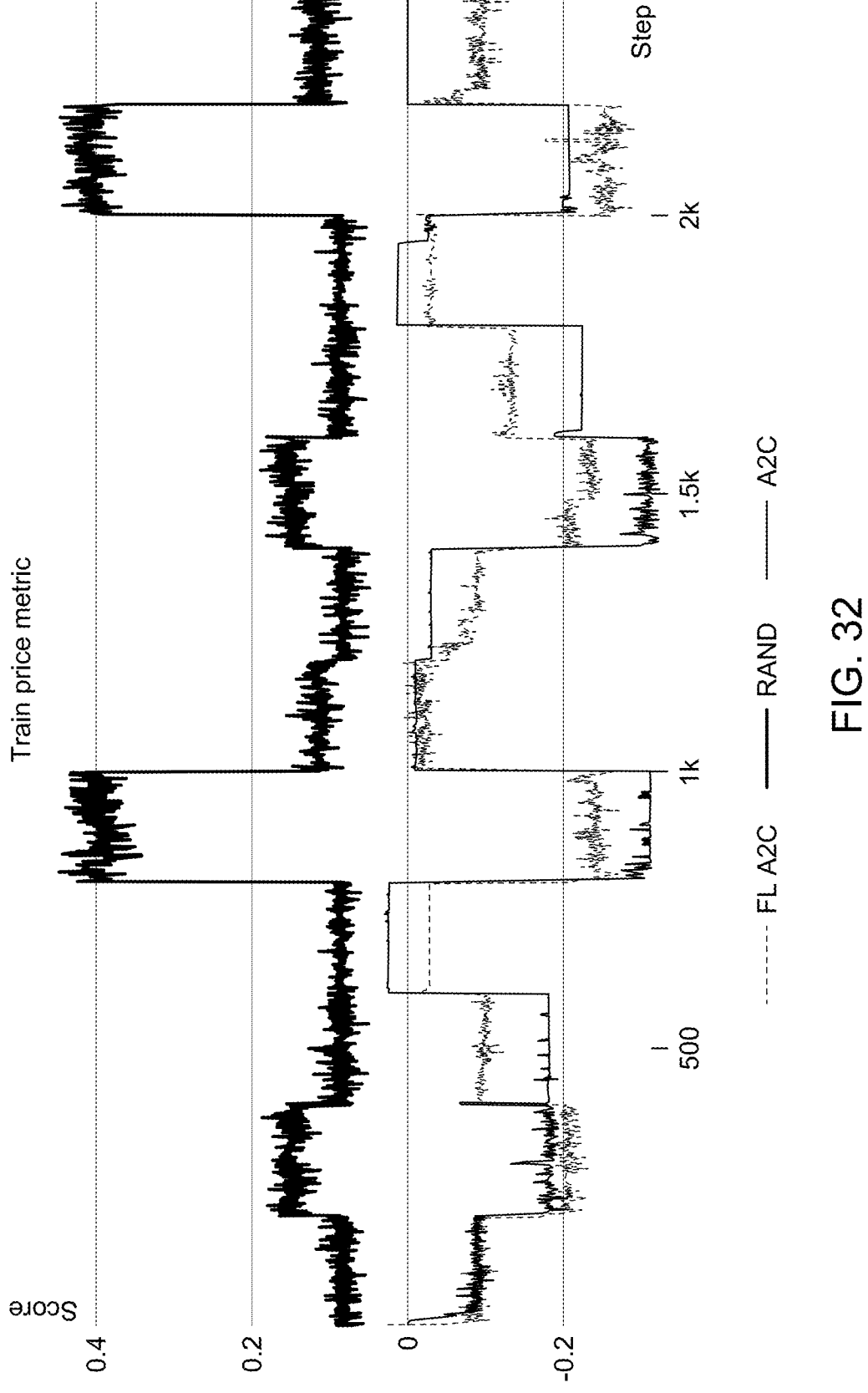

FIG. 32 shows the price score results for 3 different setups. A price score under 0 is desirable as it would mean that the agent managed to reduce the average price of energy for the households. The first setup shows the results for a random policy agent. The second represents the results of agents trained using only Advantage-Actor-Critic in an independent multi-agent configuration. The third setup (FL A2C) show agents trained using the Advantage-Actor-Critic setup trained with Federated Learning. The jumps in the plots represent changing conditions in the grid generation profiles, using 6 different profiles (quiet evening, quiet noon, active noon, nuclear, gas, mainly gas) rotating them in a round-robin manner, each profile appears twice.

Figure 33:
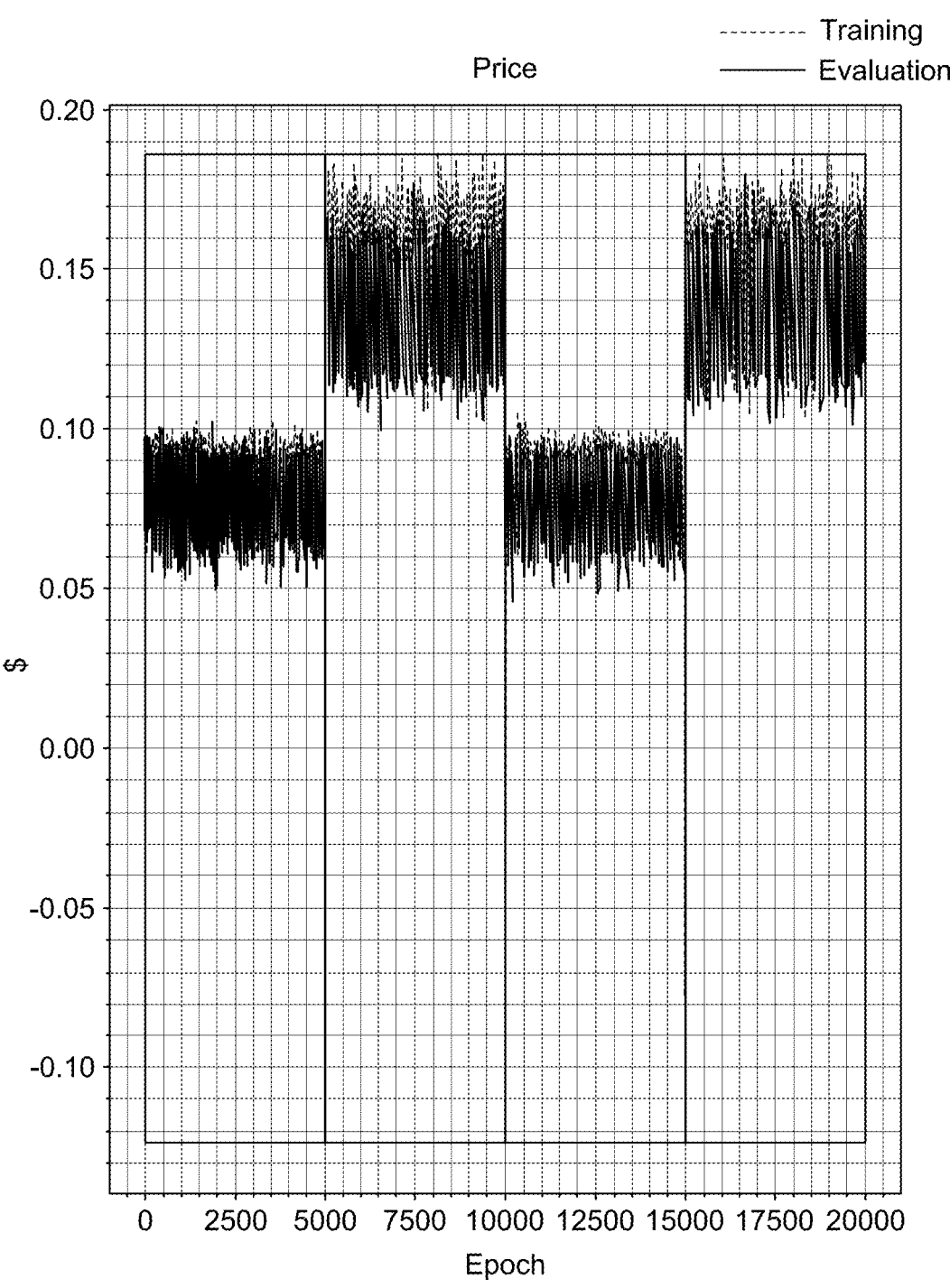
Figure 33:
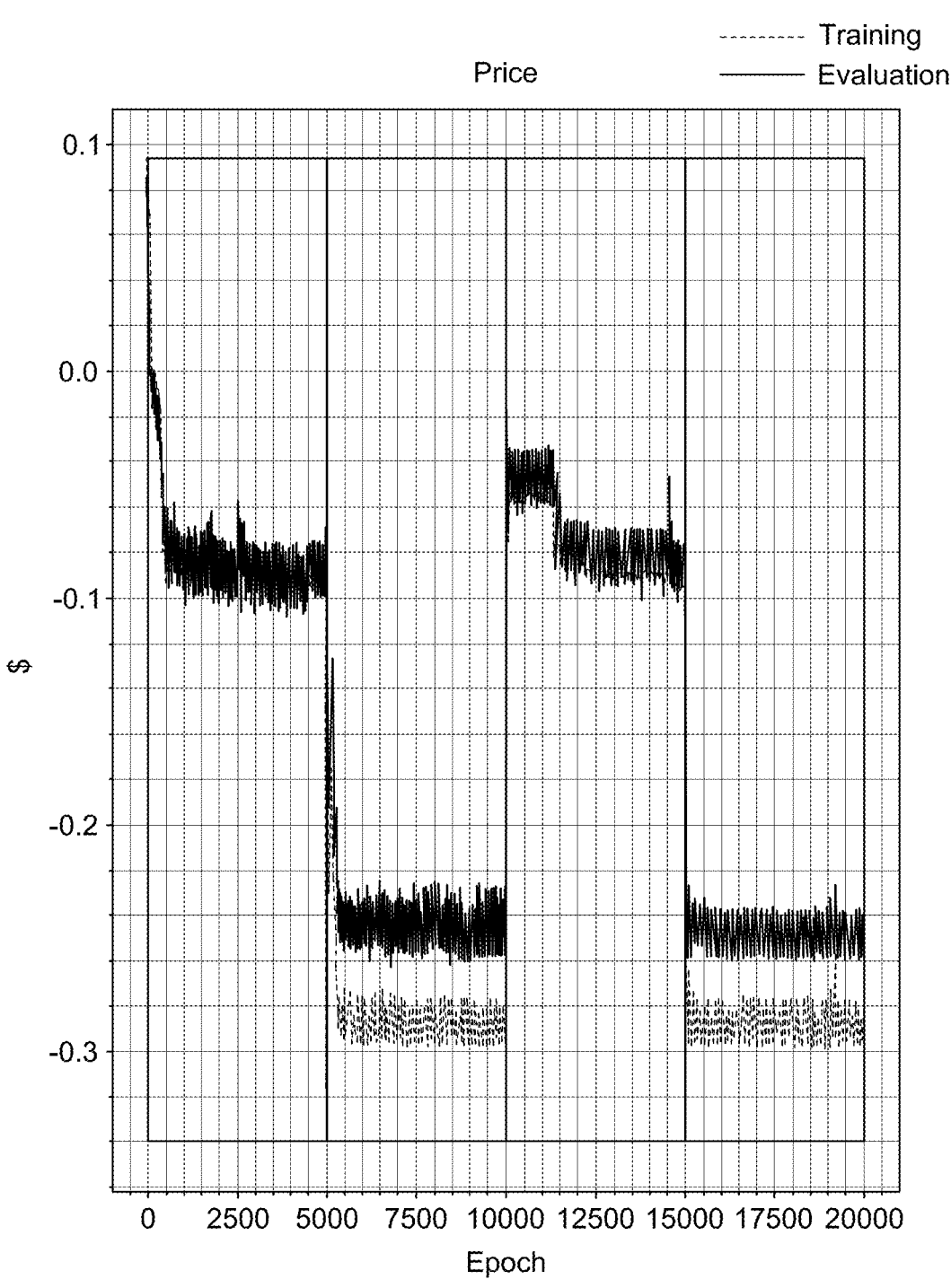
Figure 33:
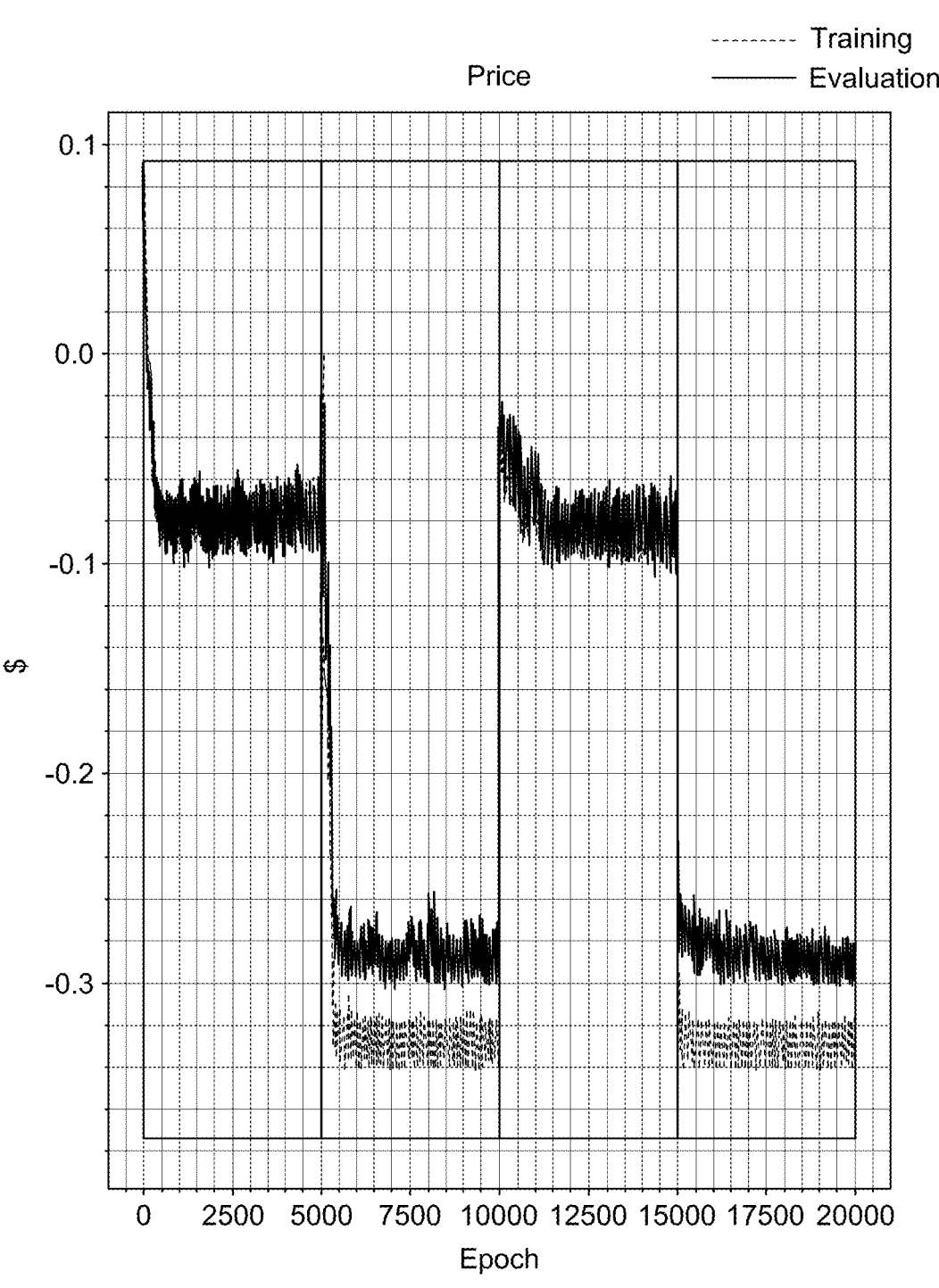

FIG. 33 shows the price score for each of the same type of agents in this case using only two types of profile (mainly gas, and gas). Agent policies in order: Random (left), A2C (center) and A2C (right).

Figure 31:
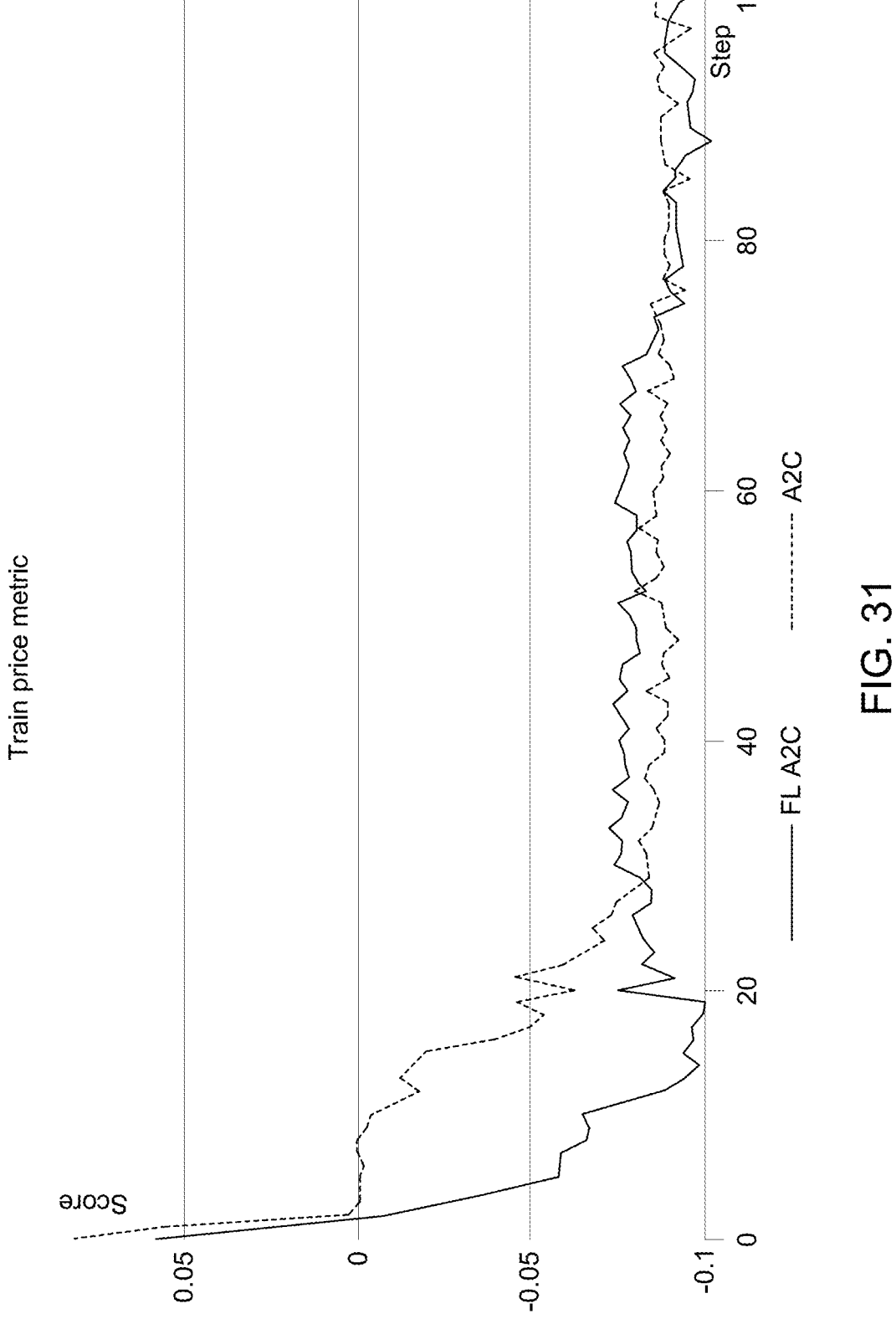
FIGS. 31, 32, 33 are graphs of further results using federated learning.

FIGS. 31, 32, 33 are graphs of further results using federated learning. FIG. 31 indicates that using federated learning yields faster convergence.

Blockchain

There are several challenges involved in operating a smart grid. The smart grid may have centralized control, which can make the smart grid vulnerable to failure due to failure of the central control. A smart home in a smart grid may allow access to operation conditions, i.e., is transparent, in order to allow external access to control features of the smart home. The power provided by grid energy sources needs to be accessible by all energy consumers in the smart grid. Large power consumers, such as factories, need to track transactions regarding energy usage, i.e., be traceable.

A solution to issues with smart grids can be to incorporate blockchain technology. Blockchain technology enables immutable digital transactions between peers in an energy grid. Transactions among agents can be tracked and integrity of transactions can be preserved. Transactions in a smart grid can be made transparent so that all of the actors in the grid know what is happening and the actors can participate in those transactions.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A federated learning system for controlling a plurality of microgrids, comprising:

a plurality of household machine learning agents representing a first layer, including active consumer household agents configured to continuously learn model parameters and manage charging periods and discharging periods of household batteries;

a plurality of microgrid agents representing a second layer, each microgrid agent configured to maximize use of local energy based on a pricing policy for local transactions between households connected in the microgrid, including accessing power from other microgrids of the plurality of microgrids when there is insufficient local energy to cover local demand, and selling surplus energy to the other microgrids when power generation by the microgrid surpasses the local demand, wherein each household machine learning agent is configured to sell energy to another household within its respective microgrid when there is an energy surplus at a household corresponding to the respective household machine learning agent and the energy price that is determined based on the pricing policy of the microgrid agent is at least a predetermined amount;

wherein the energy price that is determined based on the pricing policy of the microgrid has an objective of reducing carbon emission based on an objective function that maximize use of local energy within the microgrid;

a distributor agent representing a third layer configured to control load among the plurality of microgrids to minimize carbon emission by setting buy and sell prices for energy exchange within each of the plurality of microgrids based on a function that minimizes energy supply within the microgrids from non-renewable energy sources; and a federated learning engine for obtaining and combining the model parameters from the plurality of household machine learning agents to update a global household machine learning agent; and the objective function is represented as the following equation:

$$\min\begin{cases} E_{t,i}^{imp3}\left(r_t^{sd}+c_t\right)+E_{t,i}^{imp2}\,r_t^{sm}, & \text{if } E_{t,i}^{net} \geq 0, \\ E_{t,i}^{exp3}\,r_t^{bd}+E_{t,i}^{exp2}\,r_t^{bm}, & \text{if } E_{t,i}^{net} < 0, \end{cases}$$

wherein $$E_{t,i}^{imp3}$$

is a third layer energy import amount wherein $$r_t^{sd}$$

is a third layer energy sales price
wherein $c_t$ is a third layer emission amount
wherein $$E_{t,i}^{imp2}$$

is a second layer energy import amount
wherein $$r_t^{sm}$$

is a second layer energy sales price
wherein $$E_{t,i}^{exp3}$$

is a third layer energy export amount
wherein $$r_t^{bd}$$

is a third layer energy buying price
wherein $$E_{t,i}^{exp2}$$

is a second layer energy export amount
wherein $$r_t^{bm}$$

is a second layer energy buying price
wherein $$E_{t,i}^{net}$$

is a second layer net energy.

2. The system of claim 1, wherein each of the household machine learning agents is configured with an actor network and a critic network that undergo reinforcement learning.

3. The system of claim 1, wherein each of the household machine learning agents includes a trainable policy estimator.

4. The system of claim 1, wherein each of the household machine learning agents includes an advantage actor network and critic network, including an advantage function in which a value subtracted from a value of a Q function is used to re-calibrate rewards towards an average action, wherein the Q function is an estimation of a reward for
taking an action.

5. The system of claim 1, wherein a single agent is trained
using neural network parameters that are shared by all of the
plurality of household machine learning agents, in which
each household machine learning agent uses observations of
energy usage associated with the respective household to
take energy buy or sell actions on behalf of the household.

* * * * *